(12) United States Patent
Moriwaki

(10) Patent No.: US 7,860,917 B2
(45) Date of Patent: Dec. 28, 2010

(54) SENSOR NETWORK SYSTEM AND DATA TRANSFER METHOD FOR SENSING DATA

(75) Inventor: Norihiko Moriwaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 940 days.

(21) Appl. No.: 11/335,633

(22) Filed: Jan. 20, 2006

(65) Prior Publication Data

US 2006/0242285 A1  Oct. 26, 2006

(30) Foreign Application Priority Data

Mar. 24, 2005  (JP)  ............................. 2005-085638

(51) Int. Cl.
    *G06F 15/16* (2006.01)
(52) U.S. Cl. ...................... 709/201; 709/226
(58) Field of Classification Search ............... 709/223
    See application file for complete search history.

(56) References Cited

U.S. PATENT DOCUMENTS

| | | | |
|---|---|---|---|
| 6,675,208 B1* | 1/2004 | Rai et al. | 709/224 |
| 7,536,388 B2* | 5/2009 | Jung et al. | 1/1 |
| 2001/0036184 A1* | 11/2001 | Kinoshita et al. | 370/389 |
| 2002/0131395 A1* | 9/2002 | Wang | 370/349 |
| 2004/0093239 A1 | 5/2004 | Ott et al. | |
| 2004/0103139 A1* | 5/2004 | Hubbard et al. | 709/201 |
| 2004/0196821 A1* | 10/2004 | Haddad et al. | 370/349 |
| 2004/0203711 A1* | 10/2004 | O'Neill et al. | 455/422.1 |
| 2004/0246104 A1* | 12/2004 | Baechtiger et al. | 340/10.41 |
| 2004/0249563 A1* | 12/2004 | Otsuki et al. | 701/200 |
| 2006/0268834 A1* | 11/2006 | Bajic | 370/352 |

FOREIGN PATENT DOCUMENTS

| | | |
|---|---|---|
| JP | 2002-006937 | 11/2002 |
| JP | 2003-319550 | 7/2003 |
| JP | 2004-280411 | 7/2004 |

(Continued)

OTHER PUBLICATIONS

Perkins, Ad Hoc On-Demand Distance Vector (AODV) Routing, Jul. 2003, IETF, 1-6, 14, 18-20.*

(Continued)

*Primary Examiner*—Ashok B Patel
*Assistant Examiner*—Andrew Goldberg
(74) *Attorney, Agent, or Firm*—Brundidge & Stanger, P.C.

(57) ABSTRACT

To suppress a server processing load and a network load in a sensor network which accommodates a great number of mobile sensor nodes. Among a plurality of distributed data processing servers (DDS) for managing data of sensor nodes, a distributed data processing server (DDS) that is a home server to hold data of a mobile sensor node is set for each sensor node by a directory server (DRS). At each distributed data processing server (DDS), upon reception of the data from the sensor node, identification process is executed as to whether the data is sensor data to be managed by itself or another distributed data processing server. If a result of the identification is the sensor data to be managed by another distributed data processing server, the data is transferred to the distributed data processing server (DDS-1), which corresponds to the home server of the sensor data, based on setting of the directory server (DRS).

25 Claims, 44 Drawing Sheets

FOREIGN PATENT DOCUMENTS

JP        2004246412        9/2004

OTHER PUBLICATIONS

Kyungsoo Lim et al., Service Migration Mechanism Using Mobile Sensor Network, 2003.*

U.S. Appl. No. 11/211,697, filed Aug. 26, 2005, Moriwaki et al.
U.S. Appl. No. 11/211,467, filed Aug. 26, 2005, Moriwaki et al.
Japanese Office Action dated Jun. 15, 2010, issued in corresponding Japanese Patent Application No. 2005-085638 along with concise explanation of relevancy.

* cited by examiner

EVENT TABLE (ETB)

| DATA ID (DID) | EVENT ENTRY (EVT) | ACTION |
|---|---|---|
| XXX | DATA VALUE > A1 | DATA HOLDING (Yes) |
| YYY | DATA VALUE = p1 | DATA HOLDING (No) |
| | | |

SENSOR INFORMATION TABLE (STB)

| DATA ID | SENSOR TYPE | MEANING | MEASUREMENT | PLACE OF INSTALLATION | OBSERVATION INTERVAL | DATA LINK POINTER |
|---|---|---|---|---|---|---|
| 01 | NAME TAG | PLACE | NIL | 03 | 30s | DDS1/home/·· |
| 02 | TEMPERATURE | AMBIENT TEMPERATURE | TEMPERATURE | 03 | 60s | DDS2/home/·· |
| 03 | SEATED STATE | SEATED | ON/OFF | 03 | EVENT | DDS1/home/·· |
| | | | | | | |

FIG.12

ATTRIBUTE INTERPRETATION LIST (ATL)

1. TABLE OF NAME (ATL-m)

| RETURN VALUE | MEANING |
|---|---|
| 01 | MR. SUZUKI |
| 02 | MR. TANAKA |
| 03 | MR. YAMADA |

2. TABLE OF PLACE (ATL-p)

| RETURN VALUE | MEANING |
|---|---|
| 01 | OFFICE |
| 02 | MEETING ROOM A |
| 03 | ABSENT |

3. TABLE OF SEATED STATE (ATL-s)

| RETURN VALUE | MEANING |
|---|---|
| 00 | SEATED |
| 01 | ABSENT |

4. TEMPERATURE TABLE (ATL-t)

| RETURN VALUE | MEANING |
|---|---|
| x | y = f(x) |

5. TABLE OF NUMBER OF MEMBERS (ATL-n)

| RETURN VALUE | MEANING |
|---|---|
| x | y = x |

FIG.13

| DATA ID | SENSOR TYPE | ATTRIBUTE | MEASURED VALUE | PLACE FOR INSTALLATION | OBSERVATION INTERVAL | DATA LINK POINTER |

RG1

| | DESCRIPTION | RETRIEVAL OF THE NUMBER OF THE PERSONS AT THE MEETING ROOM. UST |
|---|---|---|
| STEP110 | DISPLAY THE REAL-WORLD MODEL (MDL) IN THE USER TERMINAL (UST) RETRIEVAL SCREEN AND SELECT THE DESIRED ITEM. | MEETING ROOM A ─┬─ MEMBERS<br>├─ THE NUMBER OF MEMBERS<br>└─ THE AMBIENT TEMPERATURE |
| STEP111 | ACCESS THE DISTRIBUTED DATA PROCESSING SERVER (DDS) AND ACQUIRE THE ATTRIBUTE AND DATA | DSK5<br>MEASURED DATA 5 |
| STEP112 | ACQUIRE THE MEANING OF THE RETURNED VALUE FROM THE ATTRIBUTE INTERPRETATION LIST (ATL). | ATTRIBUTE : THE NUMBER OF PERSONS<br>DATA : X<br>TABLE OF THE NUMBER OF MEMBERS<br>ATL-n<br><table><tr><th>RETURN VALUE</th><th>MEANING</th></tr><tr><td>x</td><td>y = x</td></tr></table> |
| STEP113 | DISPLAY THE MEANING INFORMATION ON THE USER TERMINAL SCREEN (UST) | UST<br>Y PERSONS ARE AT THE MEETING ROOM A. |

FIG.25

SCREEN FOR ACTION SETTING REQUEST UST

NAME [▼] MR.

[▼] WHILE
- IN THE SEATED STATE
- IN THE MEETING
- WENT HOME

[▼] INFORMS BY
- POP UP
- E-MAIL

[ONCE] [EVERY TIME] [REGISTRATION]

FIG.28

SCREEN FOR ACTION SETTING REQUEST UST

NAME [SUZUKI ▼] MR.

[IN THE SEATED STATE ▼] WHILE

[POP UP ▼] INFORMS BY

[ONCE] [EVERY TIME] [REGISTRATION]

FIG.29

ACTION TABLE ( ATB )

| SENSOR ID | INVENT CONTENTS | ACTION | PARAMETER |
|---|---|---|---|
| MSN - 1 | DATA ARRIVAL | DATA TRANSFER | DDS - 1 |
| MSN - n | DATA ARRIVAL | DATA DISCARD | --- |
|  |  |  |  |

FIG. 36

EVENT - ACTION TABLE ( EATB )

| SENSOR ID | EVENT CONTENTS | ACTION | PARAMETER | DISK HOLDING |
|---|---|---|---|---|
| MSN - 1 | DATA ARRIVAL | DATA TRANSFER | DDS - 1 | No |
| MSN - n | DATA ARRIVAL | DATA DISCARD | --- | No |
| | | | | |

FIG. 40

SENSOR NETWORK SYSTEM AND DATA TRANSFER METHOD FOR SENSING DATA

CLAIM OF PRIORITY

The present application claims priority from Japanese application P2005-85638 filed on Mar. 24, 2005, the content of which is hereby incorporated by reference into this application.

BACKGROUND OF THE INVENTION

This invention relates to a technique for use of information from many sensors connected to a network.

Networks including the Internet have been recently used mainly for access to accumulated contents including documents, images, videos, or voices, the access being made through search engines, preset links, or the like. In other words, a technique for accessing stored contents has been established.

To transmit real-time information, a streaming technology is known for continuously distributing images of a camera (WEB camera) installed in a predetermined position. Development has been recently made on a sensor network technology to obtain sensing data acquired from a great number of compact wireless sensor nodes through a network (e.g., JP 2002-006937 A, JP 2003-319550 A, JP 2004-280411 A, US 2004-0093239, and US 2004-0103139). In recent years, high expectations have been placed on a sensor network which fetches information of a real world and uses this information at a remote place through the network. Most of the Internet services have been offered in a virtual space. However, the sensor network is essentially different from the current Internet in that the sensor network connects a virtual space and a real space. If the fusion between the virtual space and the real space is enabled, various new services dependent on a situation including a time and a position can be realized. By interconnecting many objects existing in the real space through the network, it is possible to provide traceability services. This makes it possible to meet various social needs of "safety" in a broad sense, as well as "efficiency" of inventory control and office work.

SUMMARY OF THE INVENTION

The search engine of the conventional example enables identification of positions (addresses) in the network of stored data. However, there is a problem in that the search engine is not suitable for efficient retrieval of real-time information from a great amount of sensor information connected to the network, or to detection of change in information.

When the sensors are mobile, a centralized server is employed to track positions of all the sensors and collects sensor outputs. Accordingly, a user can easily retrieve the positions when the sensor positions are changed (e.g., JP 2002-006937 A). However, when the number of sensors connected to this server is large, there could be bottlenecks in a server processing due to a heavy load or in a network due to traffic load for connecting the server with the sensors.

It is therefore an object of this invention to realize a sensor network which can easily obtain and retrieve real-time information from many sensors connected to a network, particularly to provide a data management system for mobile sensor nodes. It is a further object of this invention to suppress loads of a server and a network even when a great number of mobile sensors are used.

A sensor network of this invention includes a plurality of distributed servers for managing sensing data, and a directory server for managing the plurality of distributed servers. The directory server assigns a home server for holding position information of each mobile sensor node and sensing data to the mobile sensor node in one-to-one correspondence, and each distributed server holds or transfers the node position information and the sensing data. Specifically, one of the plurality of distributed servers is assigned as a home server to each mobile sensor node. When receiving data from the mobile sensor node, the distributed server identifies whether the mobile sensor node is an internal sensor node to be managed by the distributed server or an external sensor node to be managed by the other distributed server based on the configuration of the directory server. If a result of the identification is the internal sensor node, the distributed server holds the position information and the sensing data. On the other hand, if a result of the identification is the external sensor node, the position information and the sensing data are transferred to a distributed server corresponding to the home server based on the configuration of the directory server.

Thus, according to this invention, as the data can be transferred to the home server even when the mobile sensor node moves to another distributed server in the sensor network, it is possible to manage the sensing data in a unified manner. As the directory server does not need to directly manage the data and the position information of the mobile sensor node, it is possible to reduce a data processing load even when the number of mobile sensor nodes increases.

Each mobile sensor node does not need to hold information of the home server itself, and the management sever is required only to notify home server information of a relevant external sensor node for each arrival of a new external sensor node to the distributed server. Accordingly, even when a sensor network includes many mobile sensor nodes, a setting load on the mobile sensor node can be reduced, and excessive loads of the directory server and the network can be prevented. Thus, it is possible to manage a mobile sensor network in a scalable manner.

BRIEF DESCRIPTION OF THE DRAWINGS

FIG. 12 is an explanatory diagram of a sensor information table.

FIG. 13 is an explanatory diagram of an attribute interpretation list.

FIG. 25 is an explanatory diagram showing a process when the number of members in the meeting room A is designated from the model binding list.

FIG. 28 is an explanatory diagram of an action setting screen displayed in a user terminal UST during registration of an action table.

FIG. 29 is an explanatory diagram of the action setting screen.

FIG. 36 is an explanatory diagram showing an example where a new entry is added to the action table of the directory server DRS.

FIG. 40 is an explanatory diagram showing an event-action table of the distributed data processing server DDS according to the second embodiment of this invention.

DETAILED DESCRIPTION OF THE PREFERRED EMBODIMENTS

Preferred embodiments of this invention will be described below in detail with reference to the accompanying drawings.

Figure 1:
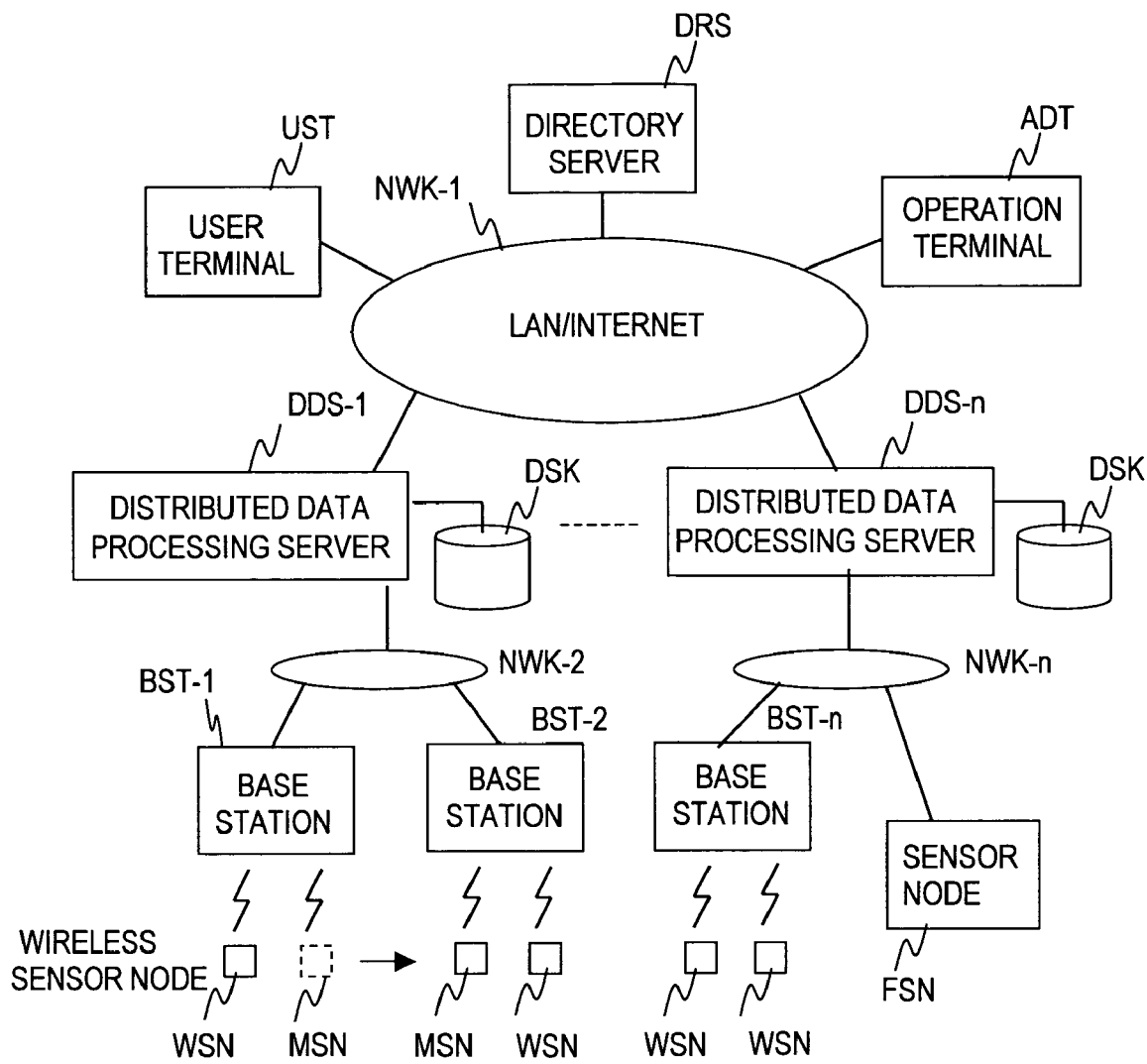
FIG. 1 is a diagram showing a system configuration of a sensor network according to a first embodiment of this invention.

FIG. 1 is a diagram showing a configuration of a sensor network system according to a first embodiment of this invention.

<Outline of System Configuration>

Sensor nodes such as wireless sensor nodes (WSN's) and wireless mobile sensor nodes (MSN's) are installed in predetermined positions and mounted to predetermined objects or humans to collect pieces of information regarding environments or the mounted objects and to transmit the pieces of information to base stations BST-1 to n. The sensor nodes include the wireless sensor nodes WSN's and MSN's connected to the base stations BST-1 to n by a wireless network, and a wired sensor node FSN connected to a network NWK-n by a wired line. The wireless sensor nodes WSN's and MSN's and the wired sensor node FSN will be generically referred to as sensor nodes simply. The wireless mobile sensor node MSN is referred to as a mobile sensor node, and the wireless sensor node WSN and the wired sensor node FSN which are fixed in predetermined positions are referred to as fixed sensors nodes.

For example, the fixed wireless sensor node WSN is configured in such a manner that a mounted sensor senses a surrounding situation periodically or based on an event generation, and transmits sensing information to a preset base station BST. The wireless mobile sensor node MSN is presumed to be mobile, e.g., carried by a human or mounted on a car, and transmits information to a near base station BST. Referring to FIG. 1, the wireless mobile sensor node MSN can move between base stations BST's which belong to the same distributed data processing server DDS, or to base stations BST's which are connected to different distributed data processing servers DDS.

It should be noted that the wireless sensor nodes are indicated by WSN or MSN as a whole (generically), and the individual wireless sensor nodes are indicated by suffixes such as WSN-1 to n or MSN-1 to n. Similarly, other components are generically represented without any suffixes, and individually represented by suffixes "-1 to n".

One or more wireless sensor nodes WSN and MSN can be connected to each of the base stations BST-1 to n, and the base stations BST-1 to n are connected through networks NWK-2 to n to the distributed data processing servers DS-1 to n which collect data from the respective sensor nodes. The networks NWK-2 to n connect the base stations BST to the distributed data processing servers (distributed servers) DDS. The distributed data processing server DDS can vary the number of connected wired or wireless radio sensor nodes depending on a system size. When the sensor nodes belonging to the base station BST are all wireless mobile sensor nodes MSN, the number of subordinate sensor nodes may be 0 if there are no communicable wireless mobile sensor nodes MSN.

Each of the distributed data processing servers DDS-1 to n includes a disk system DSK to hold data or the like transmitted from each of the wireless and wired sensor nodes (hereinafter, referred to simply as "sensor nodes"), and a CPU and a memory (not shown), and executes a predetermined program. As described below, the distributed data processing server DDS collects measured data from the sensor nodes, holds and processes the data according to predefined conditions, and notifies or transfers the data to a directory server (management server) DRS or another server through the network (first network) NWK-1. The network NWK-1 is composed of a LAN, the Internet, or the like. The program is held in a readable medium such as the disk system DSK.

The data transmitted from the sensor nodes includes mainly unique data ID to distinguish the sensor node and sensed numerical data (sensing data). Because the sensing data are not in formats to be easily understood by a user (user of a user terminal UST or the like) who utilizes outputs of the sensor nodes, the directory server DRS converts the sensing data into a real-world model (human, object, state, or the like) before presenting the data to the user.

The distributed data processing servers DDS-1 to n collected data from the sensor nodes belonging to the base stations BST of the networks (second networks) NWK-2 to n to which they are connected, or wireless mobile sensor nodes MSN which have moved from other base stations as described below. The wired sensor node FSN may be directly connected to the distributed data processing servers DDS-1 to n. Needless to say, the wired sensor nodes FSN can be connected to the base station BST, and the base station BST can manage the wired sensor nodes FSN in the same manner as the wireless sensor nodes WSN.

The directory server DRS that manages a real-world model related to the sensing information sent from the distributed data processing server DDS, the user terminal UST that utilizes information of the directory server DRS, and an operation terminal ADT that sets and manages the directory server DRS, the distributed data processing server DDS, the base station BST, and the sensor node are connected to the network NWK-1. The operation terminal may be prepared for each of a sensor manager to manage the sensor node and a service manager to manage services of the sensor network.

The directory server DRS includes a CPU, a memory, and a storage system (not shown) to execute a predetermined program, and manages object data related to sensing information as described below.

When the user request to the real-world model managed by the directory server DRS through the user terminal UST, the directory server DRS accesses one of the distributed data processing servers DDS-1 to n having measured data relevant to the real-world model to obtain the relevant measured data, and converts sensing data thereof into a format to be easily understood by the user when necessary before displaying the data in the user terminal UST.

Figure 2:
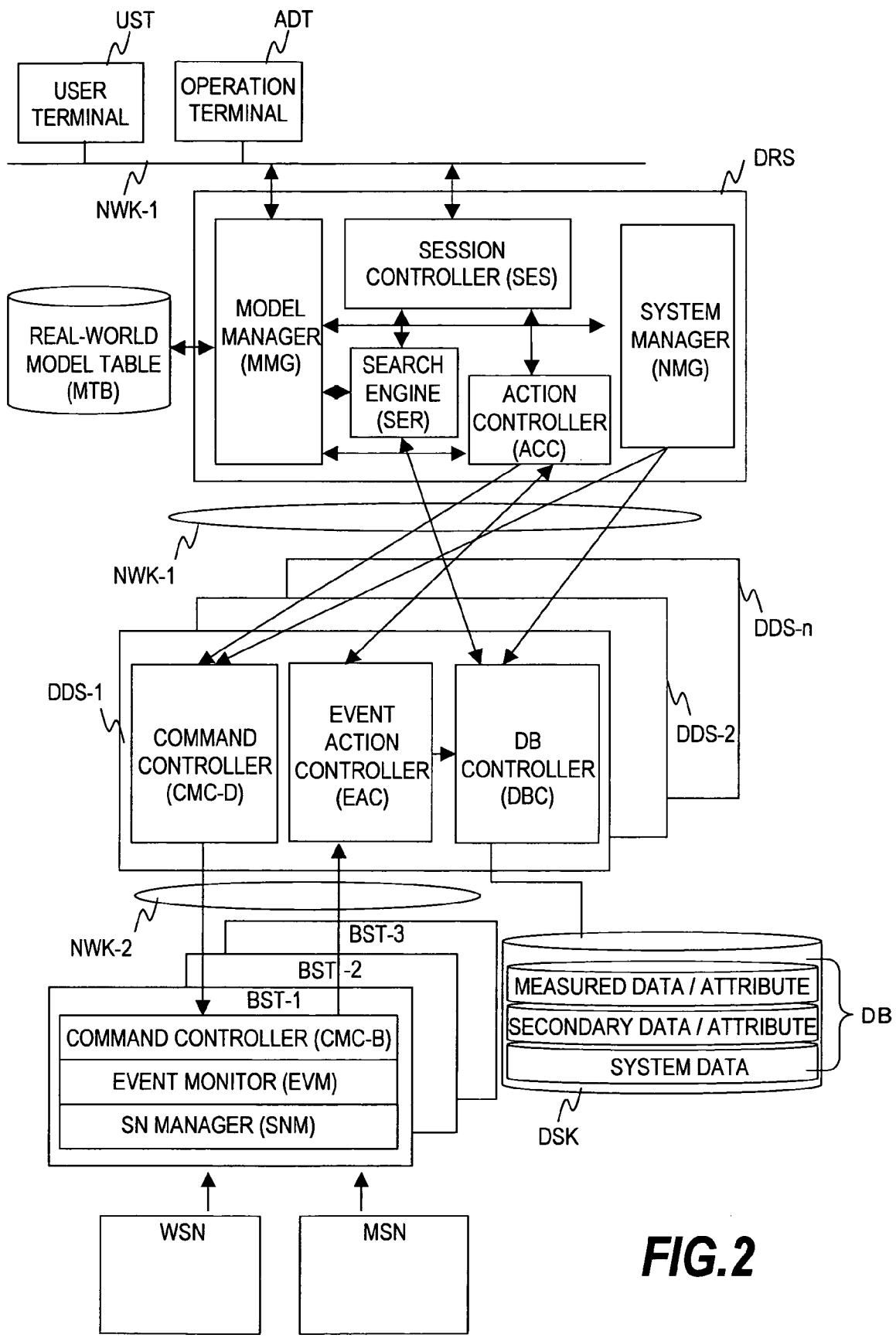
FIG. 2 is a functional block diagram of the sensor network.

FIG. 2 is a functional block diagram of the sensor network shown in FIG. 1. To simplify explanation, the distributed data processing server DDS-1 alone among the distributed data processing servers DDS-1 to n of FIG. 1 is shown, and the base station BST-1 alone among the base stations BST-1 to n connected to the distributed data processing servers DDS-1 is shown. The other distributed data processing servers DDS and the other base stations BST are configured in the similar fashion.

Each component will be described below in detail.

<Base Station BST>

The base station BST-1 that collects data from the wireless sensor nodes WSN and MSN and the wired sensor node FSN (hereinafter, referred to as "sensor nodes") includes a command controller CMC-B, a sensor node manager SNM, and an event monitor EVM. The sensor nodes add present data ID's to the measured data to transmit the data to the distributed data processing server DDS through the networks NWK-2 to n.

The base station BST includes a command controller CMC-B for transmitting/receiving a command from the distributed data processing server DDS-1 and with the sensor nodes, a sensor node manager SNM for managing states of the sensor nodes, and an event monitor EVM for detecting faults of the sensor nodes or abnormal data from the sensor nodes, and for notifying a result of the detection to the sensor node manager SNM. The sensor nodes add preset ID's to the measured data before transmitting the data to the base station BST.

The command controller CMC-B transmits/receives a command from a command controller CMC-D of the distributed data processing server DDS-1 described below. For example, according to a command from the distributed data processing server DDS-1, a parameter of the base station BST-1 is set, and a state of the base station BST-1 is transmitted to the distributed data processing server DDS-1. Alternatively, a parameter of the sensor node managed by the base station BST-1 is set, and a state of the sensor node is transmitted to the distributed data processing server DDS-1.

The sensor node manager SNM holds management information (operation state, residual power, or the like) which the sensor node manager SNM manages. Upon reception of an inquiry about a sensor node from the distributed data processing server DDS-1, the sensor node manager SNM notifies management information in place of the wireless sensor node. By entrusting the base station BST with related processing, the sensor node can reduce its own processing load, thereby suppressing extra power consumption.

When the event monitor EVM detects an abnormality, the sensor node manager SNM updates the management information of the sensor node, and notifies the information of abnormal sensor node to the distributed data processing server DDS-1. The abnormality of the sensor node means a functional stop of the sensor node or a state to reach the functional stop, such as when there is no response from the sensor node, or when power of the sensor node drops equal to or less than a predetermined threshold value.

Upon reception of a command (setting of output timing) for the sensor node from the command controller CMC-D of the distributed data processing server DDS, the sensor node manager SNM transmits this command to the sensor node to execute setting, and updates the management information of the sensor node after reception of a notification indicating completion of the setting from the sensor node. For example, the output timing of the sensor node is a cycle in which the wireless sensor node WSN periodically transmits data to the base station BST-1.

The base station BST transmits the data measured by the subordinate wireless sensor nodes WSN and MSN to the distributed data processing server DDS as described above.

<Distributed Data Processing Server DDS>

Each of the distributed data processing servers DDS-1 to n includes a disk system DSK for holding a database DB, and a command controller CMC-D, an event-action controller EAC, and a database controller DBC described below.

The command controller CMC-D communicates with the base station BST and the directory server DRS described below to transmit/receive a command or the like.

Each time it receives the measured data of the sensor node from the base station BST, the event-action controller EAC obtains an ID corresponding to the measured data, i.e., data ID, and reads a condition rule of an event corresponding to the data ID from a table described below (event table ETB of FIG. 10) to judge if there exists an event condition corresponding to the value of the measured data. Further, the event-action controller EAC executes an action corresponding to a condition of an event relevant to the data ID. When there is only one sensor in the sensor node, a sensor node ID could be used as data ID to identify the sensor node.

According to the rules of each data ID preset, actions are executed such as conversion of measured data into secondary data, writing the measured data and the secondary data in the database through the database controller DBC, and notifying to the directory server DRS. As shown in FIG. 1, according to this embodiment, by arranging the plurality of distributed data processing servers DDS which integrate some of them regionally (or locally) for the plurality of base stations BST, it is possible to process pieces of information from many sensor nodes in a distributed manner. For example, each distributed data processing server DDS can be installed in each floor of an office building. The disk system DSK of the distributed data processing server DDS-1 holds the measured data of the sensor nodes WSN, MSN, and FSN received from the base station BST, secondary data obtained by processing the measured data, and system data regarding the base station BST, the wireless sensor nodes WSN and MSN and the wired sensor node FSN in the database DB.

The database controller DBC of the distributed data processing server DDS-1 holds the measured data which is an output of the sensor node sent from the event-action controller EAC in the database DB. When necessary, the database controller DBC processes a numerical value of the measured data, or holds secondary data obtained by combining with other data in the database DB. The system data is updated as needed according to a request from the operation terminal ADT or the like.

When the distributed data processing server DDS receives data from the wireless mobile sensor node MSN belonging to another distributed data processing server DDS as describe below, the event-action controller EAC refers to the event table ETB of FIG. 10 and an action table ATB of the directory server DRS shown in FIG. 31 to transfer the received data to the distributed data processing server DDS to which the wireless mobile sensor node MSN belongs.

The wireless mobile sensor node MSN is called as an internal sensor node when it is near the base station BST connected to the distributed data processing server DDS to which the node originally belongs. Otherwise the node is called as an external sensor node when it is near the base station BST under another distributed data processing server DDS.

<Directory Server DRS>

The directory server DRS that manages the plurality of distributed data processing servers DDS includes a session controller SES for controlling communication from the user terminal UST or the operation terminal ADT connected through the network NWK-1, and a model manager MMG, a model table MTB, a system manager NMG, an action controller ACC, and a search engine SER as described below.

The model manager MMG manages a correlation between the real-world model (object) easily understood by the user and the measured data collected from the sensor nodes by the distributed data processing server DDS or the secondary data. This management is based on a real-world model list MDL set in the real-world model table MTB. In other words, the real-world model table MTB sets information to be understood by the user as an object, and correlates data ID and a location (holding place) of the measured data (or secondary data) from the sensor node with the object, and additionally converts the measured data from the sensor node into significant information to be understood by the user based on an attribute interpretation list ATL described below.

The directory server DRS manages position information (link of URL or the like) of the measured data or the secondary data equivalent to the real-world model. In other words, the user can directly access measured data of the sensor node by designating the real-world model. The amount of the measured data and the secondary data from the sensor node increases with time if they are accumulated. Whereas, the amount of the real-world information does not increase. The real-world model will be described below in detail.

The real-world model table MTB is held in a predetermined storage system (not shown) of the directory server DRS.

The action controller ACC of the directory server DRS communicates with the event-action controller EAC or the command controller CMC-D of the distributed data processing server DDS to receive an event-action setting request from the user terminal UST or the operation terminal ADT. The contents of the received event or action are analyzed, and the required function is shared between the directory server DRS and the distributed data processing servers DDS-1 to n according to a result of the analysis. One event or action may be concerned with more than one distributed data processing server DDS-1 to n.

The search engine SER refers to the real-world model table MTB to execute retrieval in the database DB of the distributed data processing server DDS based on an object retrieving request received by the session controller SES.

When the retrieving request is a query, correspondence to the database DB according to the contents of the query and structural query language (SQL) conversion of the query are executed to implement retrieval. The retrieving target may be over the plurality of distributed data processing servers DDS.

This query corresponds to snapshot retrieval of latest data acquisition. The streaming data acquisition is enabled by the action setting of the action controller ACC. In other words, an action of transferring relevant data to the user terminal sequentially can be set in the event-action controller EAC of the relevant distributed data processing server DDS.

The system manager NMG integrally manages the distributed data processing server DDS connected to the network NWK-1 to constitute the sensor network, the base station BST connected to the distributed data processing server DDS, and the sensor node connected to the base station BST. Especially, the system manager NMG manages a data link pointer of measured data of the wireless mobile sensors MSN connectable to different base stations BST or distributed data processing servers DDS in a unified manner. As described below, the distributed data processing server DDS that has received measured data from the wireless mobile sensor node MSN belonging to another distributed data processing server DDS refers to a correlation set between the wireless mobile sensor node MSN and the distributed data processing server DDS in the system manager NMG to transfer the measured data received by the relevant wireless mobile sensor node to the relevant distributed data processing server DDS.

The system manager NMG provides an interface regarding registration or retrieval of the distributed data processing server DDS, the base station BST, or the sensor node to the operation terminal ADT or the like with an operation terminal ADT or the like, and manages a state of each system or sensor node.

The system manager NMG can issue a command to the distributed data processing server DDS, the base station BST, or the sensor node, and manages resources of the sensor network based on this command. The sensor node receives the command from the system manager NMG through the command controller CMC-B of the higher base station BST. The base station BST receives the command from the system manager NMG through the command controller CMC-D of the higher distributed data processing server DDS.

Examples of commands that the system manager NMG issue through the command controller CMC-D include resetting, parameter setting, data deletion, data transfer, event/action setting, and the like.

<Example of Sensor Node>

Next, referring to FIGS. 3 to 5, an example of a sensor node will be described.

Figure 3:
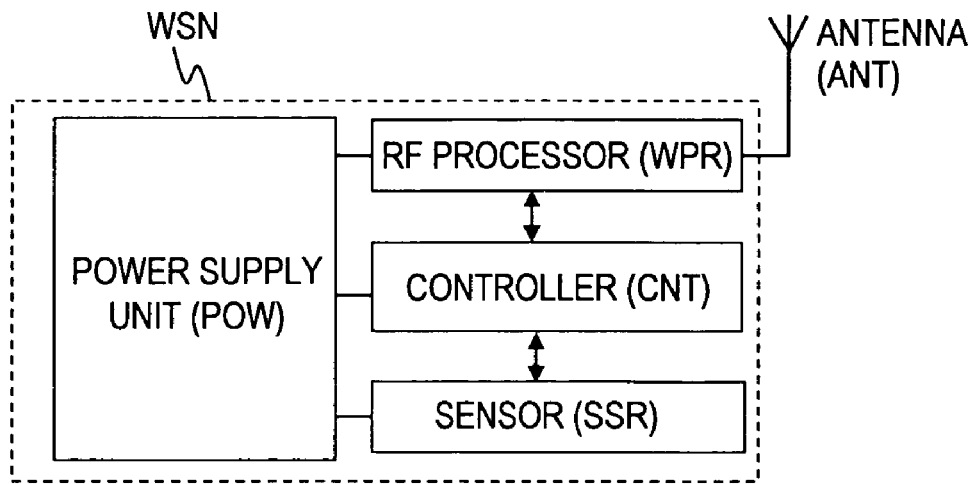
FIG. 3 is a block diagram showing an example of a wireless sensor node WSN.

FIG. 3 is a block diagram showing an example of a wireless sensor node WSN. The wireless sensor node WSN includes a sensor SSR for measuring a state amount (temperature, pressure, position, or the like) or a change (low/high temperature, low/high pressure, or the like) in the state amount of a measuring target, a controller CNT for controlling the sensor SSR, an RF processor WPR for communicating with the base station BST, a power supply unit POW for supplying power to each block SSR, CNT, or WPR, and an antenna ANT for transmission/reception.

The controller CNT reads measured data of the sensor SSR at a preset cycle, and adds preset data ID of the sensor node to the measured data to transfer it to the RF processor WPR. For the measured data, time information for sensing may be given as a time stamp. The RF processor WPR transmits the data sent from the controller CNT to the base station BST.

The RF processor WPR transmits a command or the like received from the base station BST to the controller CNT. The controller CNT analyzes the received command to execute predetermined processing (e.g., setting change or the like). The controller CNT transmits information on residual power (or charging amount) of the power supply unit POW to the base station BST through the RF processor WPR. The controller CNT may monitor the residual power (or charging amount) of the power supply unit POW itself, and transmit an alarm of no power to the base station BST when the residual power drops below a preset threshold value.

Figure 4:
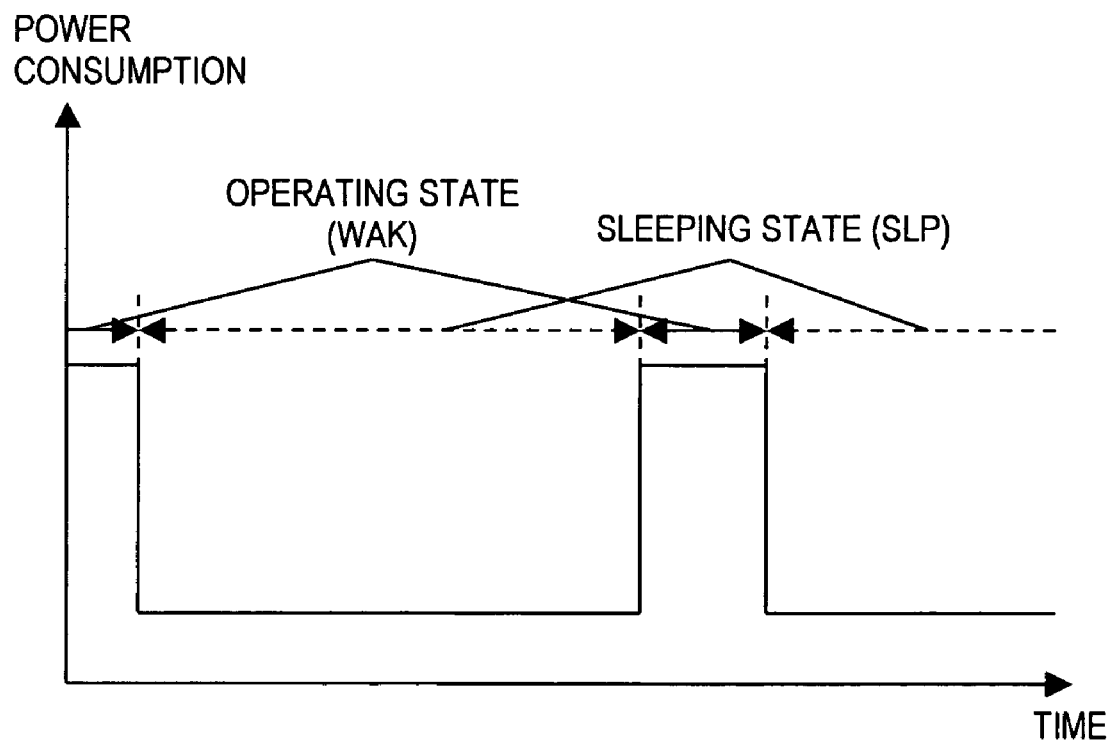
FIG. 4 is a graph of an operated state of the wireless sensor node, showing a relation between time and power consumption.

As shown in FIG. 4, in order to execute long-time measurement with limited battery power, the RF processor WPR operates intermittently to reduce power consumption. In FIG. 4, the controller CNT stops driving of the sensor SSR and the RF processor WPR in a sleep state SLP. The controller CNT wakes up the sensor SSR and the RF processor WPR at a predetermined cycle to transmit measured data. FIG. 3 shows the example where one wireless sensor node WSN includes one sensor SSR. However, a plurality of sensors SSR may be arranged. Alternatively, in place of the sensor SSR, a memory holding a unique identifier ID may be installed to use the wireless sensor node WSN as an RF tag.

In FIGS. 3 and 4, the power supply unit POW may use a battery, or may include an energy generation unit such as a solar battery or vibrational energy generator. The wireless mobile sensor node MSN is configured as in the case of FIGS. 3 and 4.

Figure 5:
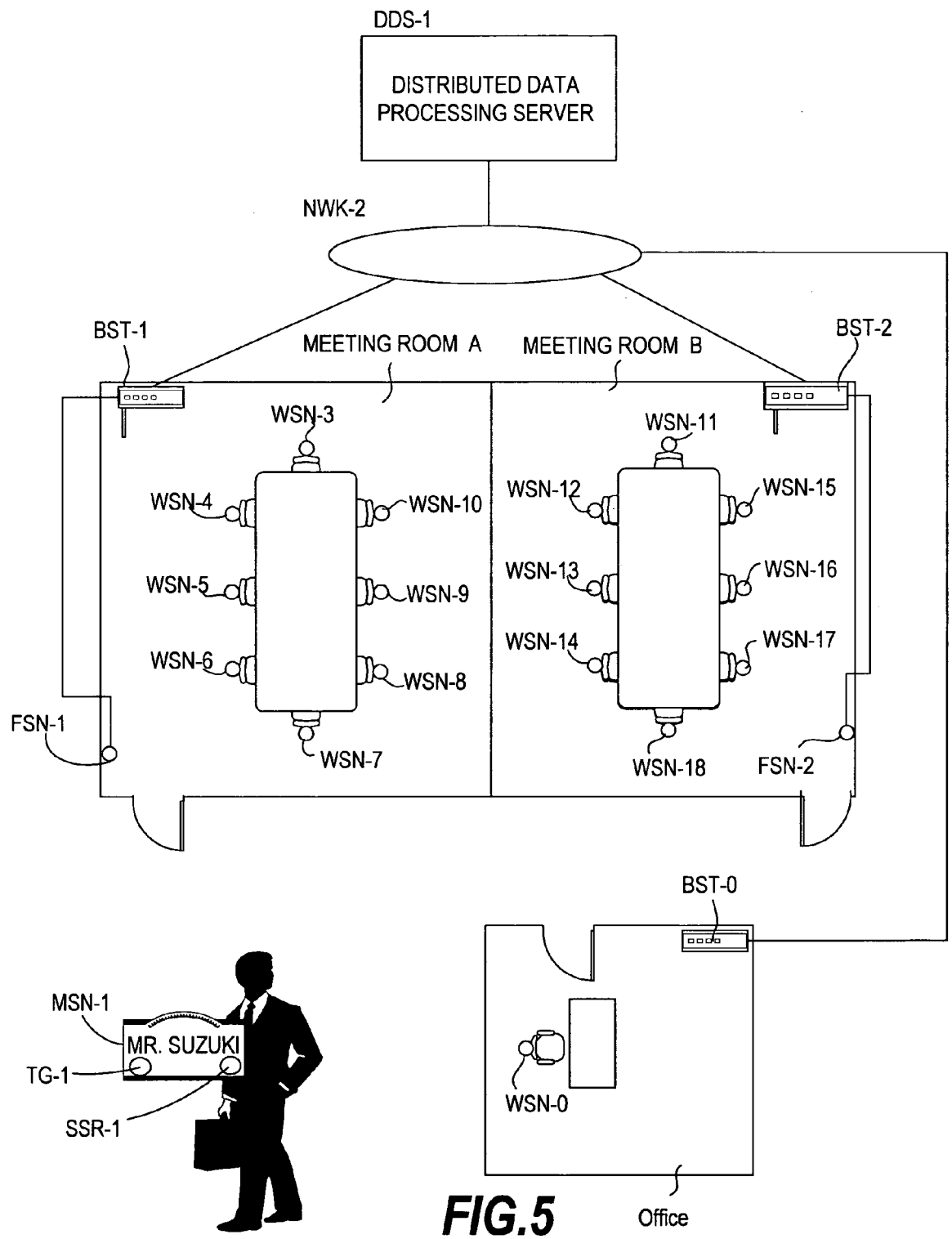
FIG. 5 is an explanatory diagram showing an arrangement example of wireless sensor nodes.

FIG. 5 is a detailed diagram showing an example of a sensor node connected to the distributed data processing server DDS-1 shown in FIGS. 1 and 2.

This embodiment shows an example where sensor nodes are installed in an office and meeting rooms A and B.

A base station BST-0 is installed in the office, and a wireless sensor node WSN-0 including a pressure switch is arranged as a sensor SSR in a chair in the office. The wireless sensor node WSN-0 is set to communicate with the base station BST-0.

A base station BST-1 is installed in the meeting room A, and wireless sensor nodes WSN-3 to 10 including pressure switches are arranged as sensors SSR in chairs of the meeting room A. In addition, a wired sensor node FSN-1 including a temperature sensor is installed in the meeting room A to be connected to the base station BST-1. The wireless sensor nodes WNS-3 to 10 and the wired sensor node FSN-1 are set to communicate with the base station BST-1.

Similarly, a base station BST-2 is installed in the meeting room B, wireless sensor nodes WSN-11 to 18 including pressure switches are installed as sensors SSR in chairs of the meeting room B, and a wired sensor node FSN-2 including a temperature sensor is installed to be connected to the base station BST-2.

Each of employees who use these meeting rooms A and B has a wireless sensor node MSN-1 attached to serve also as a name tag. The wireless sensor node MSN-1 includes a temperature sensor SSR-1 for measuring a body temperature (or ambient temperature) of the employee, and holds an identifier (employee ID) unique to the employee. The wireless sensor node MSN-1 can transmit the employee ID and the ambient temperature as measured data to the base station BST-0, 1, or 2.

According to this embodiment, the wireless sensor node MSN-1 has the unique identifier. However, for example, tag ID may be added to a tag TG-1 fixed to a name tag node shown in FIG. 5, and the employee may be identified by using this tag ID. This configuration will be used consistently throughout the embodiments described below.

<Operation Concept of Sensor Network>

An outline of an operation of the sensor network shown in FIGS. 1 to 5 will be described using FIGS. 6 to 8.

Figure 6:
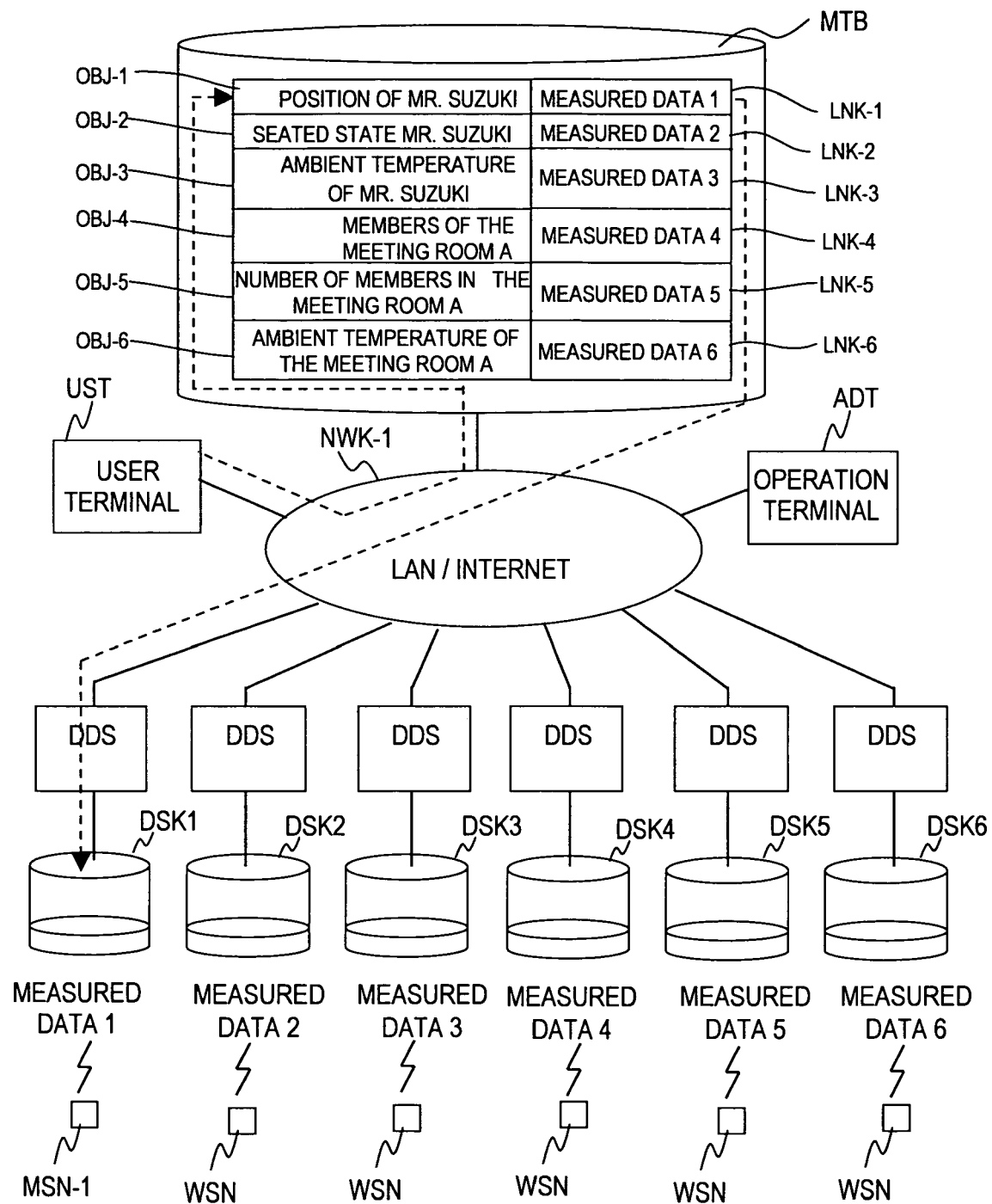
FIG. 6 is a block diagram showing a relation between objects and measured data of the sensor nodes at the time of starting measurement.
Figure 7:
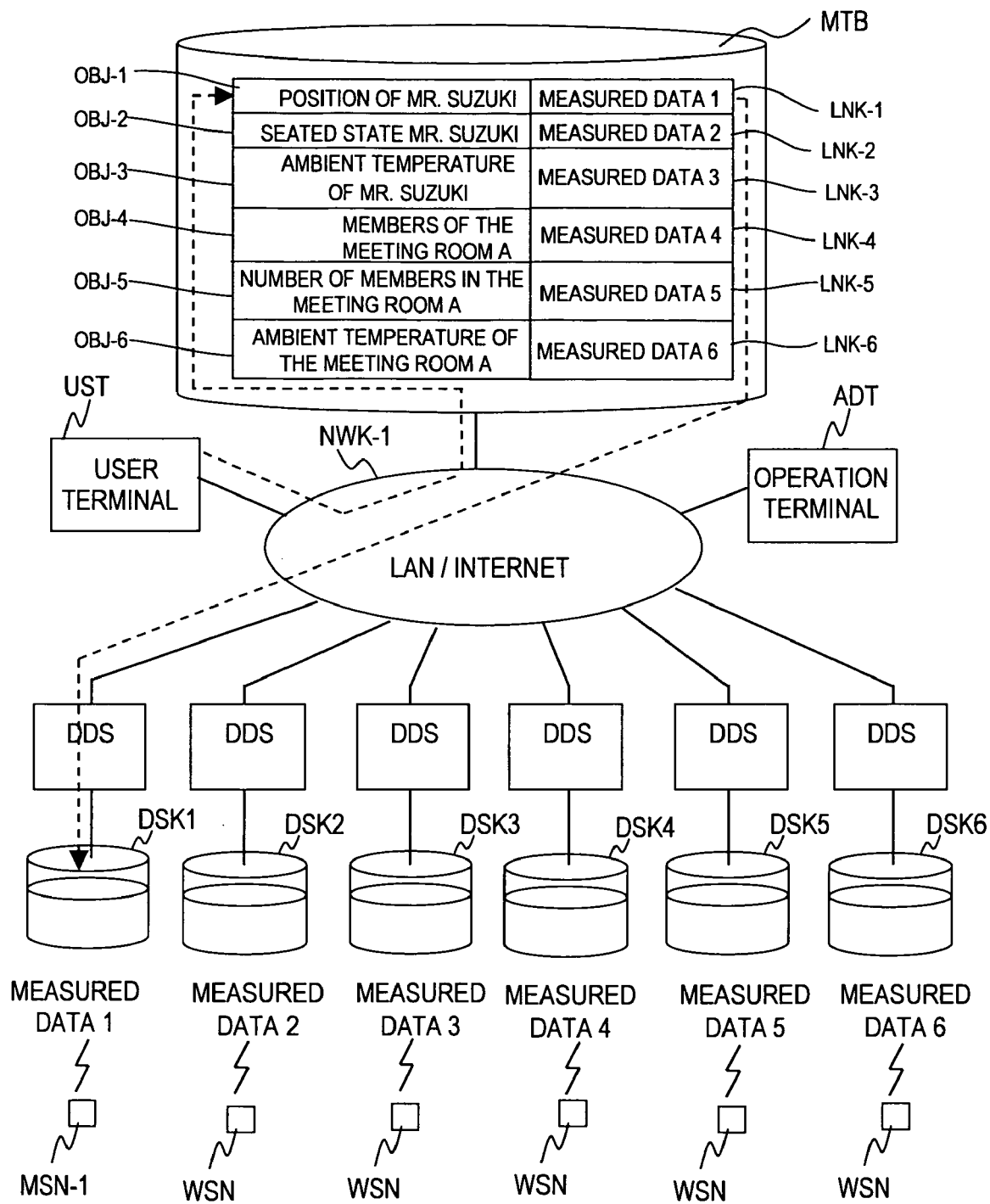
FIG. 7 is a block diagram showing a relation between objects and measured data of the sensor nodes after a predetermined time has elapsed from the start of measurement.

FIG. 6 is a block diagram of a relation between a specific object of a real-world model and measured data of the sensor node, showing the time of starting measurement, and FIG. 7 shows a state after a predetermined time has elapsed from a state of FIG. 6.

In FIG. 6, the directory server DRS first generates the following object as a real-world model, and defines it in the real-world model list MDL of the real-world model table MTB. It is presumed that SUZUKI is shown as an employee using the office or the meeting room A or B of FIG. 5, and this person has the wireless sensor node MSN-1 shown in FIG. 6.

As shown in a sensor information table STB of FIG. 12, a sensor information table is set so that measured data (e.g., temperature) or position information of each sensor node MSN can be held in the distributed data processing server DDS designated as a data link pointer. In this case, the position information of the sensor node MSN can be obtained as ID information of the base station BST to detect the sensor node MSN.

In the real-world model list MDL of the real-world model table MTB, for an object (OBj-1) which is a position of SUZUKI, presence of a data substance in a data link pointer of measure data 1 (LINK-1) is defined, and correspondence between the real-world model and actual data position is managed.

In other words, in the real-world model list MDL, the object which is the position of SUZUKI (OBJ-1) is related to a data area of the distributed data processing server DDS corresponding to the measured data 1 (LINK-1). In FIGS. 6 and 7, position information (e.g., defined as "information of currently connected base station BST") from the wireless sensor node MSN-1 indicating the position of SUZUKI is held in the disk system DSK 1 of the distributed data processing server DDS.

From the side of the user terminal UST, a value of the position of SUZUKI (OBJ-1) seems to be present in the real-world model table MTB of the directory server DRS. However, actual data is held not in the directory server DRS but in the preset disk system DSK of the distributed data processing server DDS.

An object which is a seated state of SUZUKI is defined in the real-world table MTB so that seating information obtained from a pressure switch (MSN-0) arranged in chairs of an office can be held in the measured data 2 (LINK-2). In addition, the distributed data processing server DDS and a data area corresponding to the measured data 2 are defined. In FIGS. 6 and 7, the seating information from the MSN-1 or wireless sensor nodes WSN is held in the disk system DSK of the distributed data processing server DDS.

An object which is a temperature of SUZUKI is defined in the real-world table MTB so that a temperature measured by the temperature sensor SSR-1 of the wireless sensor node MSN-1 can be held in measured data 3 (LINK-3). In addition, the distributed data processing server DDS and a data area corresponding to the measured data 3 are defined. In FIGS. 6 and 7, the temperature from the MSN-1 is held in the disk system DSK of the distributed data processing server DDS.

An object which is a member in the meeting room A (OBJ-4) is defined so that a name of an employee obtained from information of the wireless sensor node MSN received by the base station BST-1 of the meeting room A can be held in measured data 4 (LINK-4). Even when the pressure switches (WSN-3 to 10) are not used, instead of these, the number of members in the meeting room A may be obtained based on the number of wireless sensor nodes MSN detected by the base station BST-1 of the meeting room A within a certain unit of time. In addition, the distributed data processing server DDS and a data area corresponding to the measured data 4 are defined. In FIGS. 6 and 7, personal information of each employee from the wireless sensor node is held in the disk system DSK of the distributed data processing server DDS.

An object which is the number of members in the meeting room A (OBJ-5) is defined in the real-world model table MTB so that the number of members in the meeting room A obtained from the pressure switches (WSN-3 to 10) or the number of wireless sensor nodes MSN detected by the base station BST-1 of the meeting room A can be held in measured data 5 (LINK-5). In addition, the distributed data processing server DDS and a data area corresponding to the measured data 5 are defined. In FIGS. 6 and 7, seating information of the wireless sensor nodes WSN-3 to 10 is held in the disk system DSK of the distributed data processing server DDS.

An object which is a temperature in the meeting room A (OBJ-6) is defined in the real-world table MTB so that a temperature measured by the wired sensor node FSN-1 can be held in measured data 6 (LINK-6). In addition, the distributed data processing server DDS and a data area corresponding to the measured data 6 are defined. In FIGS. 6 and 7, the temperature from the FSN-1 is held in the disk system DSK of the distributed data processing server DDS.

In other words, each object OBJ defined in the real-world model table MTB holds the data link pointer (LINK) corresponding to the measured data, and target data appears to be present in the directory server DRS from the side of the user terminal UST. However, actual data is held in the distributed data processing server DDS.

In the information holding place (data link pointer) LINK, a holding position of data to be used by the user, such as data measured by the sensor node or secondary data obtained by converting the measured data into a format to be used by the user, is set. Collection of the measured data from the sensor nodes is carried out by each distributed data processing server DDS. When an event action is set as described below, the measured data can be processed to be held as secondary data in a predetermined distributed data processing server DDS.

Collection and processing of data from the actual sensor nodes are carried out by the distributed data processing server DDS, and the directory server DRS manages the real-world model, the data link pointer, the sensor node definition, or the like.

Accordingly, without any need to know a location of the sensor node, the user of the user terminal UST can obtain desired data corresponding to a measured value (or secondary data) of the sensor node by retrieving the object OBJ.

The directory server DRS manages the data link pointer (linking destination) of each object OBJ, and the actual data is held and processed in the distributed data processing server DDS. Thus, even when the number of sensor nodes is enormous, it is possible to prevent excessive loads on the distributed data processing server DDS. In other words, it is possible to suppress excessive traffic load in the network NWK-1 interconnecting the directory server DRS, the distributed data processing server DDS, and the user terminal UST.

In FIG. 7 of the state after the predetermined time has elapsed from the state of FIG. 6, actual measured data from the sensor nodes are written in the disk systems DSK 1 to 6 of the distributed data processing server DDS-1, and the amount of data increases with time.

On the other hand, in the case of the data link pointers LINK-1 to 6 corresponding to the objects OBJ-1 to 6 set in the model list of the real-world model table MTB of the directory server DRS, the amount of information does not change with time, but contents of information indicated by the data link pointers LINK-1 to 6 are changed.

Figure 8:
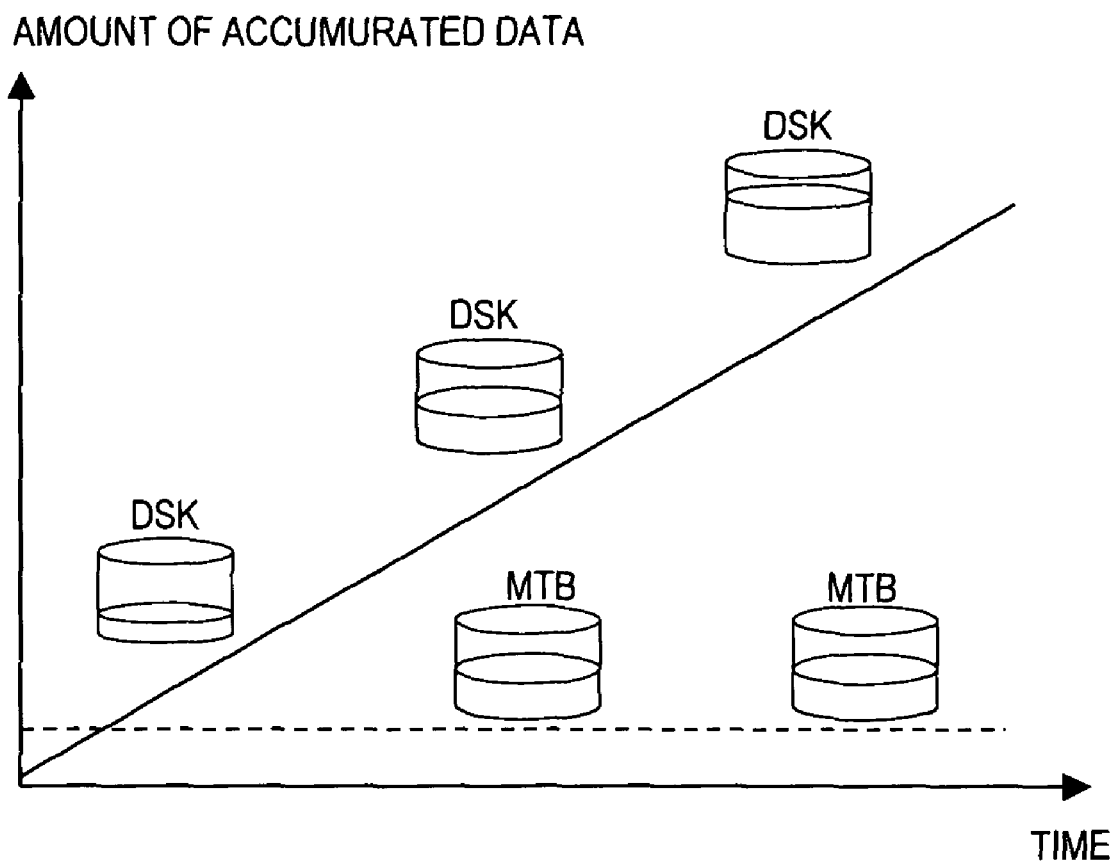
FIG. 8 is a graph showing a relation between data amounts of the object and measured data of the sensor node and time.

In other words, as shown in FIG. 8, in a relation between the amounts of information of the objects OBJ-1 to 6 managed by the directory server DRS and the data amounts and time of the measured data 1 to 6 managed by the distributed data processing server DDS-1, the data amounts of the objects are constant while the measured data increase with time.

For example, when several hundreds of sensor nodes are connected to one base station BST-1, several base stations BST are connected to one distributed data processing server DDS, and several tens of distributed data processing servers DDS are connected to one directory server DRS, the total number of sensor nodes becomes several thousands to several tens of thousands. If each sensor node sequentially transmits data per minute, a hundred to a thousand measured data are sent to the distributed data processing server DDS per second. When the distributed data processing server DDS judges that an event occurs, the corresponding action is performed such as notification or data processing. If event-action processing is performed in one or a few servers, loads on the servers themselves or loads on the network for connection with the servers become extremely large. Further, as the collected or processed data are accessed from the user terminal UST, loads on the servers or loads on the network become larger when data is supplied to the user terminal UST.

Thus, the following process sharing is desirable between the directory server DRS, which receives access from the user terminal UST and manages the data link pointer of the sensor node, and the distributed data processing server DDS, which manages the plurality of base stations BST, and collects and processes data from the sensor nodes assigned to the base stations BST.

In other words, the pieces of information from the sensor nodes are load-balanced to the plurality of distributed data processing servers DDS to be collected, and the distributed data processing servers DDS hold or process the data to load-balance data collection and processing of many sensor nodes. Accordingly, it is possible to prevent concentration of processing loads on a specific server.

On the other hand, the directory server DRS manages the data link pointers of the pieces of information obtained from the sensor nodes in a concentrated (unified) manner, and provides a correlation between the object and the data link pointer LINK to the user terminal UST. Even without knowing a physical position or the like of the sensor node, the user can obtain sensing information from a data holding position by making an inquiry about a target object to the directory server DRS. In other words, because of the concentrated management of the data link pointers of the pieces of information by the directory server DRS, irrespective of a location of the sensor node, the user terminal UST can obtain measured data or secondary data regarding the target sensor node by inquiring the directory server DRS.

The directory server DRS converts data obtained from the distributed data processing server DDS into information to be understood by the user to provide it to the user terminal UST based on the attribute interpretation list ATL.

The object held in the directory server DRS is set/changed according to a configuration of a system to be built, but is not changed with time as in the case of the measured data detected by the sensor node. Accordingly, the portion that manages the objects in a concentrated manner is not affected by a time-based load fluctuation from the measured data. Thus, as direct transfer of the data of the sensor node with the distributed data processing server DDS is suppressed, it is possible to suppress an excessive load applied on the network NWK-1.

FIGS. 6 and 7 show the case where the disk systems DSK are connected to the different distributed data processing servers DDS. However, as shown in FIG. 5, one distributed data processing server DDS may be installed, a plurality of disk systems DSK may be disposed therein, or virtualized one disk systems DSK may be formed on a plurality of distributed data processing servers DDS.

<Relation Between Measured Data and Event>

Next, referring to FIGS. 9 and 10, a relation between measured data collected by the distributed data processing server DDS and event actions based on the measured data will be described.

Figures 9, 10:
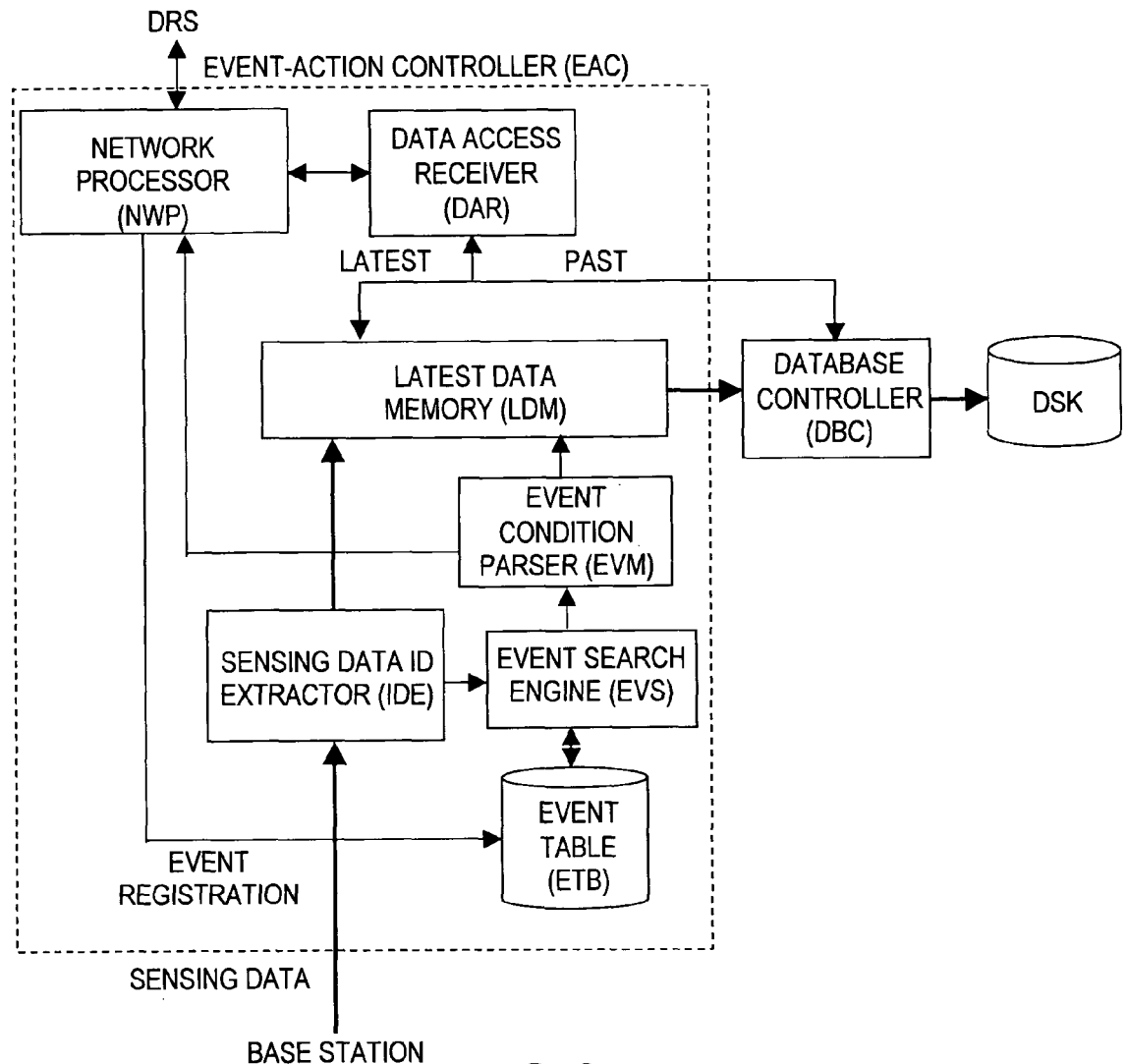
FIG. 9 is a block diagram showing an event-action controller of a distributed data processing server DDS.
FIG. 10 is an explanatory diagram of an event table.

In FIG. 9, the event-action controller EAC of the distributed data processing server DDS includes an event table ETB for correlating the measured data collected from the base stations BST with events.

As shown in FIG. 10, in the event table ETB, one entry includes data ID (corresponding to ID of FIG. 12 and data ID of FIG. 14) assigned to the sensor nodes and given to the measured data, EVT which are event generation judging conditions regarding the measured data, and a data holder DHL for deciding whether or not to hold the measured data in the database DB. The data ID to be used should enable identification of a data generation source in the sensor network system.

For example, regarding measured data whose data ID is "XXX", event generation is notified to the directory server DRS when its value is larger than A1. The measured data whose data ID is "XXX" is set to be written in the disk system DSK for each data arrival. The holding in the disk DSK is based on setting in an action section of the event table ETB.

In the distributed data processing server DDS, the measured data received from the base station BST is first received by the sensing data ID extractor (sensing data monitor) IDE, and data ID which is ID given to the measured data is extracted. The sensing data ID extractor IDE sends the measured data to the latest data memory LDM.

The extracted data ID is sent to the event search engine EVS. Retrieval is carried out in the event table ETB. When there is an entry matching the data ID, event contents EVT of the entry and the measured data are sent to the event condition parser EVM.

The event condition parser EVM compares a value of the measured data with the event contents EVT, and notifies event generation from the network processor NWP to the directory server DRS through the network NWK-1 when the conditions are satisfied. In addition, the event condition parser EVM transmits a data holder DHL request to the latest data memory.

The DB controller DBC receives data where the data holder DHL of the event table ETB is YES from the latest data memory LDM to write it in the disk system DSK.

When the network processor NWP receives a measured data reference request from the directory server DRS, the distributed data processing server DDS sends an access request to the data access receiver DAR.

If the access request is latest data, the data access receiver DAR reads the measured data corresponding to data ID included in the access request from the latest data memory LDM and return it to the network processor NWP. Alternatively, if the access request is past data, the data access receiver DAR reads the measured data corresponding to data ID included in the access request from the disk system DSK and return it to the network processor NWP.

Thus, the distributed data processing server DDS holds latest data among the data of the sensor nodes collected from the base stations BST in the latest data memory LDM, and records data, which is expected to be referred to later, in the disk system DSK. It is also possible to record the data in the disk system DSK only when the event is generated to save unnecessary disc space consumption. By this method, it is possible to manage the plurality of base stations BST (in other words, many sensor nodes) at one distributed data processing server DDS.

<Details of System Manager NMG and Model Manager MMG>

<System Manager NMG>

Figure 11:
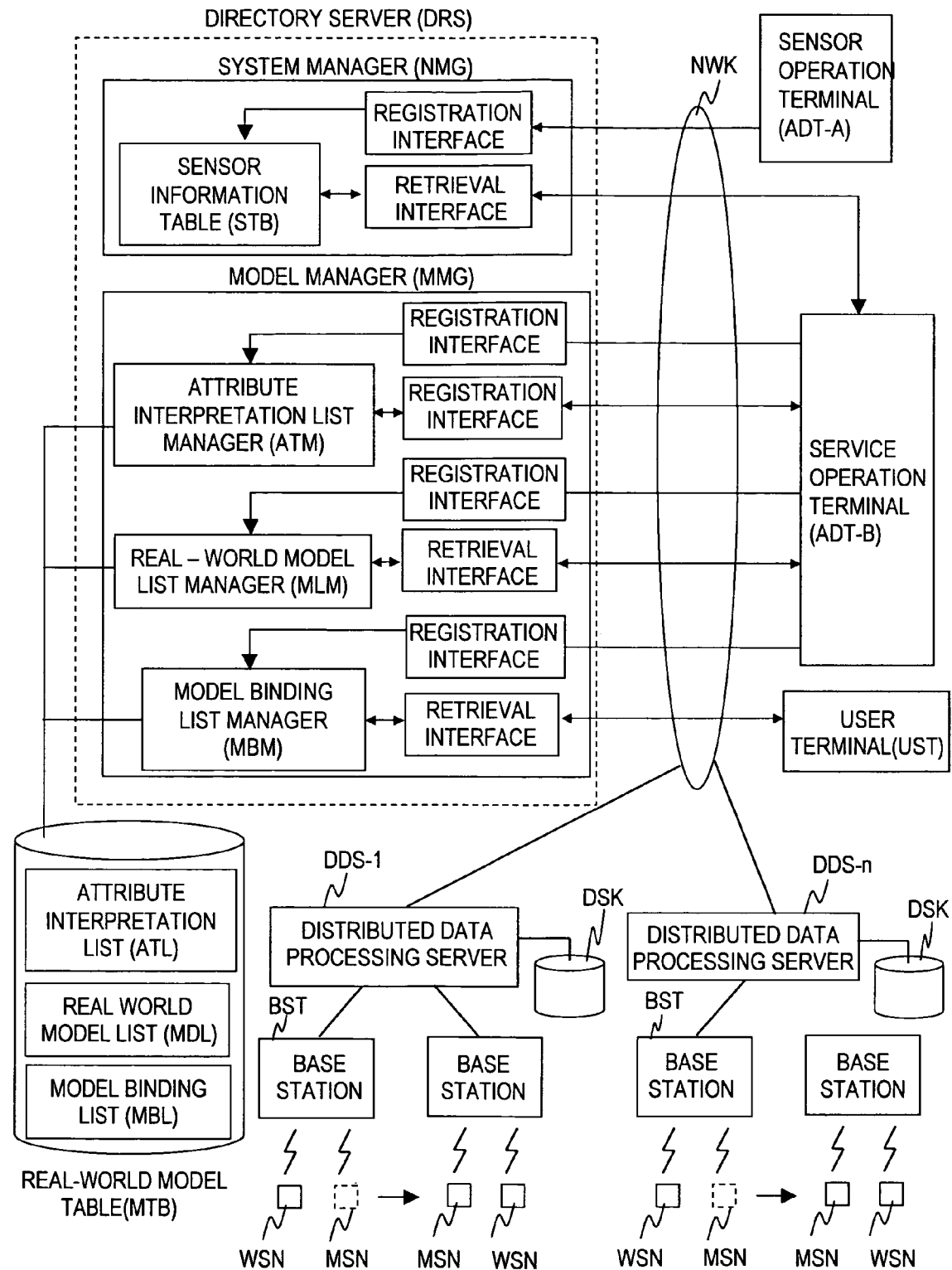
FIG. 11 is a block diagram showing main portions of a directory server DRS.

FIG. 11 shows the system manager NMG, the model manager MMG, and the real-world model table MTB of the directory server DRS shown in FIG. 2.

The system manager NMG of the directory server DRS includes a sensor information table STB for managing the sensor nodes, a registration interface for registering/changing the sensor nodes in the sensor information table STB, and a retrieval interface for retrieving contents of the sensor information table STB. In this case, it is presumed that the sensor information table STB is managed by a sensor operation terminal ADT-A.

As shown in FIG. 12, in the sensor information table STB, one entry includes data ID preassigned for each sensor node, a sensor type indicating a type of a sensor node, a meaning indicating a sensing target of a sensor node, contents of a measured value measured by a sensor node, an installation place indicating a location (or target) of installing a sensor node, an observation interval indicating a cycle at which the sensor node detects a measured value from a sensing target, and a data link pointer indicating a data area of measured data (holding position in each of the distributed data processing servers DDS-1 to n). ID to identify a sensor node is managed as an index of each entry.

For example, for a name tag type sensor node having data ID assigned to the MSN-1, a measuring target is a place (position) of the sensor node, a measuring cycle is every 30 seconds, and a data link pointer of measured data is the distributed data processing server DDS-1. Similarly, for a sensor node having another data ID assigned to the FSN-1, a measuring target is an ambient temperature, a measuring cycle is every 60 seconds, and measured data is held in the distributed data processing server DDS-2.

This sensor information table STB is set from the sensor operation terminal ADT-A. The sensor manager, the service manager, or the distributed data processing server DDS can retrieve a function and a position of the sensor node and a data link pointer of the measured data by referring to the sensor information table STB.

As described below, when a given distributed data processing server receives measured data from an external sensor node, an action is generated to refer to the sensor information table STB of the directory server DDS from the received data ID, and to transfer the measured data to the distributed data processing server DDS which becomes a data link pointer. Accordingly, since position information and the measured data of the external sensor node can be transferred to the distributed data processing server DDS to which the sensor node belongs, even when the position of the sensor node is changed, it is always possible to track the position information and the measured data from the same distributed data processing server DDS.

When a cycle at which the sensor node measures data is not constant, as in the case of a seating sensor of data ID=WSN-1 of the sensor node of FIG. 12, an observation interval is set to "EVENT", whereby only when the sensor detects a specific state, this state is notified to the distributed data processing server DDS irrespective of the sensing cycle.

<Model Manager MMG>

Next, the model manager MMG and the real-world model table MTB shown in FIG. 11 will be described.

The real-world model table MTB managed by the model manager MMG includes an attribute interpretation list ATL for interpreting a meaning of measured data of a sensor node, a real-world model list MDL indicating a correlation between model names of the objects OBJ-1 to n shown in FIG. 6 and actual address of sensing information, and a model binding list MBL indicating a correlation among the objects OBJ-1 to n.

To manage the respective lists of the real-world model table MTB, the model manager MMG includes an attribute interpretation list manager ATM for managing the attribute interpretation list ATL, a real-world model list manager MDM for managing the real-world model list MDL, and a model binding list manager MBM for managing the model binding list MBL. Each manager includes a registration interface for registering/changing the lists, and a retrieval interface for retrieving each list.

In this case, it is presumed that the real-world model table MTB is managed by the service manager who uses a service operation terminal ADT-B. In FIG. 11, the sensor operation terminal and the service operation terminal may share the same operation terminal ADT as shown in FIG. 1.

The user terminal UST that uses the sensor network retrieves an object OBJ from a desired list through the retrieval interface of each list.

Return values (measured values) from the sensor nodes WSN, MSN, and FSN and secondary data converted by the distributed data processing server DDS cannot be understood as they are by the user of the user terminal UST (hereinafter, referred to simply as "user"). Accordingly, the attribute interpretation list ATL managed by the attribute interpretation list manager ATM includes tables for converting output values of the sensor nodes into understandable information as shown in FIG. 13. The tables of FIG. 13 are preset corresponding to the objects OBJ-1 to n.

In FIG. 13, a name table ATL-m corresponds to the position of SUZUKI OBJ-1 shown in FIG. 6, and a personal name compliant with a return value (measured value) from the sensor data MSN-1 from the sensor node whose sensor type is a name tag corresponds to a meaning section as shown in FIG. 12.

In FIG. 13, a location table ATL-p indicates a position of an employee wearing a name tag, and a name of a place corresponding to a return value (e.g., ID of base station to which the sensor node is connected) corresponds to the meaning section. For example, when a return value is 01, it means that a place is an office.

A seating table ATL-s of FIG. 13 indicates a seated state of a chair in the office or the meeting room A shown in FIG. 5. This table is provided for each chair (each of the wireless sensor nodes WSN-3 to 10) to hold seated states (present or absent) according to return values (measured values) of the wireless sensor nodes WSN-3 to 10. For example, when a return value is 00, it indicates a present (seated) state. When a return value is 01, it indicates an absent state.

Similarly, a temperature table ATL-t of FIG. 13 indicates a value of the temperature sensor (FSN-1, 2) shown in FIG. 5, and a function f(x) for converting a return value (measured data of the temperature sensor) into a temperature y is held in the meaning section.

In FIG. 13, a number-of-member table ATL-n indicates the number of employees in the meeting room A, and the number of members corresponding to a return value (the number of seated chair sensors in the meeting room A, or the number of mobile nodes MSN in the meeting room A) corresponds to the meaning section.

Thus, the attribute interpretation list ATL defines meanings of measured data, and each table is set corresponding to each object.

Figure 14:
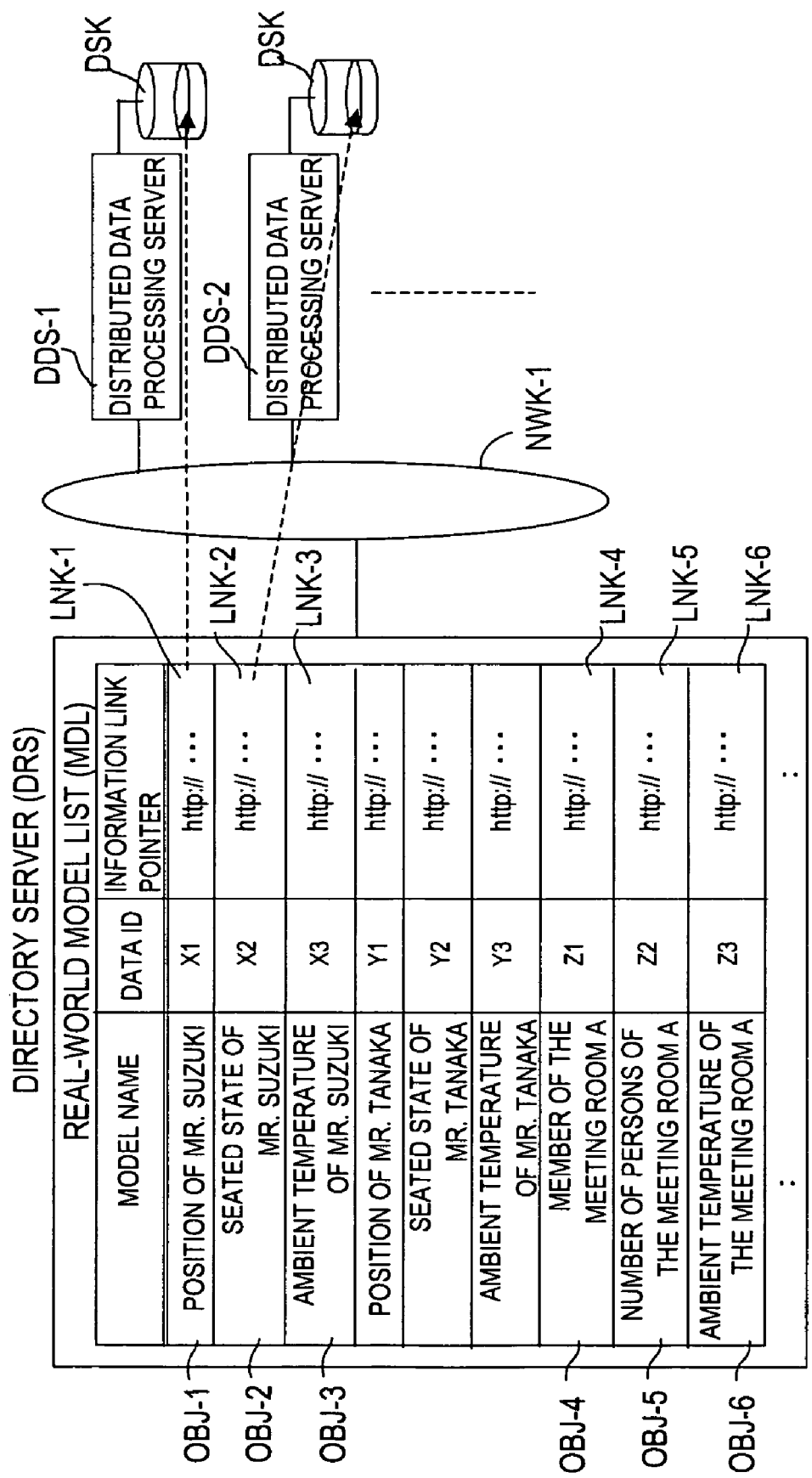
FIG. 14 is a block diagram showing a relation between a real-world model list and the distributed data processing server DDS.

Referring to FIG. 14, the real-world model list MDL is preset by the service manager or the like, and a position of information corresponding to a model name set for each object is held in an information link. In other words, pairs of model names, information link, and data ID constitute the real-world model list MDL.

The directory server DRS manages sensing information understandable by the user based on the model list MDL, and a location of this sensing information is set to one of the distributed data processing servers DDS-1 to n. Accordingly, for the object OBJ defined in the model list MDL, a location of a sensing information substance is set in the information link. The information link is preset by the service manager or the like. Similarly, the data ID takes a value corresponding to sensor data (data directly obtained from the sensor node or data obtained by processing) which is a base of an object value.

In FIG. 14, for example, an information link LINK-1 is held for the position of SUZUKI OBJ-1, URL or a path is held in the information link. When this object is retrieved from the user terminal UST, sensing information (substance of the object) can be obtained from the information link.

For example, when a keyword is transmitted from the user terminal UST to the search engine SER of the directory server DRS, a list of model names including the keyword among the model names of the model list MDL is sent back from the search engine SER. The user who operates the user terminal UST can selects a desired model name, and the directory server DRS first obtains data corresponding to the information link from the distributed data processing server DDS set in the information link LINK.

The directory server DRS converts the obtained data into information understandable by the user based on the obtained attribute interpretation list ATL, and then transmits the information to the user terminal UST.

Accordingly, the user can obtain necessary information in a recognizable way even without knowing specifics of each sensor node or its location.

At the distributed data processing server DDS, all the data collected from the sensor nodes do not necessarily need to be converted into formats to be understood by the user for each collection. Thus, it is possible to greatly reduce a load on the distributed data processing server DDS which collects/manages data of many sensor nodes. This data conversion process is carried out by the directory server DRS when necessary on a user request. Accordingly, execution of an unnecessary conversion process can be prevented, and resources of the sensor network can be used without any wastes.

The model binding list indicating the correlation among the objects OBJ-1 to n integrates related information for elements common among the objects OBJ of the real-world model list MDL.

Figure 15:
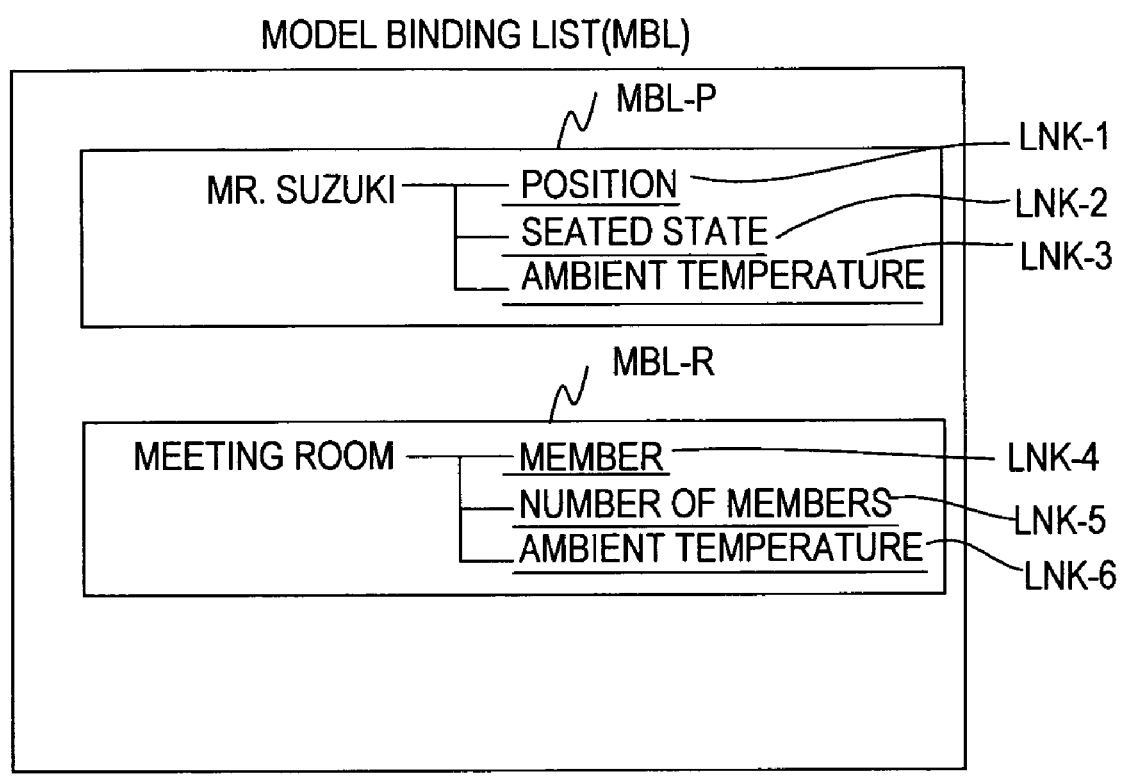
FIG. 15 is an explanatory diagram of a model binding list.

Referring to FIG. 15 which shows an example of the model binding list MBL, objects concerning "PERSONAL NAME" ("SUZUKI" of the drawing) and "MEETING ROOM A" are extracted as common elements from the objects OBJ of the real-world model list MDL. For example, as objects OBJ concerning the personal name "SUZUKI" registered in the meaning section of the name table ATL-m of the attribute interpretation list ATL of FIG. 13, there are a position OBJ-1, an in-office own chair seated state OBJ-2, and a temperature OBJ-3. Linking destinations of the objects concerning the personal name SUZUKI are set to "POSITION" LINK-1, "SEATED STATE" LINK-2, and "TEMPERATURE" LINK-3 in a tree shape, thereby constituting a model binding list MBL-P regarding the persons' name.

Similarly, in the real-world model list MDL seen from the element of the meeting room A, there are objects OBJ-4 to 6 of "MEMBER", "NUMBER OF MEMBERS", and "TEMPERATURE", and information linking destinations LINK-4 to 6 of objects concerning a place of the meeting room A are set to "MEMBER", "NUMBER OF MEMBERS", and "TEMPERATURE" in a tree shape, thereby constituting a model binding list MBL-R regarding the meeting room A.

Thus, the model binding list MBL correlates pieces of different information regarding common elements among the objects elements in the real-world model list MDL. The correlation of the model binding list MBL is preset by the service manager or the like.

<Operation of Model Manager MMG>

Next, an operation of the sensor network system will be described.

<Registration of Sensor Node>

First, referring to FIGS. 16 and 17, a procedure of registering sensor nodes will be described. The sensor manager installs a sensor node in a predetermined place or human, and then registers the sensor node in the directory server DRS according to a time chart of FIG. 16.

Figures 16, 17:
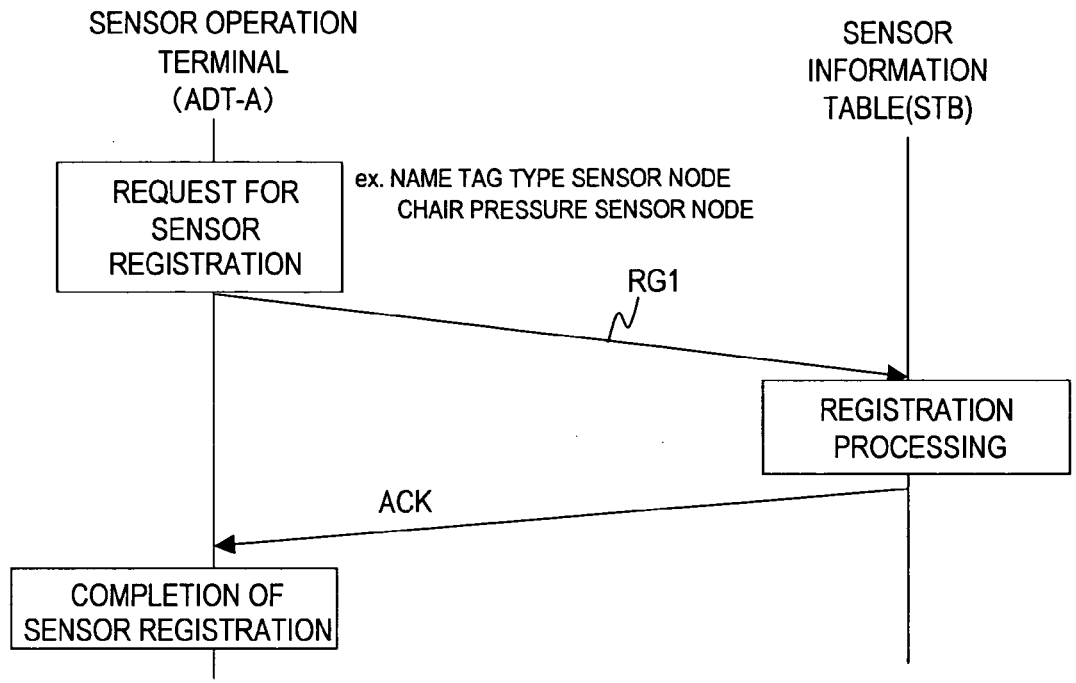
FIG. 16 is a time chart showing a situation of sensor information registration.
FIG. 17 is a diagram showing a data format for sensor node registration.

In FIG. 16, first, the sensor manager connects with the directory server DRS from the sensor operation terminal ADT-A to load the registration interface of the system manager NMG. Then, the sensor manager sets data ID, a sensor type, an attribute, a measured value, an installation place, an observation interval, and a data holding place from the sensor operation terminal ADT-A according to a data format shown in FIG. 17, and transmits a registration request to the system manager NMG of the directory server DRS (RG-1).

Upon reception of the registration request, the system manager NMG of the directory server DRS adds information of the sensor node of the registration request in the sensor information table STB shown in FIG. 12. Then, the system manager NMG assigns data ID to the newly added sensor node. The data ID of the sensor node may be assigned from the sensor manager ADT-A.

The system manager NMG assigns a data link pointer of measured data of the sensor node of the registration request to the distributed data processing server DDS designated as a data link pointer when necessary, and then completes one entry of the sensor information table STB.

Subsequently, the system manager NMG returns a completion notification (ACK) indicating the addition of the new entry to the sensor operation terminal ADT-A to finish the registration process.

When instructed to add a new sensor node from the directory server DRS, the distributed data processing server DDS sets presence or absence of new data ID, event conditions, and data holding in the event table of FIG. 10.

The distributed data processing server DDS that has received the registration notification of the sensor node from the directory server DRS instructs a base station BST relevant to "INSTALLATION PLACE" of FIG. 17 to detect measured values from the sensor node at a predetermined observation interval for the sensor node of relevant data ID. The instructed data ID and the observation interval are registered in the sensor manager SNM of the base station BST.

Accordingly, the new sensor node communicates with the base station BST to which it belongs, whereby this sensor node can transmit measured data to the distributed data processing server DDS to which it belongs.

Through the process, the distributed data processing server DDS completes new registration of an internal sensor node, and measured data of predetermined data ID are collected by the distributed data processing server DDS.

<Definition of Object>

Next, referring to FIG. 18, a process of setting a relation between measured data of sensor nodes and objects regarding the sensor nodes registered in the directory server DRS shown in FIGS. 16 and 17 will be described. This process is carried out by the service manager of the sensor network.

Figure 18:
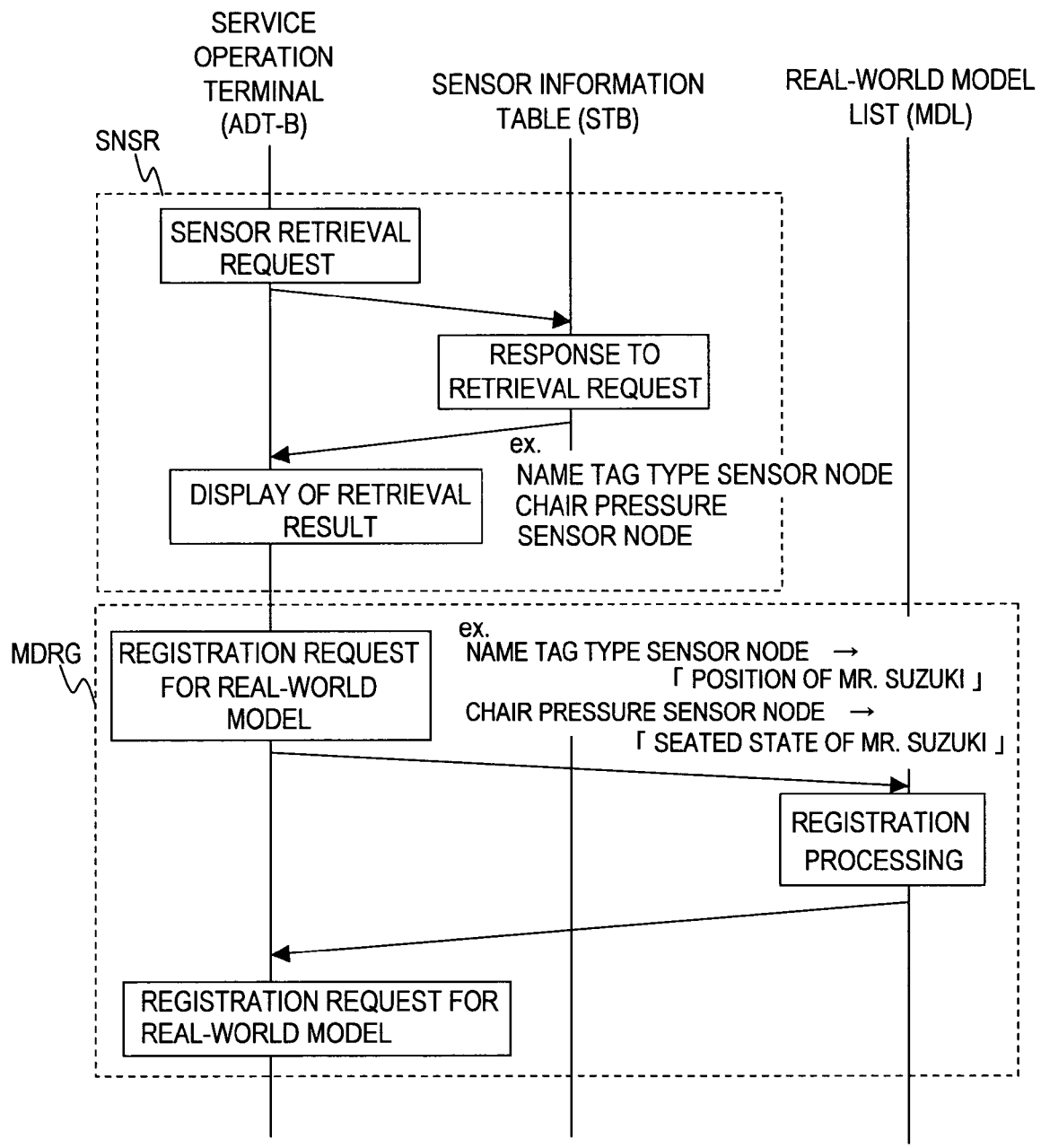
FIG. 18 is a time chart showing a situation of registration of the real-world model list.

In FIG. 18, the service manager connects with the directory server DRS from the service operation terminal ADT-B to load the retrieval interface of the system manager NMG. Then, the service manager retrieves a desired sensor node based on data ID or the like, and returns a sensor node matching retrieval conditions to the service operation terminal ADT-B.

The service operation terminal ADT-B outputs a result of the sensor node retrieval received from the system manager NMG to a display unit (not shown) or the like.

The service manager selects a desired sensor node from the sensor nodes displayed in the service operation terminal ADT-B, designates an object to be correlated with measured data of this sensor node, and registers it in the model manager NMG of the directory server DRS.

For example, as an object of a name tag type sensor node (MSN-1 of FIG. 5) of data ID=MSN-1 of the sensor information table STB shown in FIG. 12, an object OBJ-1 of "POSITION OF SUZUKI" is registered. By this registration, a real-world model list (MDL) indicating a relation between an object and its information link shown in FIG. 14 is created.

In the model manager MMG, for the object OBJ-1 of "POSITION OF SUZUKI", information regarding a location of the distributed data processing server DDS-1 is set as a data link pointer of ID of the base station BST (in other words, position information of SUZUKI) which is a data value of data ID=MSN-1.

At the distributed data processing server DDS-1 correlated as the data link pointer of data ID=MSN-1 by the model manager MMG, an action is registered to hold received position information data (identifier of the base station BST) in the database DB of the distributed data processing server DDS-1 when the event-action controller EAC receives data of the data ID=MSN-1 indicating a position of SUZUKI.

Then, for a substance of the data "POSITION OF SUZUKI" held in the database DB of the distributed data processing server DDS-1, a data link pointer corresponding to the object OBJ-1 of the real-world model list MDL is set.

For an object OBJ-2 of "SEATING OF SUZUKI", the model manager MMG indicates to hold a measured value of the wireless sensor node WSN-0 including the pressure switch as the sensor SSR in the distributed data processing server DDS-1. Specifically, regarding the measured value of the wireless sensor node WSN-0 indicating seating of SUZUKI, a measured value "00" indicating ON of a seated state, or a measured value "01" indicating OFF of a seated state, is written in the database DB of the distributed data processing server DDS-1.

At the distributed data processing server DDS-1, an action is registered so that the event-action controller EAC executes a process of writing "00" or "01" (each equivalent to ON/OFF) in the database DB of the processing server DDS-1 as a measured value of the sensor node WSN-0.

Then, as in the above case, for substance of the data "SEATING OF SUZUKI" held in the database DB of the distributed data processing server DDS-1, a data link pointer corresponding to the object OBJ-2 of the real-world model list MDL is set.

Accordingly, the object (data link pointer) set by the model manager MMG and the position of the distributed data processing server DDS for actually holding information are set.

As shown in FIG. 14, the model manager MMG generates the object OBJ-1 of "POSITION OF SUZUKI", and holds the model name, the data ID, and the data link pointer in the real-world model list MDL. Upon completion of the object registration, the model manager MMG transmits a completion notification to the service operation terminal ADT-B.

The service operation terminal ADT-B displays the received object generation completion notification, and repeats the process to generate desired objects when more objects are generated.

<Definition of Model Binding List>

Next, referring to FIG. 19, description will be made of setting of a model binding list MBL indicating a correlation among the plurality of objects OBJ-1 to n after generation of a plurality of objects based on a definition of the model list MDL.

Figure 19:
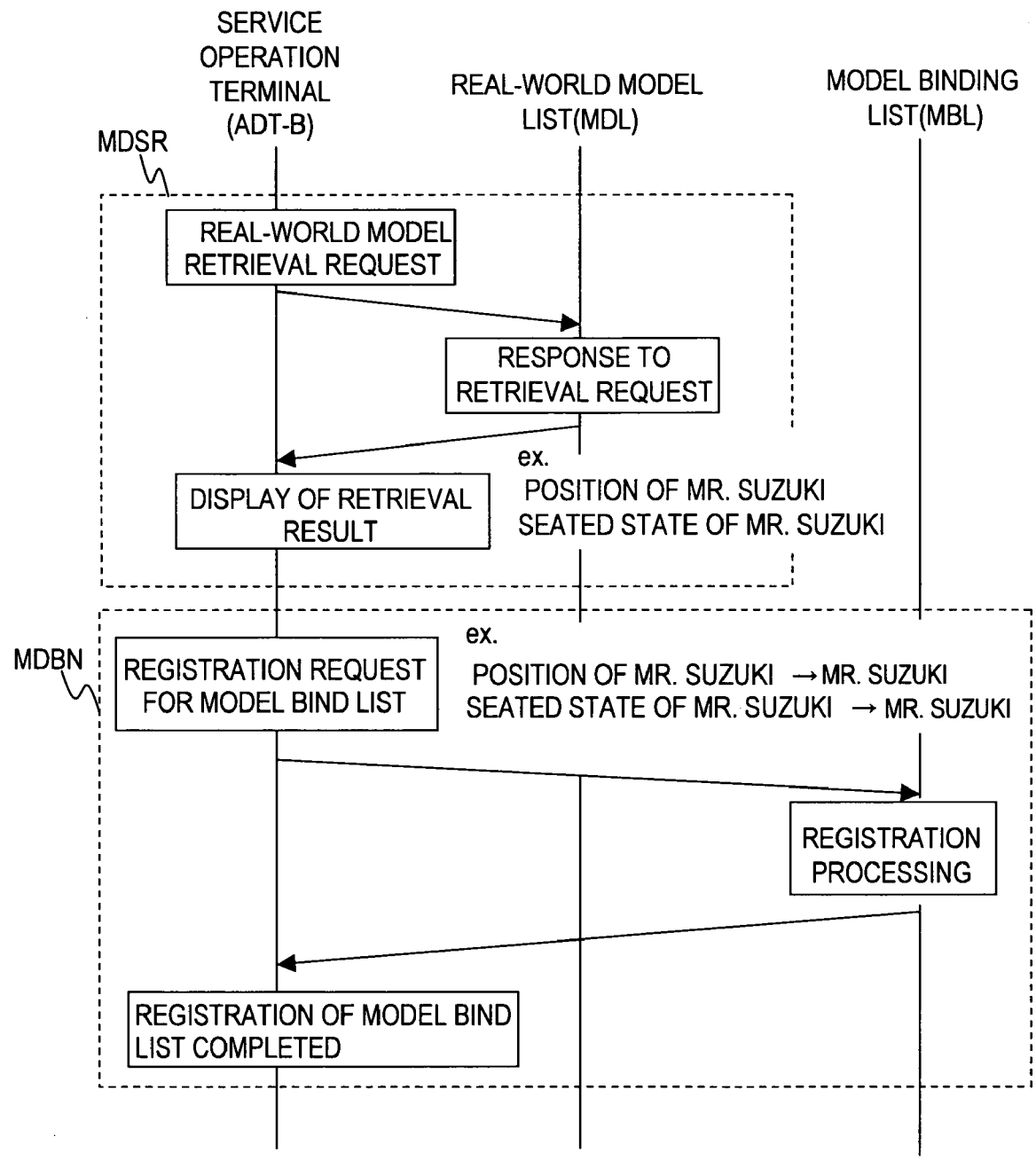
FIG. 19 is a time chart showing a situation of registration of the model binding list.

In FIG. 19, the service manager connects with model manager MMG of the directory server DRS from the service operation terminal ADT-B to load the retrieval interface of the model manager MMG. Then, the service manager retrieves a desired object, and returns an object matching retrieval conditions to the service operation terminal ADT-B.

The service operation terminal ADT-B outputs a result of the sensor node retrieval received from the model manager MMG to a display unit (not shown) or the like.

The service manager requests the model manager MMG of the directory server DRS to select a desired object from the objects displayed in the service operation terminal ADT-B and to generate an element common among the objects as a model binding list.

For example, as shown in FIG. 15, a personal name of "SUZUKI" is generated as a model binding list MBL-P, and objects such as a position of SUZUKI OBJ-1, a seated state of SUZUKI OBJ-2, and a temperature of SUZUKI OBJ-3 are correlated in the model binding list MBL-P.

The model manager MMG correlates the model binding list MBL-P and data link pointers of the objects OBJ-1 to 3 together to hold them in the model binding list MBL.

Upon registration completion of the model binding list MBL, the model manager MMG transmits a completion notification to the service operation terminal ADT-B.

The service operation terminal ADT-B displays the received creation completion notification of the model binding list, and repeats the process to create desired model binding lists when more model binding lists are created.

<Retrieval of Model Binding List>

Next, referring to FIGS. 20 and 21, description will be made of an example of a process where the user of the sensor network uses the model binding list to refer to data of the sensor nodes based on the model binding list.

The user terminal UST connects with the search engine SER of the directory server DRS, and requests the model binding manager MBM to retrieve the model binding list MBL. For example, this retrieval request is made through keyword retrieval or GUI shown in FIG. 15.

The model binding manager MBM returns a result of the requested retrieval to the user terminal UST, displays a result of the model binding list matching the retrieval request in the display unit (not shown) or the like of the user terminal UST.

At the user terminal UST, the user selects an optional model binding list from the retrieval result to request information (STEP 110).

As shown in FIG. 15, the model binding list includes the linking destinations of the elements common among the objects OBJ in the tree structure. The user terminal UST selects one of the linking destinations displayed in the model binding list to make an information request to the distributed data processing server DDS of the linking destination.

The distributed data processing server DDS accesses measured data or secondary data requested by the user terminal UST, and returns a result of the accessing to the attribute interpretation list manager ATM of the directory server DRS.

At the directory server DRS, the attribute interpretation list manager ATM obtains a meaning with respect to the return value of the attribute interpretation list ATL shown in FIG. 13 from data ID of the measured data transmitted from the distributed data processing server DDS (STEP 112).

Next, the search engine SER of the directory server DRS returns a meaning corresponding to the measured data analyzed by the attribute interpretation list manager ATM to the user terminal UST. The user terminal UST displays the response from the directory server DRS in place of a return from the distributed data processing server DDS.

For example, when the linking destination LINK-1 of the model binding list of FIG. 15 is selected, accessing is made from the user terminal UST to the measured data of the distributed data processing server DDS-1 which is preset for the position of SUZUKI OBJ-1. For example, when the linking destination LINK-1 corresponds to the data link pointer of the sensor information table STB shown in FIG. 12, the distributed data processing server DDS reads the corresponding measured data of the wireless sensor node MSN and returns it to the directory server DRS.

The directory server DRS selects the location table ATL-p of the attribute interpretation list ATL from data attributes held together with data to obtain a meaning corresponding to the return value (measured data). In this case, with return value=02, information of the linking destination LINK-1 of the model binding list MBL-P is "MEETING ROOM A". Accordingly, a response with respect to the object OBJ-1 of "POSITION OF SUZUKI" of the model binding list MBL-P is converted from the measured data value "02" of the sensor node MSN-1 into information "MEETING ROOM A" before being displayed (or notified) in the user terminal UST. The embodiment shows the method of obtaining the data attributes together with the data. However, it is permitted to employ a method of designating attributes for the model at the time of registering the real-world model list MDL. In this case, it is only necessary to set a data link pointer and to designate an attribute beforehand in the distributed data processing server DDS which receives the data from the sensor node during sensor node registration.

Figure 20:
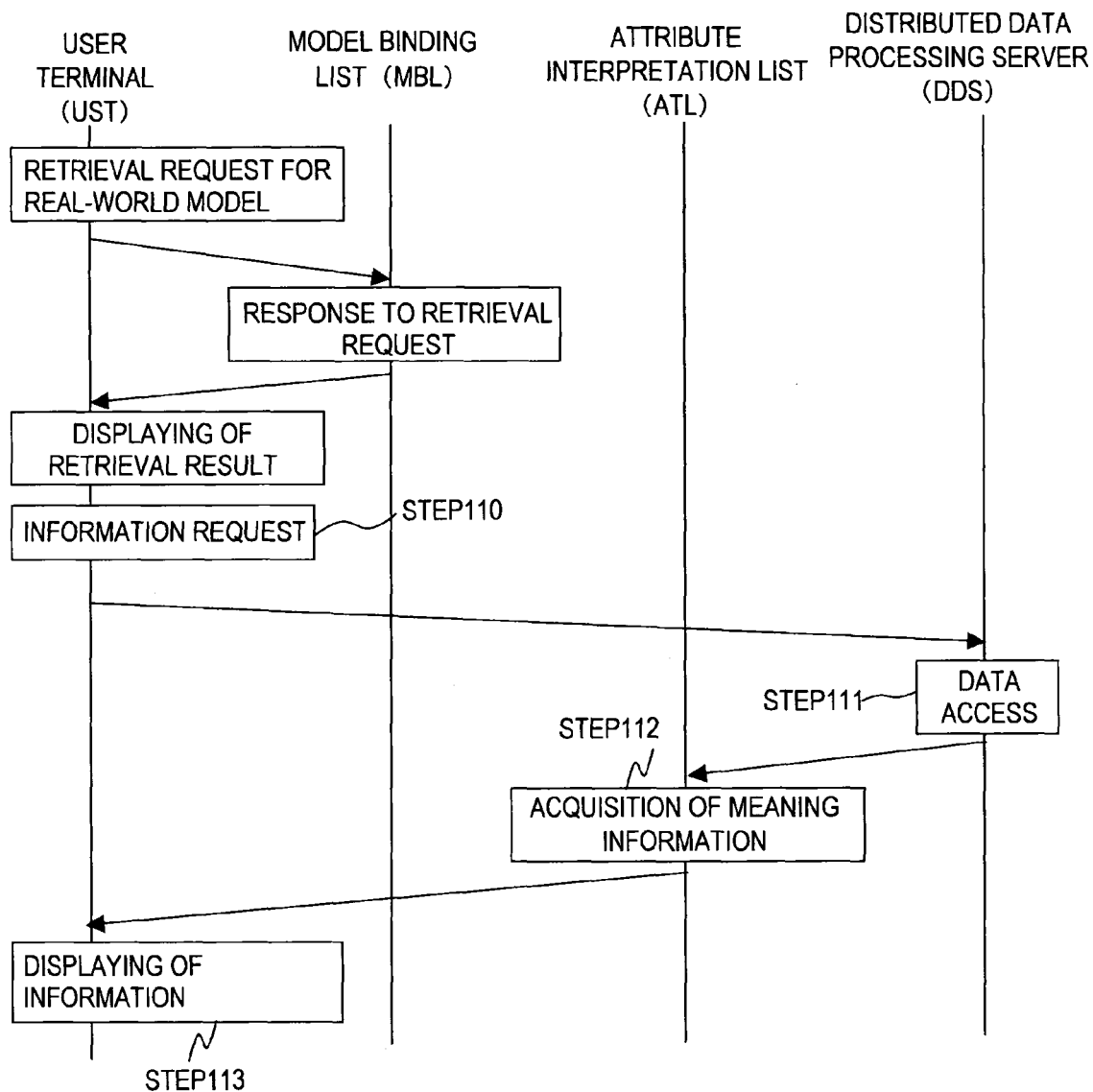
FIG. 20 is a time chart showing an example of a response to access to the model binding list.
Figure 21:
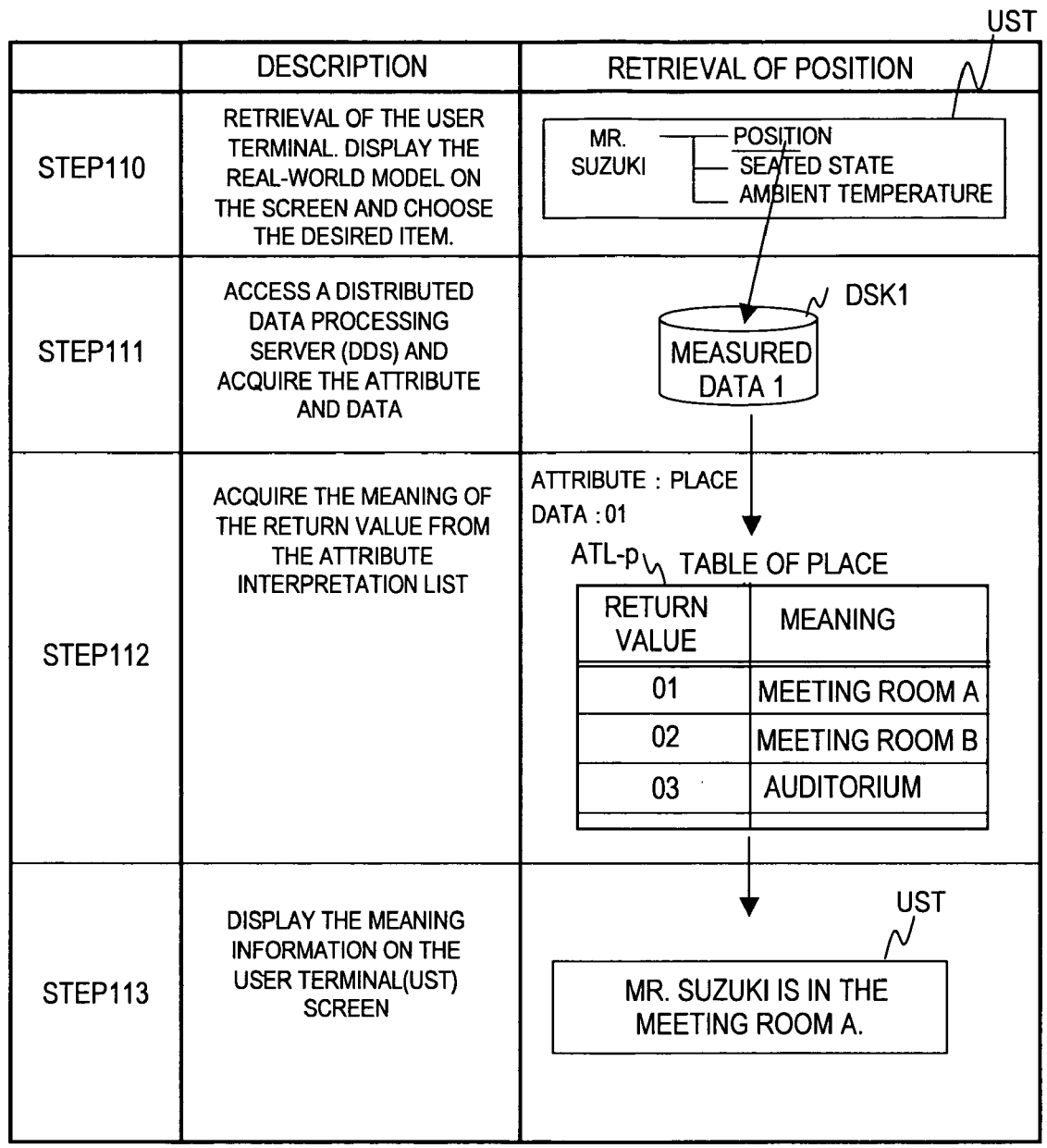
FIG. 21 is an explanatory diagram showing a process when a position of SUZUKI is designated from the model binding list.
Figure 22:
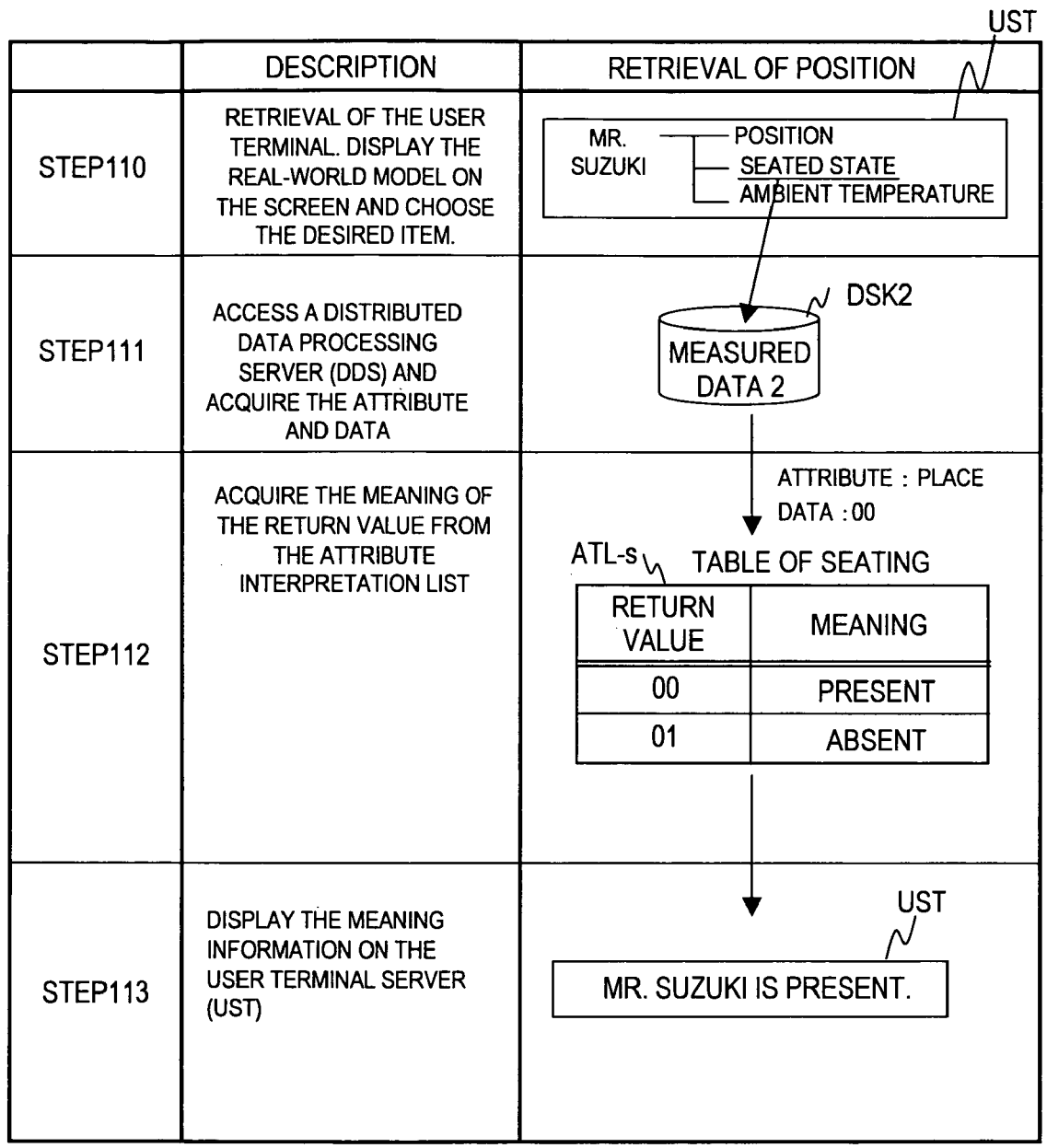
FIG. 22 is an explanatory diagram showing a process when a seated state of SUZUKI is designated from the model binding list.

FIG. 22 shows the process of FIG. 20 executed for the "SEATED STATE OF SUZUKI" LINK-2 of the model binding list MBL-P of FIG. 15. In this case, a return value "00" from each of the wireless sensor nodes WSN-3 to 10 is transmitted to the distributed sensor node DDS, then, return value="00" is interpreted as "PRESENT" in the attribute interpretation list manager ATM of the directory server DRS, and finally significant information of "SUZUKI IS PRESENT" can be returned from the search engine SER to the user terminal UST.

Figure 23:
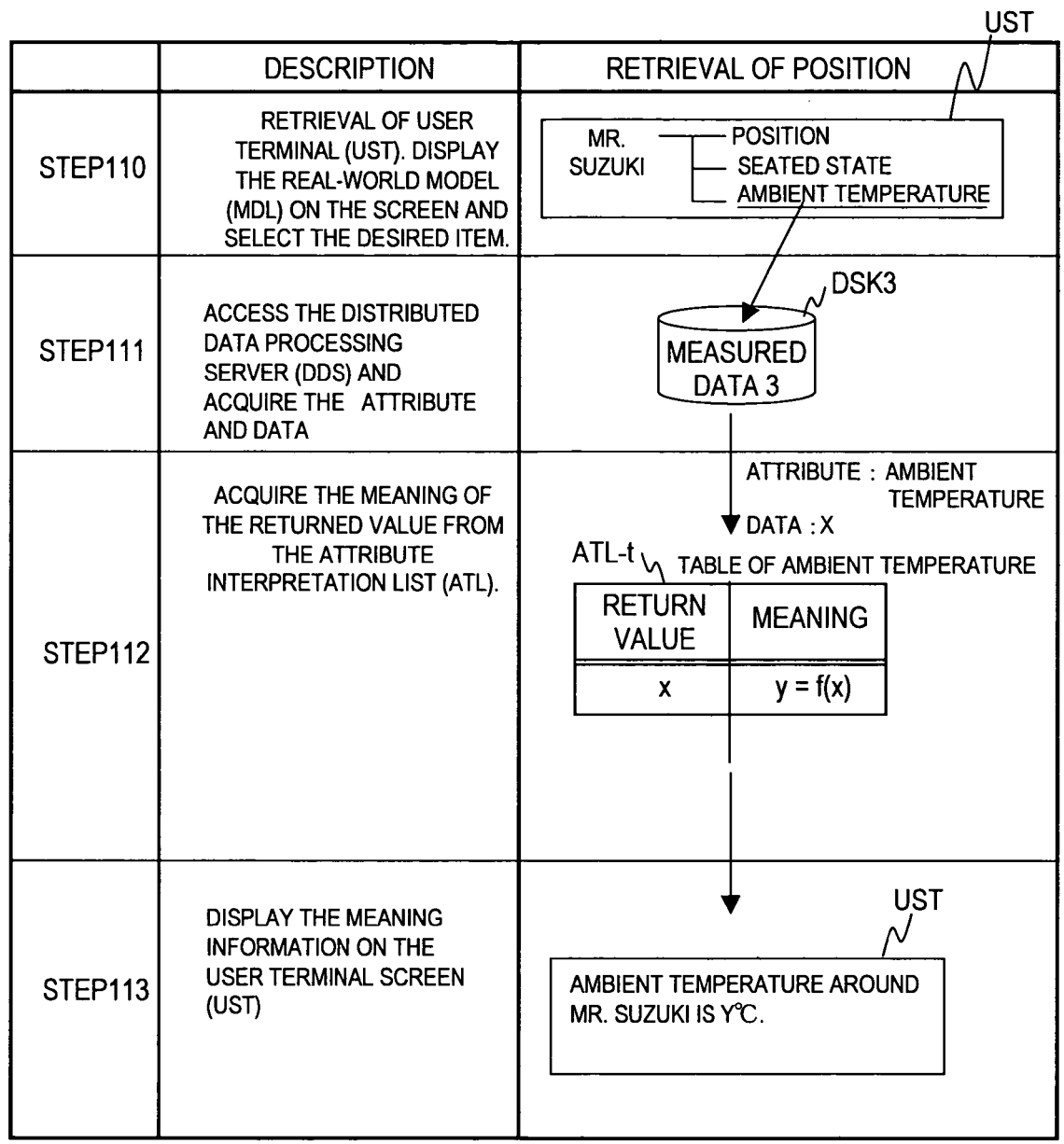
FIG. 23 is an explanatory diagram showing a process when a temperature of SUZUKI is designated from the model binding list.

FIG. 23 shows the process of FIG. 20 executed for the "TEMPERATURE OF SUZUKI" LINK-3 of the model binding list MBL-P of FIG. 15. In this case, a return value "x" from the sensor SSR-1 of the wireless sensor node MSN-1 is transmitted to the distributed data processing server DDS, then, return value=x is calculated with temperature $y=f(x)$ by the attribute interpretation list manager ATM in the directory server DRS, and sensing information of "AMBIENT TEMPERATURE OF SUZUKI IS y° C." is returned from the search engine SER to the user terminal UST.

Figure 24:
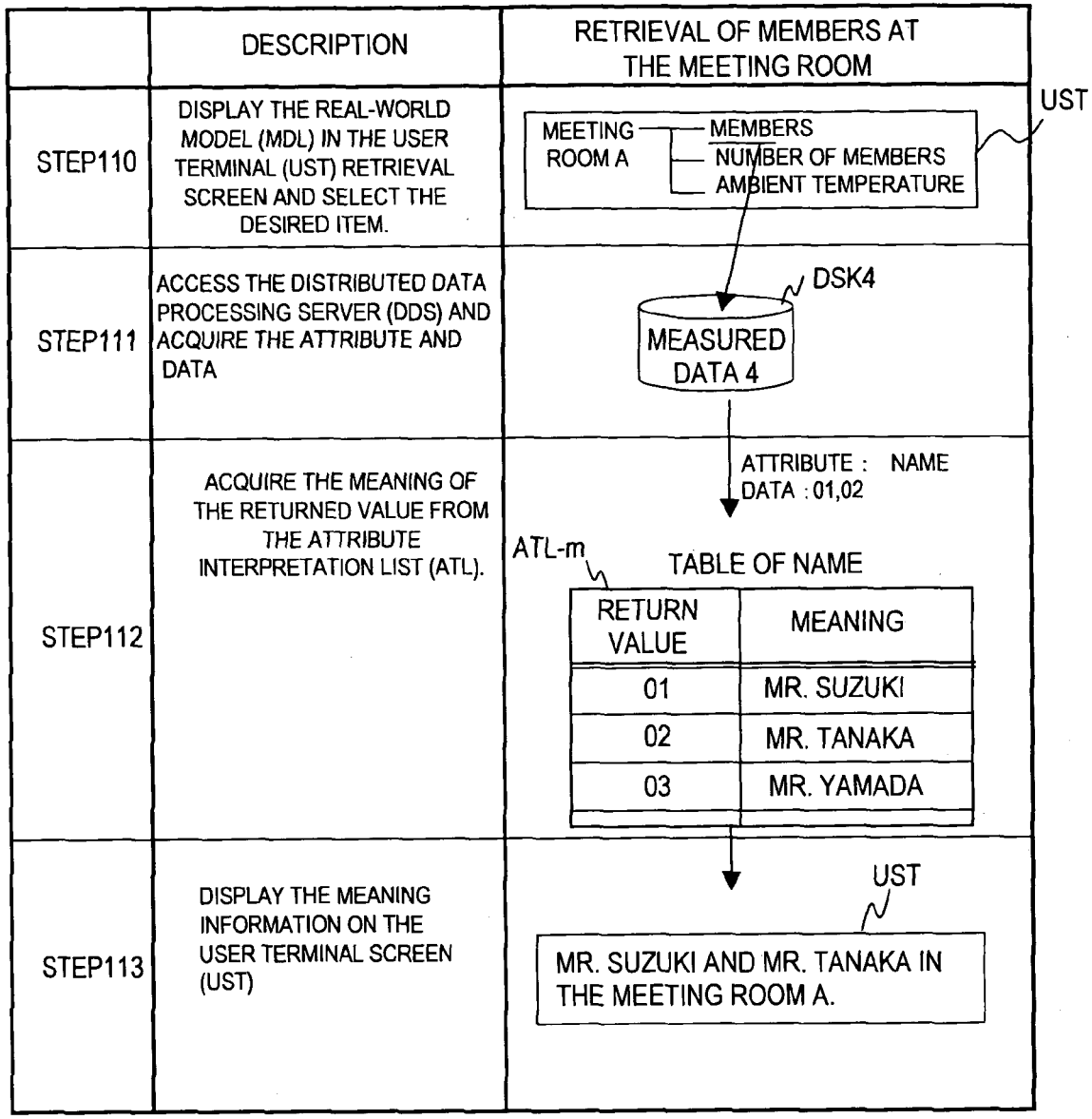
FIG. 24 is an explanatory diagram showing a process when a member in a meeting room A is designated from the model binding list.

FIG. 24 shows the process of FIG. 20 executed for the "MEMBER IN MEETING ROOM A" of the model binding list MBL-R in FIG. 15. In this case, when an object of a member OBJ-4 in the meeting room A is created by the model manager MMG, the wireless sensor node ID detected by the base station BST-1 equivalent to the meeting room A is transferred to a predetermined distributed data processing server DDS-1 as measured data. This value is then held in the information linking destination (distributed data processing server DDS-1) of FIG. 14, which is preset as the data link pointer.

The distributed data processing server DDS-1 collects ID's of the wireless sensor nodes MSN-1 to n from the base station BST-1 at a predetermined cycle to update a value indicating the member list in the meeting room A (set of ID's of the wireless sensor nodes). FIG. 24 shows detection of employees of ID tags "01" and "02" from the wireless sensor nodes MSN-1 to n collected by the distributed data processing server DDS-1.

The distributed data processing server DDS-1 transmits the secondary data "01 and 02" to the attribute interpretation list manager ATM in the directory server DRS.

The attribute interpretation list manager ATM in the directory server DRS converts the received secondary data into sensing information of 01=SUZUKI and 02=TANAKA from the predefined personal name table ATL-m before transmitting them to the user terminal UST.

As a result, the user terminal UST can obtain sensing information of "SUZUKI AND TANAKA ARE IN MEETING ROOM A" as a reply to the request of "the members in the meeting room A" defined in the model binding list MBL-P.

FIG. 25 shows the process of FIG. 20 inquiring for the "NUMBER OF MEMBERS IN MEETING ROOM A" defined in the model binding list MBL-R of FIG. 15. In this case, when an object of a number of members OBJ-5 in the meeting room A is created by the model manager MMG, the number of members in the meeting room A, more specifically ID of the name tag node detected by the base station BST-1 equivalent to the meeting room A is transferred to a predetermined distributed data processing server DDS-1 at every predetermined cycle. This value is then held in the information linking destination of FIG. 14 preset as the data link pointer of the object OBJ-5.

The distributed data processing server DDS-1 collects the number x of ID's of the wireless sensor nodes MSN-1 to n from the base station BST-1 at a predetermined cycle, then calculates and updates a value y ($y=x$ in the embodiment) indicating the number of members in the meeting room A. The distributed data processing server DDS-1 transmits the calculated value y to the attribute interpretation list manager ATM in the directory server DRS.

The attribute interpretation list manager ATM of the directory server DRS converts the received secondary data into significant information of the number of members $y=x$ from the predefined table of the number of members ATL-n before transmitting it from the search engine SER to the user terminal UST.

As a result, the user terminal UST can obtain significant information of "y MEMBERS ARE IN MEETING ROOM A" as a reply to the information request of "the number of members in the meeting room" defined in the model binding list MBL-P.

<Action Controller>

Figure 26:
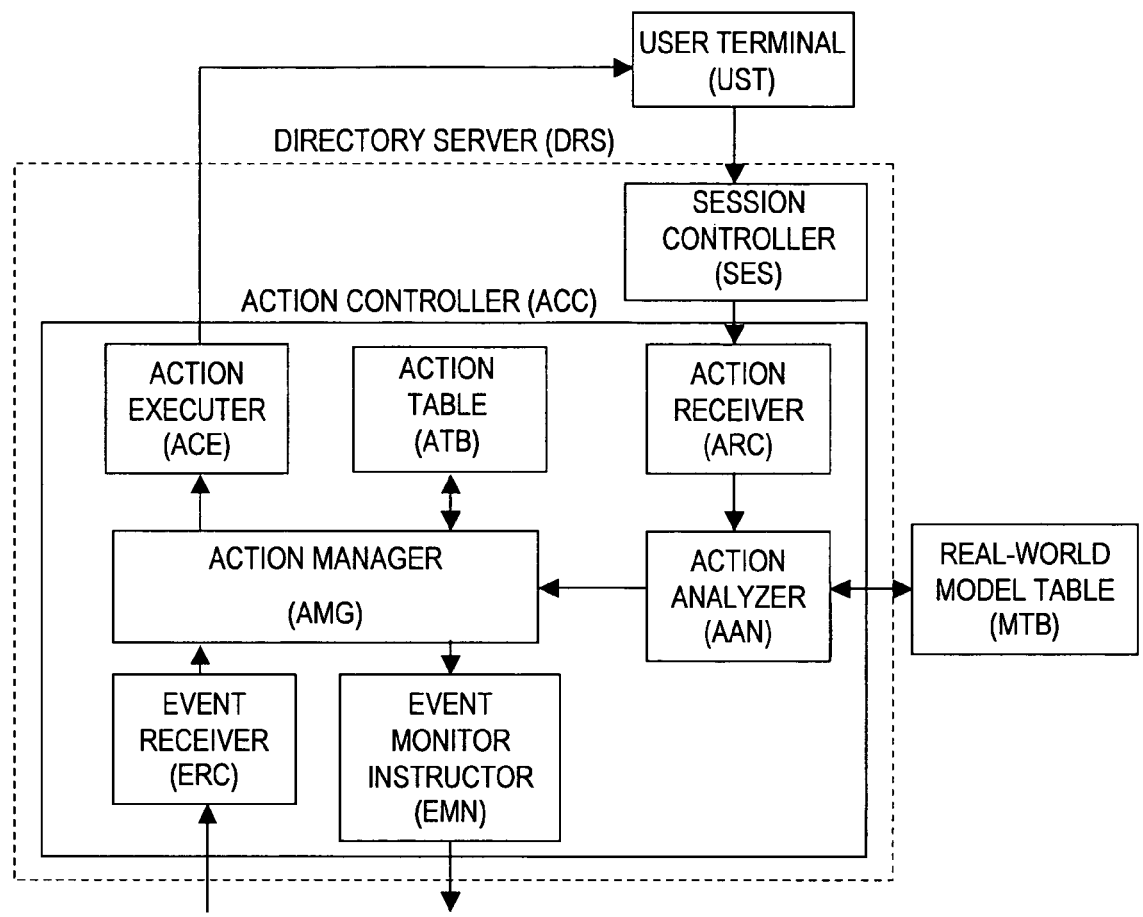
FIG. 26 is a block diagram showing an action controller ACC of the directory server DRS.

FIG. 26 is a block diagram showing the action controller ACC in the directory server DRS in detail.

The action controller ACC automatically performs a preset operation (action) based on an event generation notification received from each of the event-action controllers EAC in the plurality of distributed data processing servers DDS.

The action controller ACC includes an action receiver ARC for receiving action setting from the user terminal UST through the session controller SES, an action analyzer AAN for analyzing a received action to set function (or load) sharing among the directory server DRS and the distributed data processing server DDSs according to a result of the analysis, an action manager AMG for managing definition and execution of an action, an action table ATB for holding a relation between an event and an action according to a setting request from the user terminal UST, an event monitor instructor EMN for sending a command to the distributed data processing servers DDS-1 to n to monitor an event defined in the action table ATB, an event receiver ERC for receiving an event notification generated in each of the distributed data processing servers DDS-1 to n, and an action executer ACEC for executing a predetermined operation based on the received event and the correspondent definition in the action table ATB.

Figure 27:
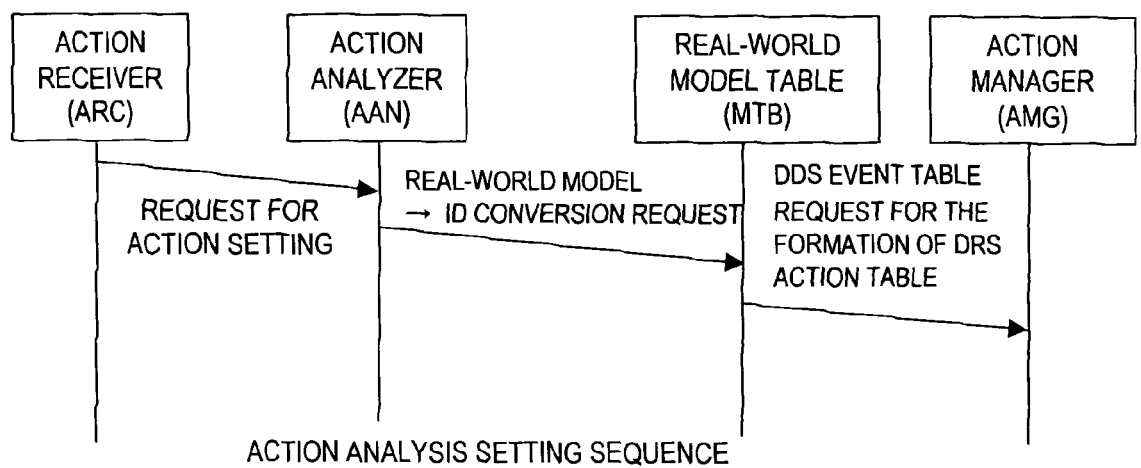
FIG. 27 is a time chart showing a registration flow of an event/action.

Referring to a time chart of FIG. 27, action registration will be described. In FIG. 27, first, the user (or service manager) connects with the action controller ACC in the directory server DRS from the user terminal UST or the like to request action setting. As an exemplary action, as shown in FIG. 28, setting of an action to monitor seating of X and to transmit a pop-up notification to the user terminal UST having IP address: A will be considered.

Upon reception of the action setting request, the action receiver ARC in the action controller ACC requests the action setting to the action analyzer AAN. For example, from the user terminal UST, the action analyzer AAN selects data ID of a monitoring target sensor node from a model name of a seated state of X in the real-world model list MDL, and decides a state of measured data of the sensor node to generate an event. In this case, to convert a real-world case of "SEATING OF X" into data ID of the sensor node, the real-world model list MDL and the attribute interpretation list ATL of the real world model table MTB are referred to retrieve a return value corresponding to a model "SEATING OF X" and a meaning of seating (present). In other words, a model name and a meaning to be understood by the user are converted into ID, a location and a return value of the sensor node.

As shown in FIG. 29, in the case of X=SUZUKI, a model has been defined in the real-world model table MTB, and thus data ID=X2 and a data link pointer (distributed data processing server DDS-1) for storing data are obtained from the lists MDL and ATL.

Next, to monitor event generation of "SEATING OF X" at the distributed data processing server DDS, the action manager AMG sends a command for monitoring the event generation of "SEATING OF X" to the distributed data processing server DDS which manages a sensor node as a data link pointer corresponding to the selected model name. Then, the action manager AMG sets an action of "TRANSMIT POP-UP NOTIFICATION TO USER TERMINAL UST OF IP ADDRESS: A" in the action table ATB shown in FIG. 31, and sets the data ID as ID of an event for executing the action.

Figure 30:
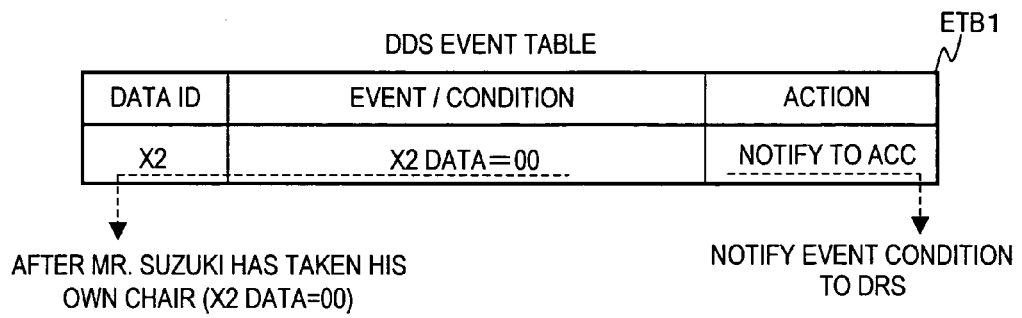
FIG. 30 is an explanatory diagram showing an entry of the event table of the distributed data processing server DDS.

As shown in FIG. 30, at the distributed data processing server DDS that has received the command from the action manager AMG of the directory server DRS, for data ID=X2 obtained from the real-world model list MDL, a condition "00" of seating obtained from the attribute interpretation list ATL, and the action controller ACC of the directory server DRS are registered in a notification destination of an event to be executed as an action. The notification to the directory server DRS is an action performed at the distributed data processing server DDS-1.

In other words, in the event table ETB of the distributed data processing server DDS shown in FIG. 30, an action is registered by setting data ID=X2 of the pressure sensor indicating "SEATING OF SUZUKI" in the data ID section and a value "00" of X2 data indicating seating in the event condition section, and to notify the action controller ACC of the directory server DRS in the action section in the distributed data processing server DDS-1.

Figure 31:
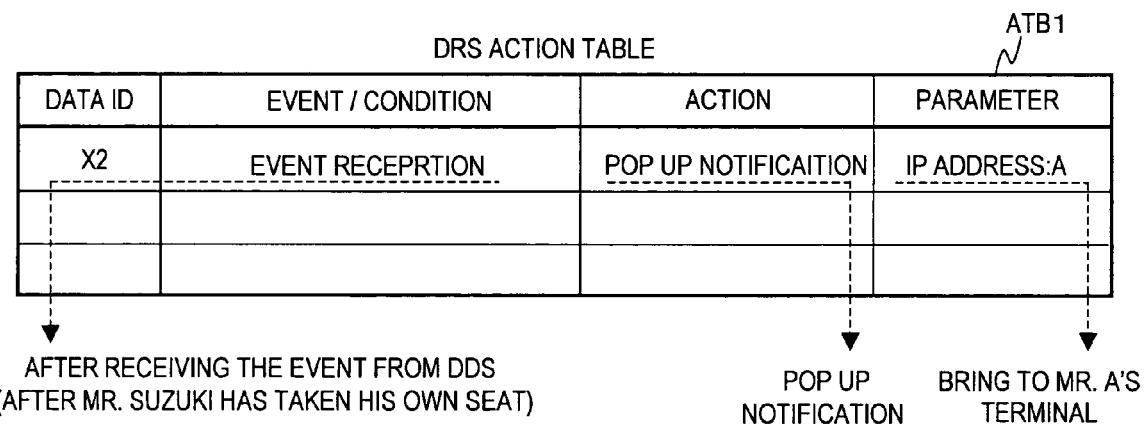
FIG. 31 is an explanatory diagram of an entry of the action table of the directory server DRS.

In the action table ATB of FIG. 31, data ID=X2 of the sensor node indicating "SEATING OF SUZUKI" is set in the data ID section indicating data ID of a monitoring target, reception of event generation from the distributed data processing server DDS-1 is set in the event condition section, pop-up notification to the user terminal UST is set in the section of actions executed by the directory server DRS, and an IP address indicating A of the user terminal UST is set in the action parameter section.

As shown in FIG. 31, for an action registered in the action table ATB of the action manager AMG, reception of an event of the data ID=X2 is set as an event condition, and an action of pop-up notification is executed with respect to the address (terminal of IP address A) described in the parameter section.

The action setting request screens of FIGS. 28 and 29 are provided by the action receiver ARC of the directory server DRS to the user terminal UST, the real-world model list MDL corresponds to a name pull-down menu, a pull-down menu of "SEATED", "IN CONFERENCE", and "WENT HOME" corresponds to the attribute interpretation list ATL, and actions executed by the directory server DRS are set in a pull-down menu of "POP-UP" and "MAIL".

Figure 32:
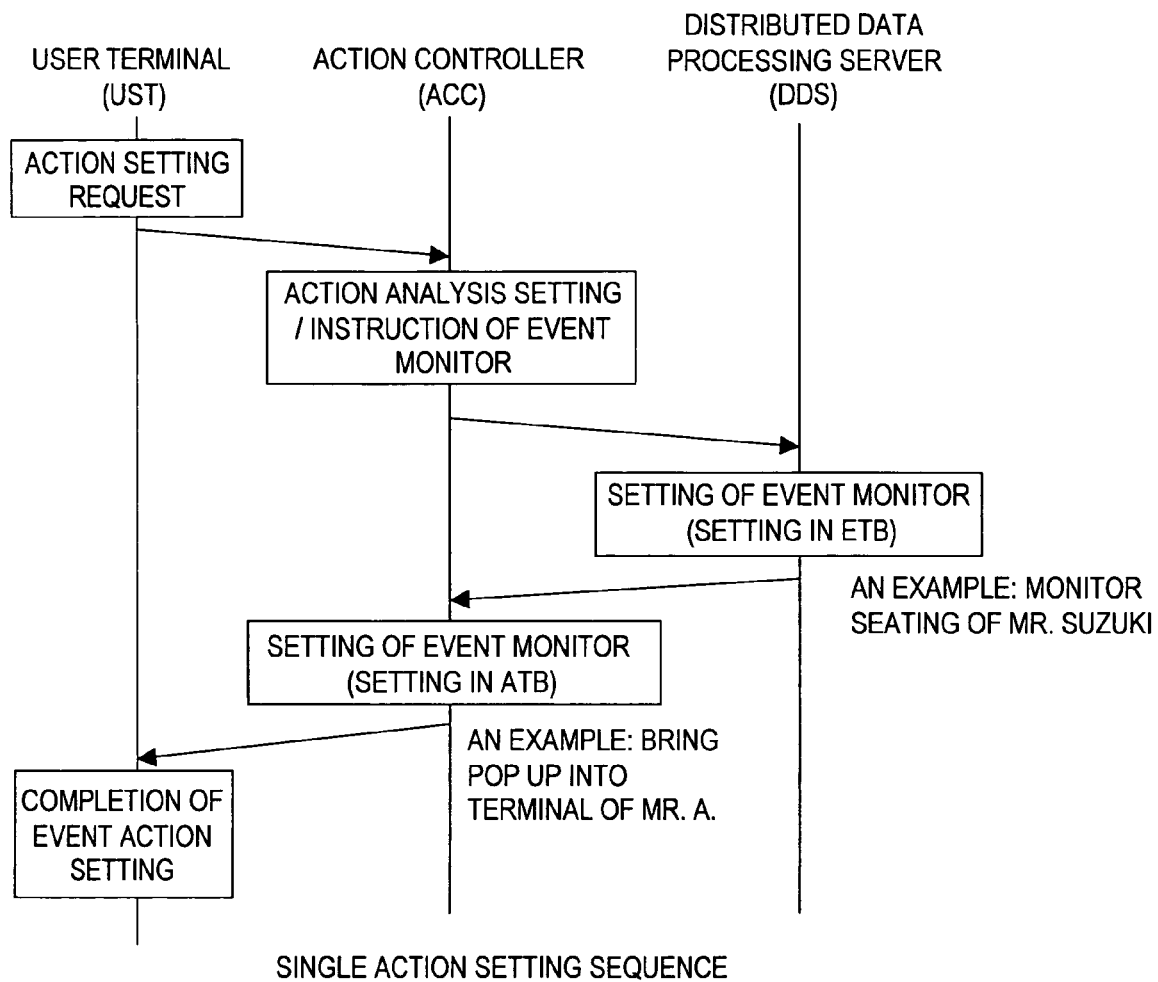
FIG. 32 is a time chart showing a setting flow of a single action.

As described above, one action executed from one event is set as a single action, and the action setting takes a flow shown in FIG. 32. In other words, an action setting request is made from the user terminal UST to the action controller ACC in the directory server DRS, an instruction of analyzing the action and monitoring the event is generated by the action controller ACC, and the event table ETB is defined by the event-action controller EAC in the distributed data processing server DDS. Subsequently, the action manager AMG of the action controller ACC instructs the event receiver ERC to monitor the registered event (data ID=X2). Accordingly, the action controller ACC notifies completion of a series of action setting operations to the user terminal UST.

<Execution of Action>

Figure 33:
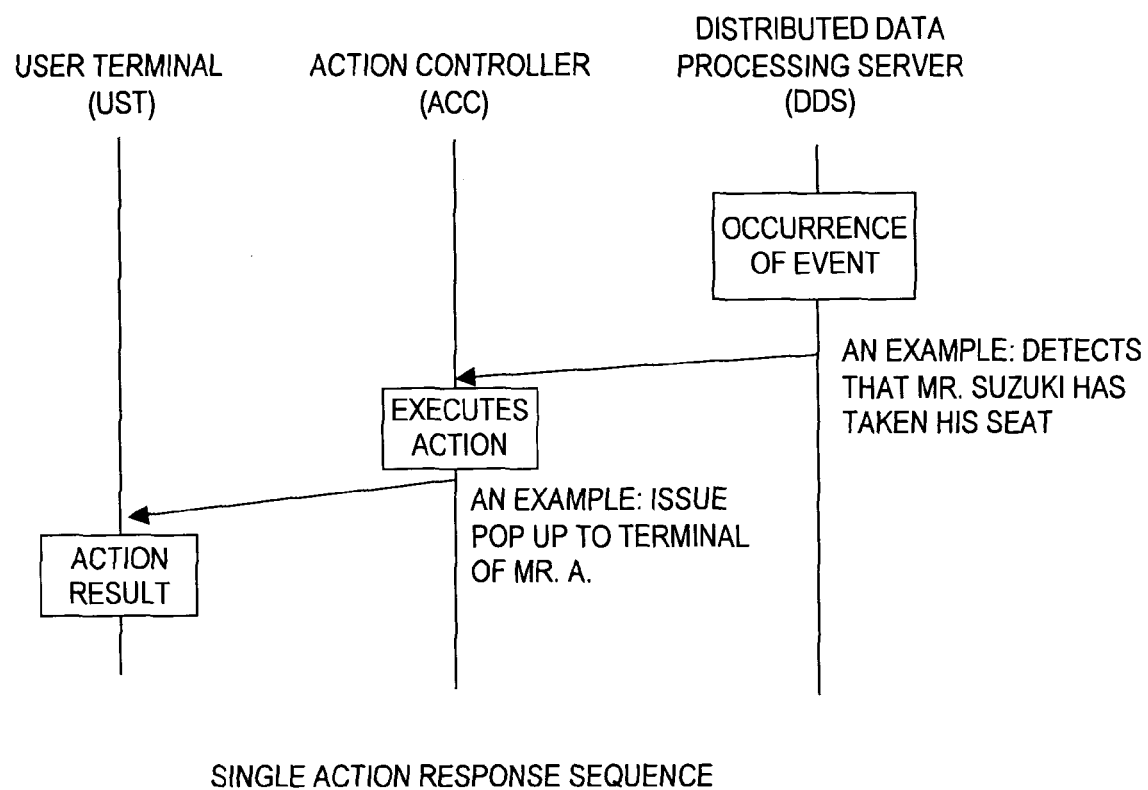
FIG. 33 is a time chart showing a response flow of a single action.

FIG. 33 is a time chart showing execution of settings of FIGS. 28 and 29.

When the target data for monitoring changes to "00", which is an event generation condition, and seating of X is confirmed, the distributed data processing server DDS-1 generates event notification regarding the data ID=X2.

This event generation is notified from the distributed data processing server DDS to the directory server DRS to be received by the event receiver ERC of FIG. 26.

The action manager AMG of the directory server DRS searches in the action table ATB of FIG. 31 from data ID of the received event and checks if there is a relevant action. As the received event of the data ID=X2 is defined in the action table ATB, the action manager AMG notifies an action and a parameter of the action table ATB to the action executer ACEC.

The action executer ACEC transmits pop-up notification to the user terminal UST having the IP address: A designated by the action manager AMG. Thus, the user is notified the seating of X.

<Process of Mobile Sensor Node>

Description will be made of a method of processing data of the wireless mobile sensor node MSN as a mobile sensor node by the directory server DRS, the distributed data processing server DDS, and the base station BST. During its registration, one distributed data processing server DDS (home server) for holding its position information and sensing data is assigned to each wireless mobile sensor node. The wireless mobile sensor node MSN present under the home server is called an internal sensor node when seen from the distributed data processing server DDS which is a home server. When the wireless mobile sensor node MSN moved to be under a distributed data processing server DDS which is not a home server, this distributed data processing server DDS is called an external server.

For example, in FIG. 5, assuming that a data link pointer of the measured data of the wireless mobile sensor node MSN-1 is set to be a distributed data processing server DDS-1, when this wireless mobile sensor node MSN-1 communicates with the base stations BST-1 or BST-2, position information and measured data are collected by the distributed data processing server DDS-1 through the network NWK-2.

Figure 34:
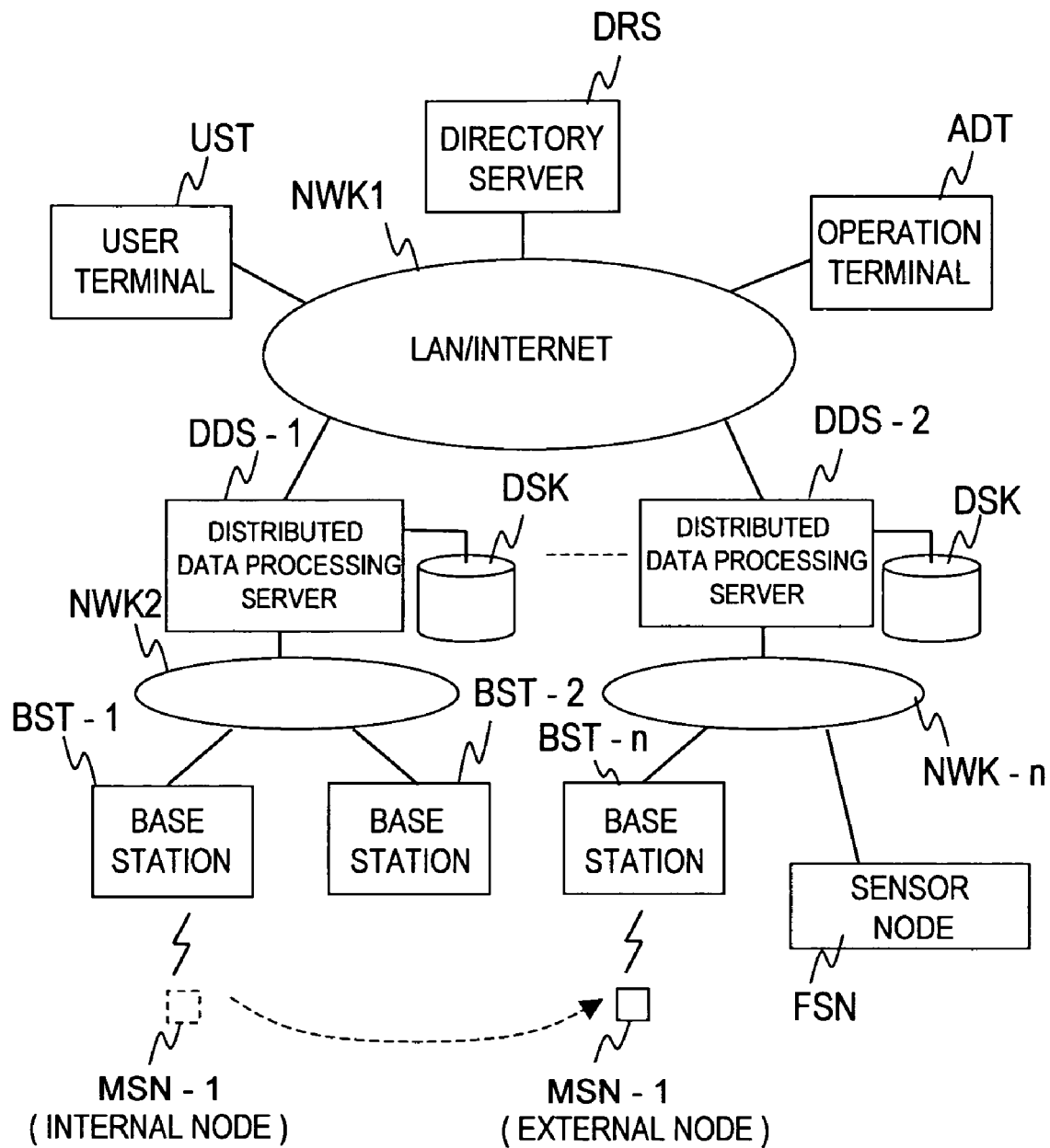
FIG. 34 is a diagram of the system configuration of the sensor network showing a situation where the mobile sensor node moves from a home server to an external server.

On the other hand, as shown in FIG. 34, when the wireless mobile sensor node MSN-1 moves from the base station BST-1 to the base station BST-n, which is connected to the distributed data processing server DDS-2, the distributed data processing server DDS-2 transfers the position information and the measured data of the wireless mobile sensor node MSN-1 to the distributed data processing server DDS-1 through the directory server DRS. The distributed data processing server DDS-1 to transfer the position information and the measured data can be obtained by accessing the directory server DRS based on the data ID of the wireless mobile sensor node MSN-1. This transfer mechanism enables a simplified management of the position information and the measured data of the wireless mobile sensor node MSN-1 regardless of a location of the wireless mobile sensor node MSN-1. In this case, the wireless mobile sensor node MSN-1 can be called an external node when seen from the distributed data processing server DDS-2.

Figure 35:
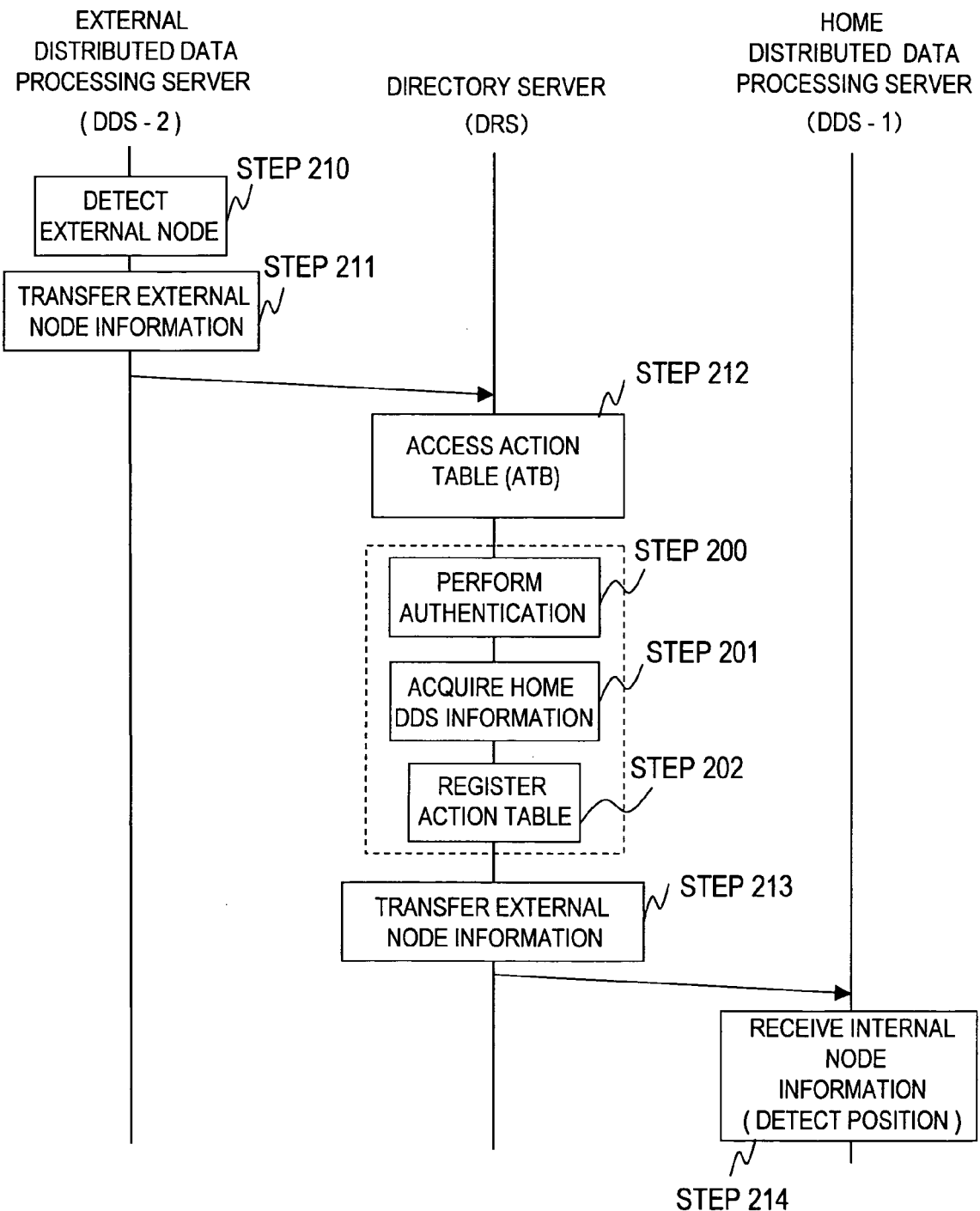
FIG. 35 is a time chart showing a process of transferring measured data of the mobile sensor node from the external server to the home server.

A time chart of FIG. 35 shows a flow of this process. In FIG. 35, first, the external server (distributed data processing server DDS-2) searches in the event table ETB based on the data ID of the sensor node received from the subordinate base station BST-n. No relevant data ID in the event table ETB (STEP 210) means arrival of a new external sensor node.

When a new external sensor node is detected, the external server transfers measured data and data ID of the detected sensor node and position information (e.g., IP address) of the external server to the directory server DRS (STEP 211).

The directory server DRS searches in the action table ATB based on the received data ID of the sensor node to judge presence of an entry of matched data ID (STEP 212).

When an entry regarding the received data ID is not present in the action table ATB, searching is carried out in the sensor information table STB to get information regarding the home distributed data processing server of the sensor node (STEP 200). If there is no relevant data ID in the sensor information table STB, which means an authentication failure, the action table ATB is set to discard measured data.

When authentication is successful, the directory server DRS obtains information of a home server (DDS-1 in this case) corresponding to the data ID from the sensor information table STB of FIG. 12 (STEP 201).

Next, the directory server DRS registers an action entry of the relevant data ID as data ID=MSN-1 in the action table ATB as is shown in FIG. 36. In FIG. 36, for the data ID of the external sensor node received from the external server (distributed data processing server DDS-2), the directory server DRS generates a new entry of the relevant data ID in the action table ATB. Then, data arrival is set as an event condition (contents) in this entry, data transfer is set as an action, and an address (e.g., IP address) of the home server DDS-1 obtained in the STEP 201 is set in the parameter section (STEP 202).

Upon completion of the registration of the action table ATB, the directory server DRS executes an action of the relevant data ID to transfer measured data and data ID of the sensor node (MSN-1) and position information of the sensor node (position information of the external server) to the home server (DDS-1) (STEP 213).

The home distributed data processing server DDS-1 receives the measured data, the data ID and position information of the wireless mobile sensor node MSN-1, as the internal sensor node, from the directory server DRS and hold them in the disk DSK (STEP 214).

If the entry of the relevant data ID has been registered in the action table ATB in the STEP 212, the measured data, the data ID and the position information of the external sensor node are accordingly transferred to the home server (STEP 213). In this case, it is not necessary to execute an authentication process (STEP 200 to STEP 202).

Figure 37:
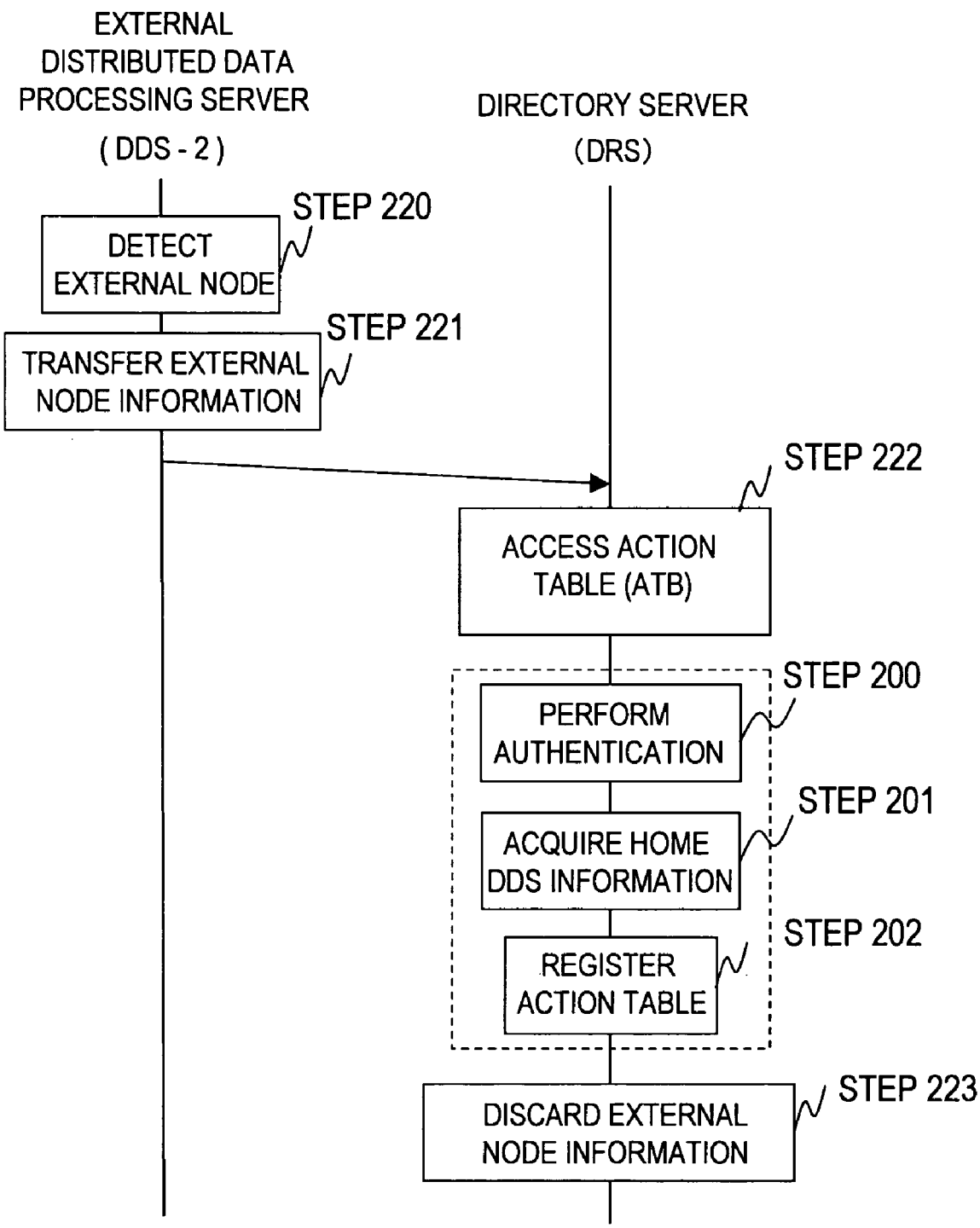
FIG. 37 is a time chart showing a process when authentication fails during the transfer of the measured data of the mobile sensor node to the home server.

As shown in FIG. 37, when the authentication of the STEP 200 fails, the directory server DRS generates a new entry of the relevant data ID (data ID=MSN-n of FIG. 36) in the action table ATB. Then, data arrival is set as an event condition (contents) in this entry, and data discarding is set as an action. Accordingly, thereafter, data received from sensor nodes of other sensor networks unregistered in the sensor information table STB are discarded (STEP 223). Thus, data of the sensor nodes not managed by the directory server DRS can be eliminated. In FIG. 37, the STEP's 220 to 222 and the STEP's 200 to 202 are similar to the STEP's 210 to 212 and the STEP's 200 to 202 of FIG. 35.

As described above, even when the wireless mobile sensor node MSN-1 as the mobile sensor mode moves to any one of the distributed data processing servers DDS, it is possible to manage the location (position information) and the measured data of the mobile sensor node in the home server in a unified manner. Accordingly, when the user terminal UST accesses the information regarding the measured data of the wireless mobile sensor node MSN-1, the directory server DRS can quickly respond to the user terminal as it only needs to always access the data link pointer of the sensor information table STB. The directory server DRS does not need to manage the position of the wireless mobile sensor node MSN-1, whereby enormous loads necessary for the position management of the mobile sensor node can be reduced. As a result, reference to a model name from the user terminal UST and reception of an event action from the distributed data processing server DDS can be smoothly carried out. Specifically, in the sensor network that accommodates many mobile sensor nodes such as wireless mobile sensor nodes, a processing load for managing locations of the mobile sensor nodes by the directory server DRS and traffic of the network NWK-1 are reduced, whereby excessive loads on the directory server DRS and the network NWK-1 can be prevented.

Furthermore, when a sensor node (illegal sensor node) tries to connect to the distributed data processing server DDS, measured data from the illegal node is discarded. Thus, it is possible to suppress unnecessary data communication.

Second Embodiment

FIGS. 38 to 46 show a second embodiment where actions are executed in a distributed data processing server DDS. An action executer ACE is installed in the event-action controller EAC of the distributed data processing server DDS shown in FIG. 9, and the event table ETB of FIG. 10 is replaced by an event action table EATB for defining event generation and action execution. Other components are similar to those of the first embodiment. According to the second embodiment, a distributed data processing server DDS that becomes an external server directly transfers measured data of an external sensor node to a home server DDS.

Figure 38:
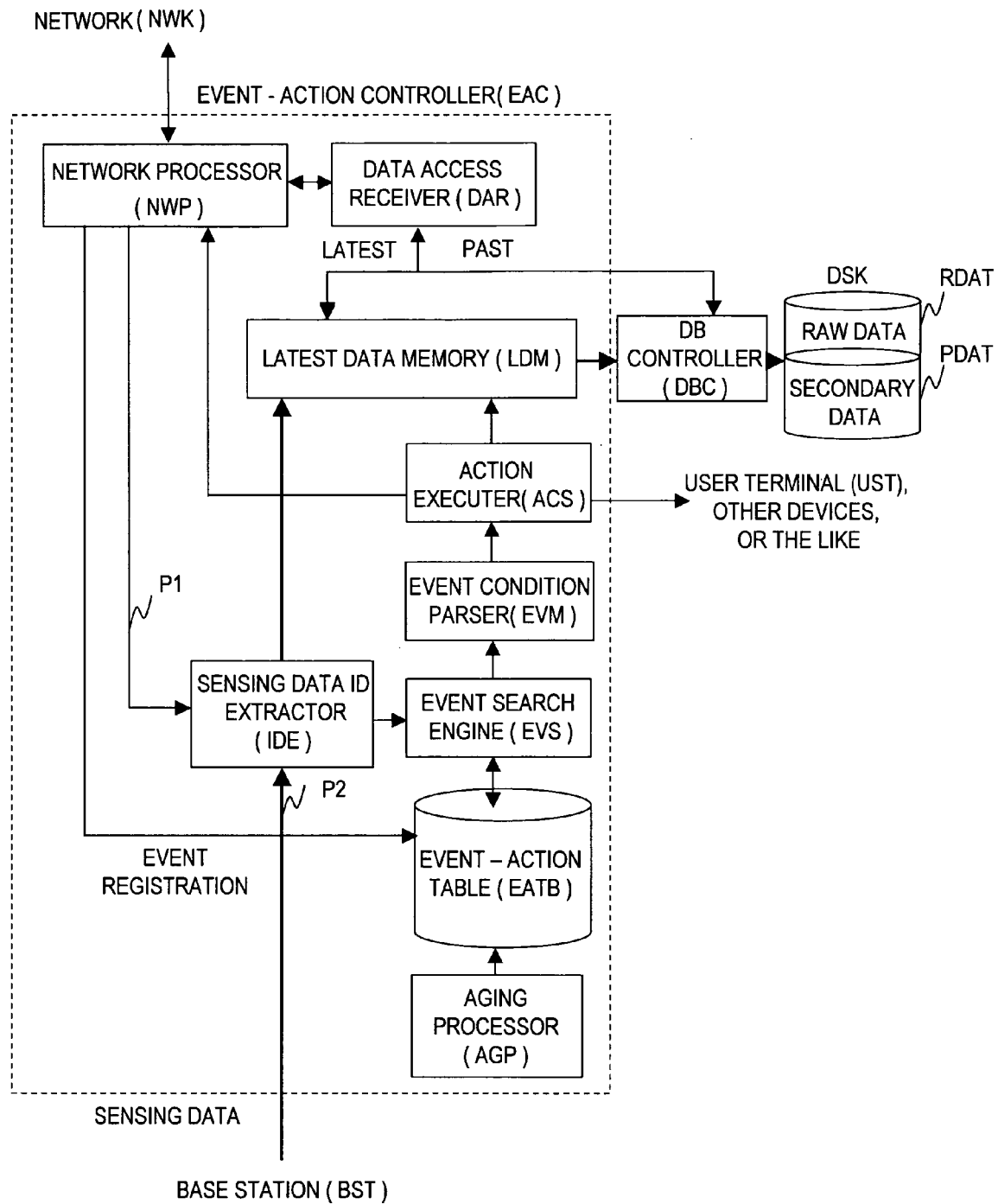
FIG. 38 is a block diagram showing a configuration of an event-action controller of a distributed data processing server DDS according to a second embodiment of this invention.

In FIG. 38, the event-action controller EAC of the distributed data processing server DDS includes an event-action table EATB for correlating measured data collected from base stations BST to event actions through a network processor NWP.

The event-action controller EAC includes an action executer ACE for executing actions set in the event-action table EATB based on event generation notification from an event condition parser EVM.

An aging processor AGP is installed in the event-action table EATB to delete event-action entries of the external sensor node for which predetermined conditions have been established.

For example, the predetermined conditions of the aging processor AGP includes deletion of event-action entries of the external sensor node to which no access (data reception) has been made for over a predetermined time period. Accordingly, by deleting the event action of the wireless mobile sensor node MSN which has moved to another distributed data processing server DDS, it is possible to reduce an increase in event-action entries of the distributed data processing server DDS.

As shown in FIG. 40, in the event-action table EATB, one entry (record) includes data ID assigned for each data of a sensor node, an event content section indicating conditions of measured data for generating events, an action section indicating action contents executed by the distributed data processing server DDS in event generation, a parameter section for holding values necessary for executing actions, and a data holder DHL for deciding holding of measured data in a database DB in the event generation.

In the FIG. 40, for example, in the event-action table EATB, for measured data whose data ID is MSN-1, an event is generated for each arrival (reception) of measured data at the distributed data processing server DDS, and "DATA TRANSFER" set in the action section is executed for a home server (DDS-1 in the embodiment) designated by the parameter section. In addition, data writing in the disk DSK is executed if the disk holding section is Yes, and not executed if it is No. This event action is set from a user terminal through a directory server DRS as in the case of the first embodiment.

In the FIG. 40, measured data whose ID is MSN-n indicates an event action for an external sensor node of an authentication failure, and set to execute "DATA DISCARD" when data arrives.

The distributed data processing server DDS first receives measured data received from a base station BST or a network processor NWP, and data ID is extracted from the measured data by a sensing data ID extractor IDE. Then, the sensing data ID extractor IDE (sensor node judging module) judges whether the received measured data is measured data of an internal sensor node or measured data of an external sensor node based on the data ID. If the received measured data is measured data of the internal sensor node, the sensing data ID extractor IDE sends the measured data to a latest data memory LDM. If it is measured data of the external sensor node, the sensing data ID extractor retrieves a home server of the external sensor node as described below, and the action executer ACE (data controller) transfers the measured data to the home server.

Figure 43:
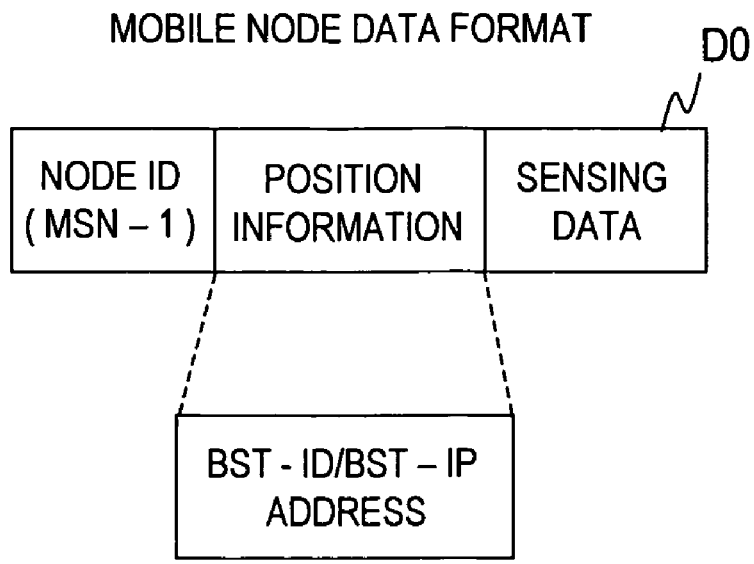
FIG. 43 is an explanatory diagram showing a data format of the mobile sensor node according to the second embodiment of this invention.

In the sensing data ID extractor IDE, the measured data of the wireless mobile sensor node MSN received from the base station BST has a data format D0 shown in FIG. 43.

In FIG. 43, in a header of the data format D0, data ID (node ID in the drawing) assigned for each sensor node is set, position information BST-ID indicating a location of the wireless mobile sensor node MSN is then set, and a measured data body is put in a sensing data section. In this case, the data ID (node ID) is given to a header of measured data by the wireless mobile sensor node MSN itself, and position information BST-ID regarding the base station BST is given to the measured data by the base station BST. For this position information, not only the identifier BST-ID of the base station BST but also an IP address of the base station BST may be added.

Basing on the data ID of the received measured data, if the received measured data is that of the internal sensor node, as described below, the distributed data processing server DDS writes the received data in the disk DSK in the disk format D0. In the case of the external sensor node, as shown in FIG. 44, the distributed data processing server DDS adds address ID of the external sensor node's home server (home DDS in the drawing) to a head of the measured data, so that the measured data be transferred to the home server of the external sensor node.

Figure 44:
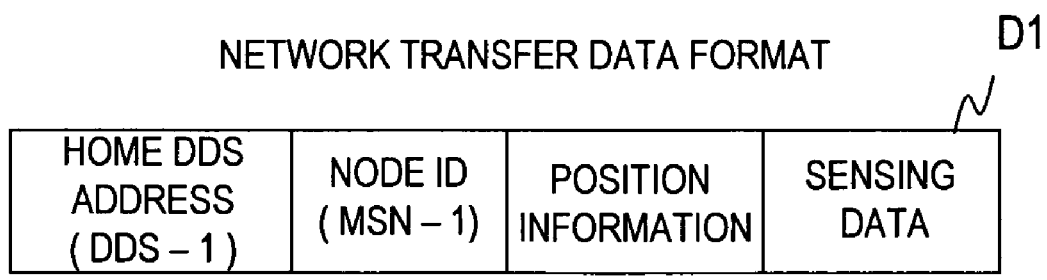
FIG. 44 is an explanatory diagram showing a format of data transferred from the external server to the home server according to the second embodiment of this invention.

In FIG. 44, the data D1 is prepared by adding an address (home DDS address in the drawing) of the home server to the header of the data D0 of FIG. 43. Specifically, an action executer ACE in the distributed data processing server DDS-2, which becomes an external server, adds a home DDS-1 address obtained from the event-action table EATB.

Figure 39:
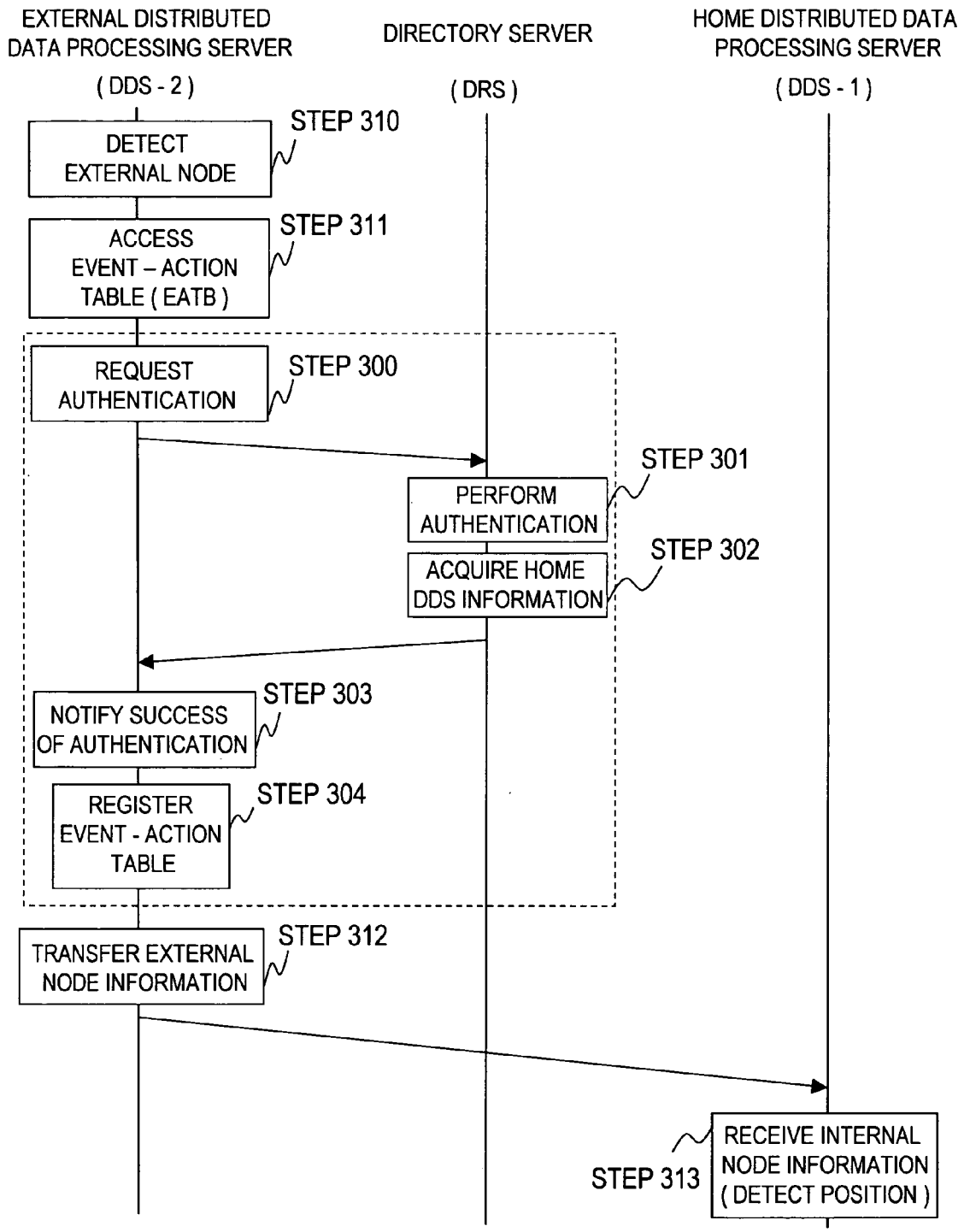
FIG. 39 is a time chart showing a process of transferring measured data of a mobile sensor node from an external server to a home server according to the second embodiment of this invention.
Figure 42:
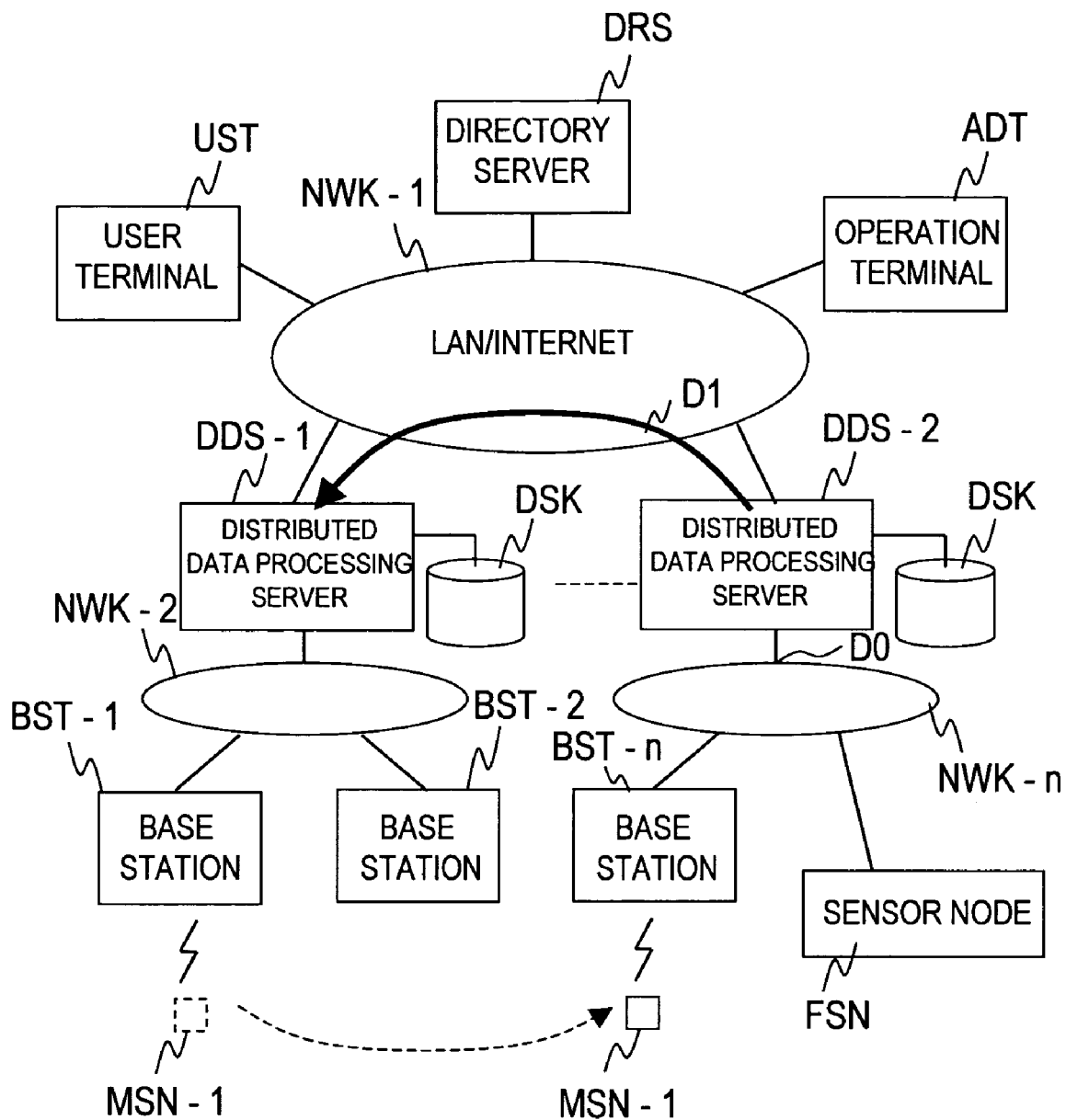
FIG. 42 is a diagram of a system configuration of a sensor network showing a situation where measured data of an external sensor node is transferred between distributed data processing servers DDS according to the second embodiment of this invention.

FIG. 39 is a time chart showing a flow of a process of directly transferring measured data of the wireless mobile sensor node MSN-1 to the home distributed data processing server DDS-1 from the external distributed data processing server DDS-2 when the wireless mobile sensor node MSN-1 moves from a base station BST-1 under the home distributed data processing server DDS-1 to a base station BST-n under the external distributed data processing server DDS-2 as shown in FIG. 42.

In FIG. 39, first, the external server (distributed data processing server DDS-2 of FIG. 42) extracts data ID from the measured data of the wireless mobile sensor node MSN-1 received from the base station BST-n (STEP 310), searches in the event-action table EATB, and judges arrival of a new external sensor node if there is no relevant data ID in the event-action table EATB (STEP 311).

When a new external sensor node is detected, the external server sends data ID of the detector sensor node to the directory server DRS to request authentication (STEP 300).

The directory server DRS searches in a sensor information table STB based on the received data ID of the sensor node, and an authentication is successful if it is registered data ID of a sensor node (STEP 301). Otherwise, an authentication is judged to be failure, and the external server (DDS-2) is set to discard the received measured data as described below.

When the authentication succeeds, the directory server DRS obtains a transfer destination (DDS-1) of the home server (home DDS in the drawing) from a data link pointer of the sensor information table STB corresponding to the relevant data ID, and notifies the authentication success and an address of the home server to the external server (STEP 302).

Next, the external server (DDS-2) that has received the authentication success and the address of the home server of the external sensor node from the directory server DRS registers a new entry of relevant data ID=MSN-1 in the event-action table EATB based on the notification of the authentication success (STEP 303) as shown in FIG. 40 (STEP 304).

As shown in FIG. 40, data arrival is set as an event condition (contents) in a new entry, data transfer is set as an action, and an address (e.g., IP address) of the home server DDS-1 obtained in the STEP 303 is set in the parameter section (STEP 202).

Upon completion of the registration of the event-action table EATB, the external server (DDS-2) executes an action of the relevant data ID to transfer measured data and data ID of the sensor node (MSN-1) and position information of the sensor node (position information of the external server) to the home server (DDS-1) (STEP 312).

The home distributed data processing server DDS-1 receives the measured data, the data ID, and position information of the wireless mobile sensor node MSN-1 as the internal sensor node from the directory server DRS and hold them in the disk DSK (STEP 313).

If the entry of the relevant data ID has been registered in the event-action table EATB in the STEP 311, measured data, data ID, and position information of the external sensor node can be transferred to the home server DDS-1 without requesting authentication to the directory server DRS (STEP 313).

Accordingly, by installing the action executer ACE and the event-action table EATB in the distributed data processing server DDS, the external server that has received the measured data of the external sensor node can directly transfer the measured data to the home server. The role of the directory server DRS is limited to authenticate the wireless mobile sensor node MSN and to notify the address of the home server to the external server, eliminating its necessity of involving in actual data transfer. Thus, processing loads can be reduced more.

Figure 41:
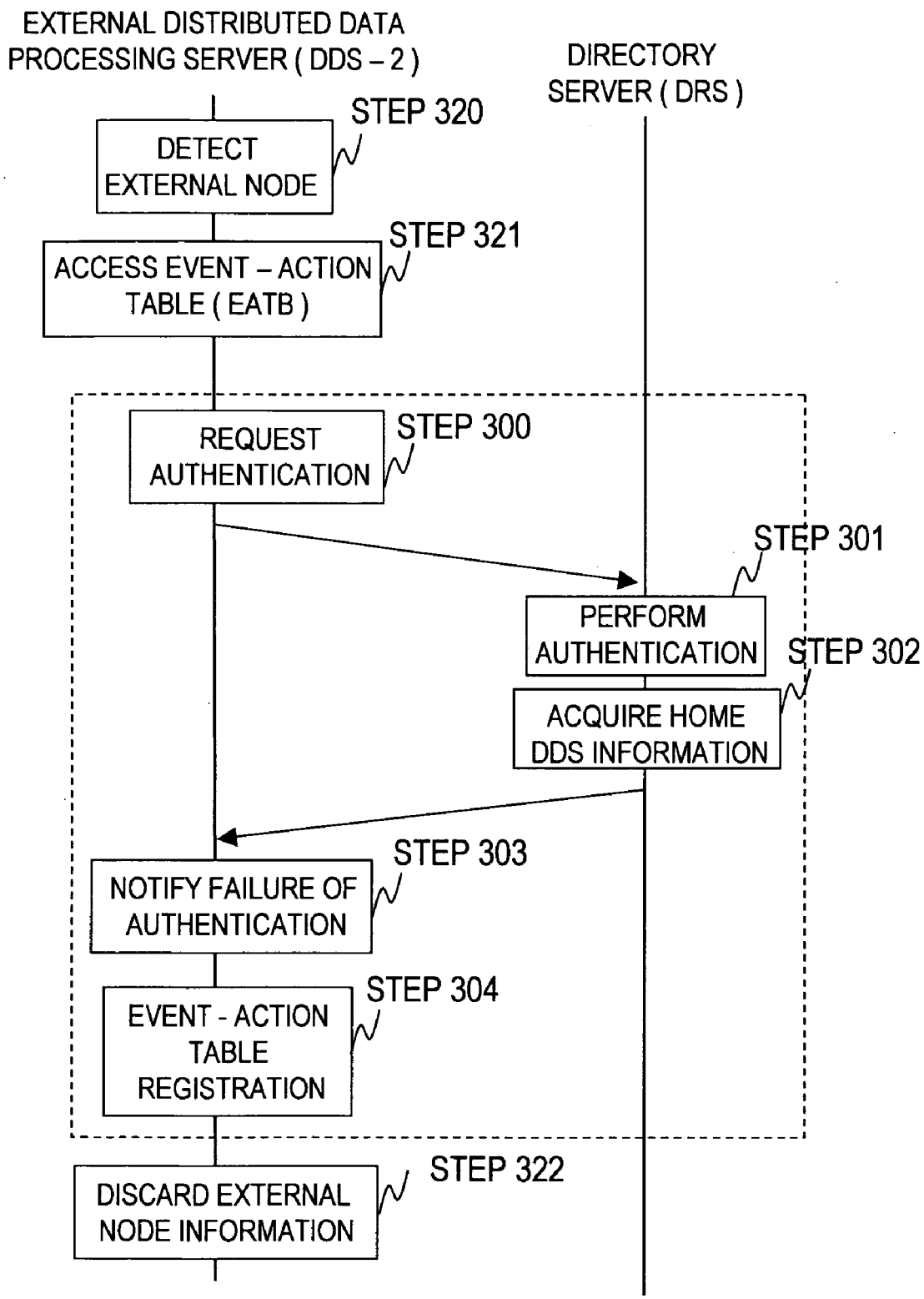
FIG. 41 is a time chart showing a process when authentication fails during the transfer of the measured data of the mobile sensor node from the external server to the home server according to the second embodiment of this invention.

On the other hand, if the directory server DRS fails in authentication in the STEP 301, as shown in FIG. 41, an authentication failure is notified to the external server (DDS-2) (STEP 303). The external server that has received the authentication failure judges that the relevant data ID is that of an illegal mobile sensor node, and generates a new entry of the data ID (data ID=MSN-n of FIG. 40) in the event-action table EATB. Then, data arrival is set as an event condition (contents) in this entry, and data discard is set as an action. Accordingly, thereafter, upon reception of measured data from a unregistered sensor node, the external server (DDS-2) discards the data (STEP 322). As a result, it is possible to discard data of sensor nodes not managed by the directory server DRS. In FIG. 41, STEP's 320 and 321 and STEP's 300 to 3002 are similar to the STEP's 310 to 312 and the STEP's 300 to 302 of FIG. 39. In the case of an illegal mobile sensor node, as there is no relevant data ID registered in the sensor information table STB, the position information of the home server cannot be obtained in the STEP 302.

Figure 45:
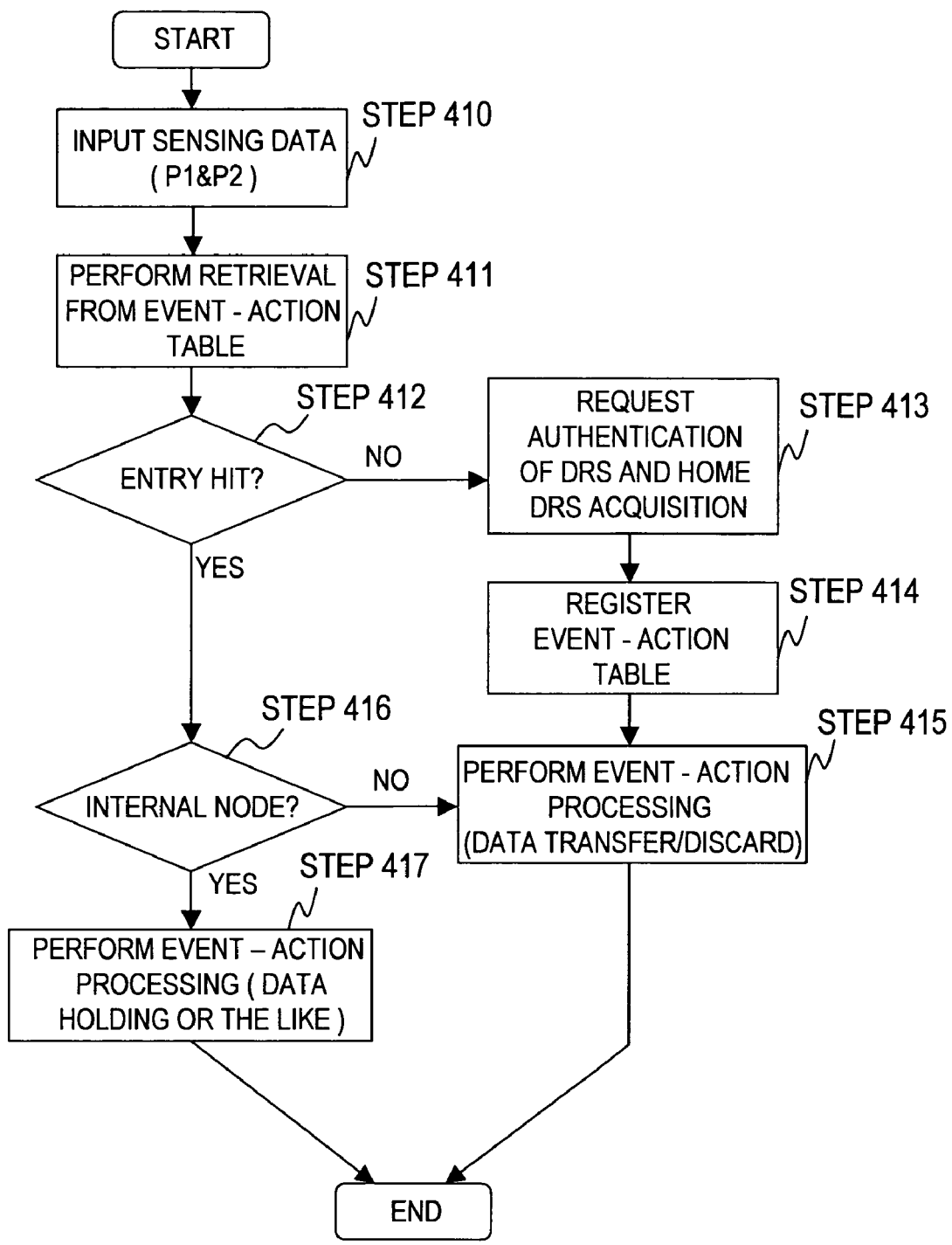
FIG. 45 is a flowchart showing in detail an example of a detection process of the external sensor node and a registration process of an event-action table EATA carried out in the distributed data processing server DDS according to the second embodiment of this invention.

FIG. 45 is a flowchart showing an example of a detection process of an external sensor node and a detailed registration process of the event-action table EATB executed in the distributed data processing server DDS.

First, the sensing data ID extractor IDE receives measured data from a sensor node, and extracts data ID (node ID) from the data shown in FIG. 43 (STEP 410).

Next, the sensing data ID extractor IDE searches in the event-action table EATB based on the extracted data ID and retrieve a matched entry of the data ID (STEP 411). If there is no matched entry, it is judged that the extracted data ID indicates a new external sensor node, and the process proceeds to STEP 413. If there is a matched entry, it is judged that the extracted data ID indicates an internal sensor node or a known external sensor node, and the process proceeds to STEP 416.

In the STEP 413, in which a new external sensor node has been detected, as in the case of the STEP 300 of FIG. 41, the sensing data ID extractor IDE sends the extracted data ID to the directory server DRS to request authentication and acquisition of an address of the home server (STEP 413).

Upon acquisition of an authentication success and the address of the home server from the directory server DRS, the sensing data ID extractor IDE adds an entry of the relevant data ID indicated as data ID=DDS-1 of FIG. 40 in the event-action table EATB, and sets an action to transfer data to the home server. In the case of reception of an authentication failure, an entry is added to discard data indicated as data ID=DDS-n of FIG. 40 for the data ID (STEP 414).

Subsequently, based on setting of the generated new entry, an event search engine EVS retrieves an event corresponding to the data ID, an event condition parser generates an event, and the action executer ACE sets an address of the home server in the measured data of the external sensor node to execute data transfer (STEP 415). When the new external sensor node is an illegal sensor node, the measured data is discarded based on setting of the event-action table EATB.

On the other hand, if the data ID extracted from the measured data matches the event-action table EATB (STEP 416), it is judged whether the sensor node (wireless mobile sensor node MSN) is an internal sensor node or an external sensor node. This judgment is carried out by holding the data ID of the sensor node which becomes a home server in the disk DSK based on the notification received from the directory server DRS during the sensor node registration of FIG. 16, and comparing the extracted data ID with the data ID stored in the disk DSK, or the like.

When the data ID is an internal sensor node, the process proceeds to STEP 417 to send the data ID to a latest data memory LDM and the event search engine EVS, and a predetermined event action such as storing of position information is executed (STEP 417).

On the other hand, if the data ID is an external sensor node, the process proceeds to the STEP 415 to search in the event-action table EATB for the data ID as in the above case, and an event action (data transfer or data discard) is executed for a relevant entry.

Figure 46:
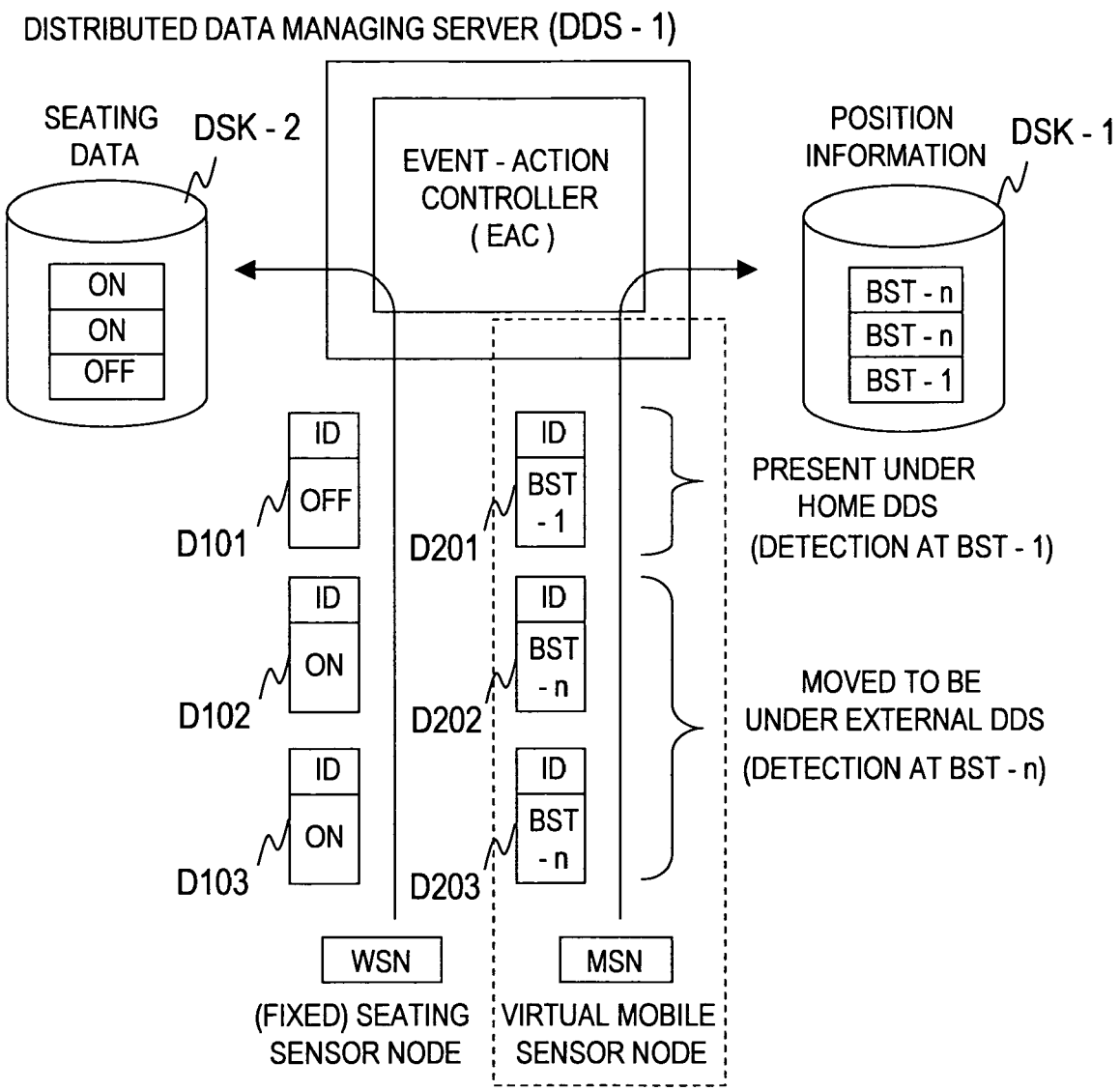
FIG. 46 is an explanatory diagram showing a situation of measured data of the mobile sensor node and a fixed sensor node held in the home server according to the second embodiment of this invention.

Referring to FIG. 46, effects of the mobile sensor managing method is described. According to the embodiment, the distributed data processing server DDS-1 is set to manage the measured data of the wireless mobile sensor node MSN-1. In other words, the distributed data processing server DDS-1 is a home server for the wireless mobile sensor node MSN-1. The distributed data processing server DDS-1 simultaneously manages data (e.g., information of seating or the like) of a wireless sensor node WSN-1 installed in a fixed manner. From the wireless sensor node WSN-1 installed in the fixed manner, for example, sensing data D101, D102, and D103 compliant with ON/OFF of a seated state are time-sequentially held in the disk DSK-2 which manages the seating information. Referring to FIG. 42, a case where the wireless mobile sensor node MSN-1 moves from the base station BST-1 to the base station BST-n will be described. When the wireless mobile sensor node MSN-1 is in a state of being connected to the base station BST-1, data from the wireless mobile sensor node MSN-1 reaches the home distributed data processing server DDS-1 through the base station BST-1. As a result, as shown in FIG. 46, data D 201 having ID (position information) of the base station BST-1 added thereto reaches the distributed data processing server DDS-1. When the wireless mobile sensor node MSN-1 moves in the area of the base station BST-n, the data from the wireless mobile sensor node MSN-1 reaches the distributed data processing server DDS-2 through the base station BST-n. The data that has reached the distributed data processing server DDS-2 is transferred to the home distributed data processing server DDS-1. As a result, as shown in FIG. 46, data D 202 and D 203 having ID (position information) of the base station BST-n added thereto reach the home distributed data processing server DDS-1. Updated position information is sequentially held in the disk DSK-1 which manages the position information of the wireless mobile sensor node MSN-1. In other words, even when the wireless mobile sensor node MSN-1 moves to the distributed data processing server which is not a home server, the data from the wireless mobile sensor node MSN-1 can be managed as if the node is a fixed node, transmitting the position information as sensing data to the home server.

Thus, by using the data transfer system of this invention, as the distributed data processing server DDS-1 can manage the data (DSK-1) from the wireless mobile sensor node in a unified manner as in the case of data management (DSK-2) of the wireless sensor node installed in the fixed manner, it is possible to facilitate data management.

Whenever the user terminal accesses the directory server DRS for information regarding the measured data of the wireless mobile sensor node MSN-1, the directory server DRS only needs to access the data link pointer of the sensor information table STB. Thus, the directory server DRS can quickly respond to the user terminal.

After a new external sensor node is detected and an event action is set for data ID of the external sensor node, the external server can directly transfer measured data to the home server. Accordingly, as data transfer is executed between the external server and the home server, a processing load and access concentration of the directory server DRS are greatly reduced, whereby the sensor network can be properly operated even when the number of sensor nodes is enormous. As data to be transferred includes position information of a base station BST, the home server of the wireless mobile sensor node MSN can understand a location of the wireless mobile sensor node MSN without making any inquires to the directory server DRS.

Thus, even when the wireless mobile sensor node MSN moves in the area of any distributed data processing servers DDS in the sensor network, the measured data can always be transferred to the home server. The directory server DRS can always obtain the measured data irrespective of the actual location of the wireless mobile sensor node MSN by accessing a predetermined home server for the measured data of the wireless mobile sensor node MSN. Processing load of the directory server DRS can be reduced since the mobile sensor node does not need to be directly managed. Therefore the directory server DRS can quickly respond to an inquiry from the user terminal UST or the like.

The directory server DRS only needs to notify authentication of a new external sensor node and an address of a home server to the external server. Accordingly, even when a sensor network including many mobile sensor nodes, it is possible to prevent application of excessive loads on the directory server DRS and the network NWK-1 thereby always running the sensor network smoothly.

The aging processor AGP is installed in the event-action table EATB. Thus, the unused event action entry for the wireless mobile sensor node MSN, which has moved away from the external server, can be effectively deleted. Therefore, it is possible to prevent the saturation of the event-action table EATB in the distributed data processing server DDS.

Figure 51:
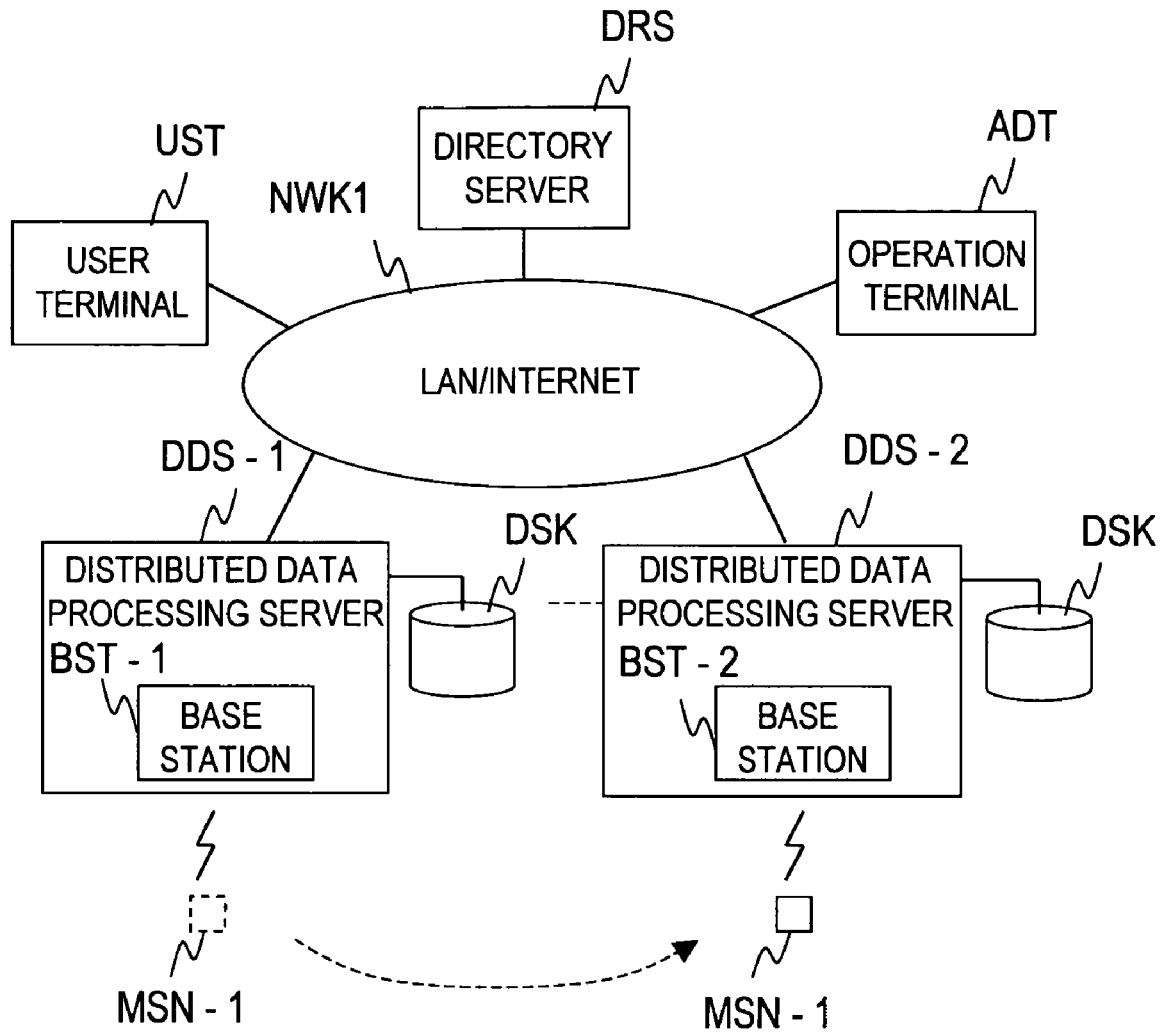
FIG. 51 is a diagram of a system configuration of a sensor network showing a situation where the mobile sensor node moves from a home server to an external server according to the fourth embodiment of this invention.

According to the second embodiment, the identifier of the base station BST is used as the position information of the wireless mobile sensor node MSN to get the detailed position of the wireless mobile sensor node MSN. In other case, the identifier or the address of the distributed data processing server DDS can be used in place of the identifier of the base station BST. In this case, the position information of the wireless mobile sensor node MSN can be rough. In other words, the accuracy of the position information of the wireless mobile sensor node MSN is reduced. As shown in FIG. 51, even when the distributed data processing server DDS includes a function of the base station BST, similarly, the identifier or the address of the distributed data processing server DDS can be used as the position information of the wireless mobile sensor node MSN, whereby the position information of the wireless mobile sensor node MSN is available.

Third Embodiment

Figure 47:
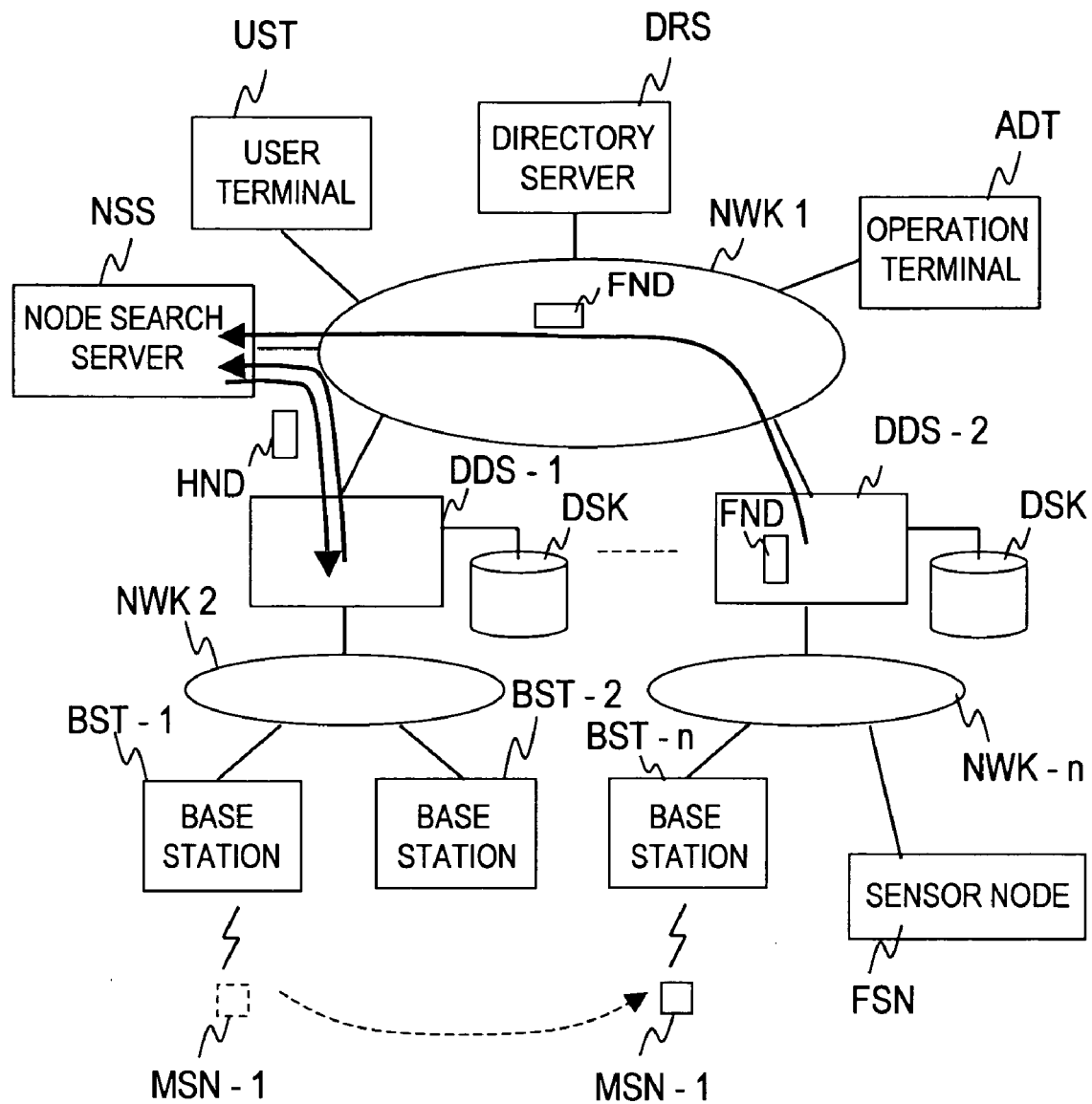
FIG. 47 is a diagram of a system configuration of a sensor network showing a situation where measured data of a mobile sensor node is transferred from an external server to a home server through a node search server according to a third embodiment of this invention.
Figure 48:
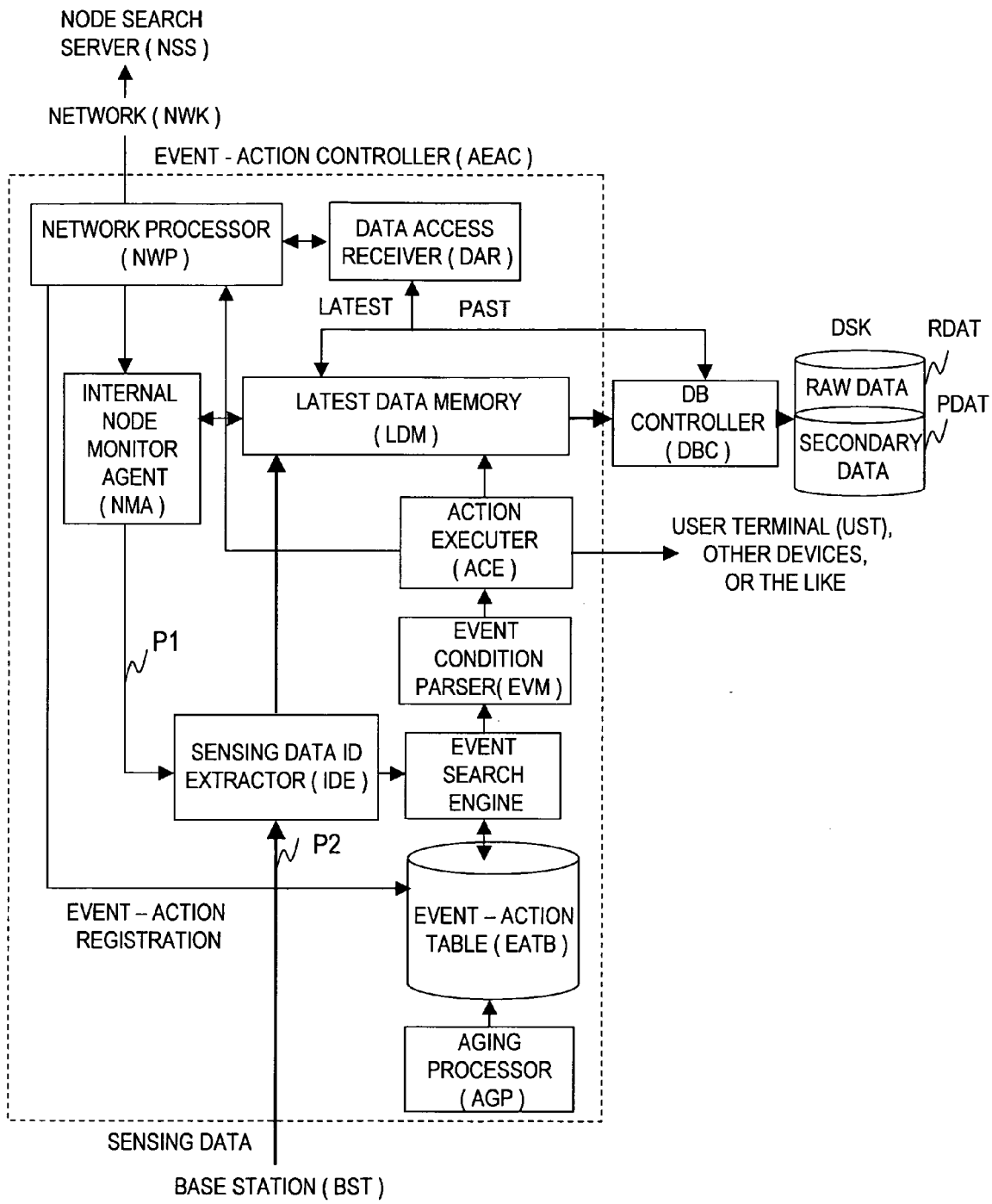
FIG. 48 is a block diagram showing an event-action controller of a distributed data processing server DDS according to the third embodiment of this invention.
Figure 49:
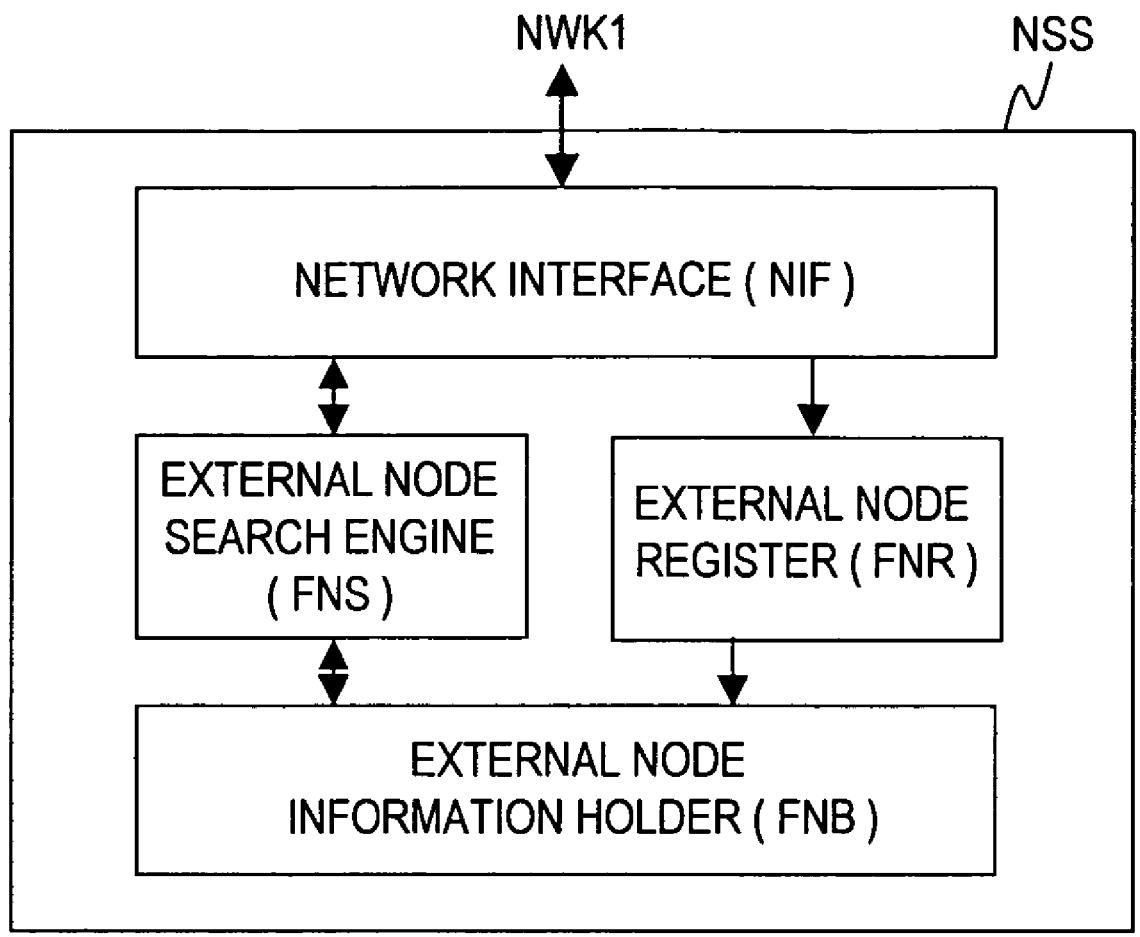
FIG. 49 is a block diagram of the node search server according to the third embodiment of this invention.

FIGS. 47 to 49 show a third embodiment where a node search server NSS for holding information of a mobile sensor node is installed in addition to the directory server DRS and the distributed data processing server DDS of the second embodiment, and an internal node (home node) monitor agent NMA for monitoring an internal sensor node is added to the distributed data processing server DDS.

Referring to FIG. 47, an example of an overall operation will be described. A wireless mobile sensor node MSN-1 that is an internal sensor node of a distributed data processing server DDS-1 as a home server moves from a base station BST-1 under the home server to a base station BST-n under another distributed data processing server DDS-2 (external server).

Upon detection of a new external sensor node (MSN-1) from the base station BST-n, the external server transfers data of this wireless mobile sensor node MSN-1 as external (foreign) sensor node data FND to the node search server NSS. In other words, upon detection of an external sensor node, the external server transfers the measured data to the node search server NSS as it is. As in the case of FIG. 43, an identifier, an IP address, or the like of the base station BST is added in a data format.

Upon reception of the external sensor node data FND from the external server (distributed data processing server DDS-2), the node search server NSS holds the measured data.

As shown in FIG. 48, the home server (distributed data processing server DDS-1) includes an internal node monitor agent NMA for monitoring presence of a subordinate internal sensor node in a subordinate base station BST-1 or BST-2. The internal node monitor agent NMA periodically monitors presence or absence of a subordinate sensor node in a subordinate base station BST. When the internal node monitor agent NMA detects disappearance of the subordinate mobile sensor node from the base station BST, the home server requests data regarding the internal node to the node search server NSS.

The internal node monitor agent NMA of the home server makes an inquiry about data ID of the sensor node to the node search server NSS to request measured data regarding a mobile sensor node which has not received data for a fixed time period based on a transfer interval of the measured data of the internal sensor node.

When the data ID of the external sensor node received from the external server (DDS-2) and the data ID requested by the home server (DDS-1) match each other at the node search server NSS, this data is transmitted as internal node sensor data HND to the home server. The internal node monitor agent NMA can obtain position information of the internal sensor node by periodically making inquiries to the node search server NSS even when the internal sensor node moves to other external servers.

As shown in FIG. 48, in an event-action controller AEAC of the distributed data processing server DDS, an internal node monitor agent NMA for monitoring and judging presence or absence of internal and external sensor nodes is arranged between a network processor NWP and a sensing data ID extractor IDE.

Upon detection of an external sensor node from data ID of measured data received by the sensing data ID extractor IDE, the event-action controller AEAC directly transfers the measured data to the node search server NSS.

The internal node monitor agent NMA holds timing such as a receiving interval of measured data of a subordinate wireless mobile sensor node MSN, and start asking the node search server NSS to transfer the measured data based on data ID of an internal sensor node, if there is a internal wireless mobile sensor node MSN which transmits no measured data for over a fixed time period.

In this case, as shown in FIG. 49, the node search server NSS includes a network interface NIF for communicating with a distributed data processing server DDS which becomes an external or home server through a network NWK-1, an external node register FNR for receiving measured data transferred from the external server to hold it in an external node information holder FNB, and an external node search engine FNS for searching measured data from an external node information holder FNB.

As described above, the external server that has detected the external sensor node directly transfers the measured data of the external sensor node to the node search server NSS. The home server, out of which its subordinate mobile sensor node as the internal sensor node moves, requests the measured data to the node search server. Accordingly, transfer of the measured data of the external sensor node can be carried out only by the three components, i.e., the external server, the node search server, and the home server without any participation of the directory server DRS. Thus, the directory server DRS can dedicate itself to a reference request from the user terminal UST or execution of an event action, whereby a processing load can be further reduced. The distributed data processing server DDS that becomes an external server does not need to make an inquiry about an address of the home server to the directory server DRS. Thus, it is possible to greatly reduce a processing load necessary for transferring the measured data of the external sensor node.

Fourth Embodiment

Figure 50:
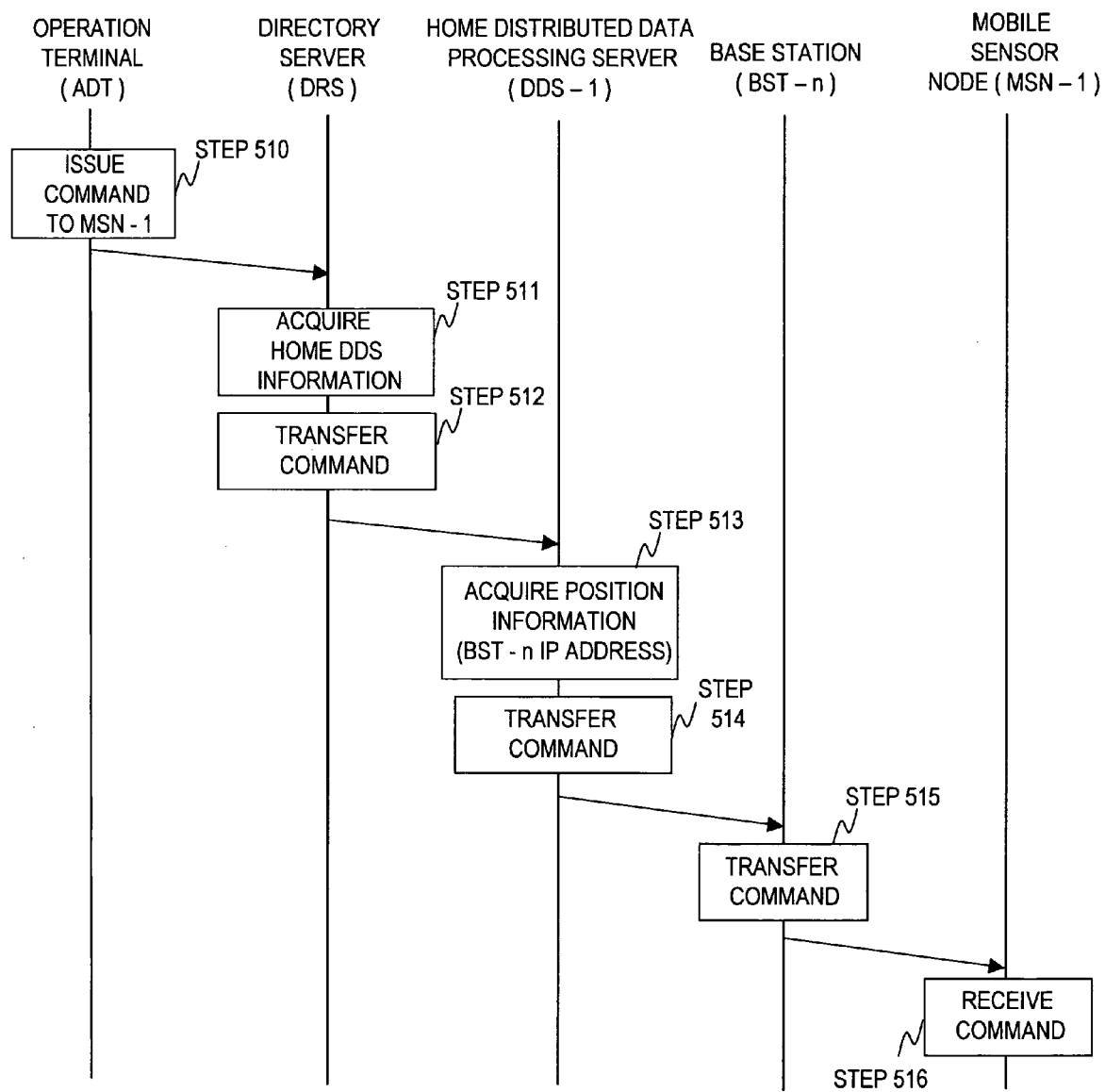
FIG. 50 is a time chart when a command is transmitted from an operation terminal ADT to a mobile sensor node according to a fourth embodiment of this invention.

FIGS. 50 and 51 show a fourth embodiment of a processing procedure of transmitting a command (instruction) from the operation terminal ADT to the mobile sensor node in the first to third embodiments.

As shown in FIG. 3, a wireless mobile sensor node MSN as a mobile sensor node includes a power supply unit POW such as a battery, therefore it is important to manage a charge amount (residual power amount) of the power supply unit POW. As shown in FIG. 4, a period of a sleep state must be adjusted as it can operate intermittently. Accordingly, a system administrator must send a command from the operation terminal ADT to the mobile sensor node (MSN-1) to check a state or to change settings of the mobile sensor node.

In this case, unlike fixed sensor nodes, the mobile sensor node is not always near its home server. Thus, the manager cannot easily know which one of distributed data processing servers DDS-1 to n the mobile sensor node exists. For example, as shown in FIG. 50, when a mobile sensor node (wireless mobile sensor node MSN-1) having a distributed data processing server DDS-1 set as a home server moves to a base station BST-n connected to the distributed data processing server DDS-2 as an external server, measured data of the mobile sensor node (MSN-1) is always held in the home server as described above. Thus, the operator is always able to obtain the measured data of the mobile sensor node from the same server. However, as a location of the mobile sensor node moves around, even if a command destined to the mobile sensor node is sent from the operation terminal ADT to the home server (DDS-1), it cannot always reach to the mobile sensor node. In that case, as shown in a flow of FIG. 50, the home server (DDS-1) has to transfers a command to the base station BST in which the mobile sensor node currently exist.

First, a command addressed to the mobile sensor node (MSN-1) is transmitted from the operation terminal ADT to the directory server DRS (STEP 510).

The directory server DRS that has received the command addressed to the mobile sensor node searches in a sensor information table STB to obtain information destination (address) of a home server of the mobile sensor node (MSN-1) (STEP 511). The directory server DRS transfers the received command to the home server (distributed data processing server DDS-1) of the mobile sensor node (STEP 512).

The home server (DDS-1) that has received the command addressed to the mobile sensor node (MSN-1) retrieves position information of the mobile sensor node (MSN-1) from latest measured data (latest measured data in data memory) to obtain position information (identifier or IP address of the base station BST) included in the measured data (STEP 513). The home server expects that the mobile sensor node exists in the obtained base station BST, and transmits the command to the base station BST based on an identifier (e.g., IP address) of the base station BST (STEP 514).

Upon reception of the command addressed to the mobile sensor node from the home server (DDS-1), the base station BST-n sends the command to the mobile sensor node (MSN-1) (STEP 515).

The mobile sensor node (MSN-1) receives the command from the base station BST-n and executes predetermined processing (STEP 516).

As a current location of the mobile sensor node can be obtained from the position information included in the measured data of the mobile sensor node, it is possible to transmit the command from the operation terminal ADT to a desired mobile sensor node even when the mobile sensor node is not under its home server.

As described above, according to this invention, as the measured data is always transferred to the home server to which the mobile sensor node belongs irrespective of the location of the mobile sensor node, the directory server can quickly and easily access the measured data from the enormous number of sensor nodes. Therefore the sensor network which includes many sensor nodes is attained.

While the present invention has been described in detail and pictorially in the accompanying drawings, the present invention is not limited to such detail but covers various obvious modifications and equivalent arrangements, which fall within the purview of the appended claims.

What is claimed is:

1. A sensor network system comprising:
   a plurality of mobile sensor nodes, each of which includes a sensor which obtains data from users of said sensor network, and a transmission unit which transmits the data including an identifier for identifying the data from an associated sensor node;
   a first base station and a second base station each of which receives the data;
   a first distributed processing server connected to said first base station and a second distributed processing server connected to said second base station, each of which includes
   a reception unit which receives the data transmitted from said sensor node through said base stations;
   an extractor which extracts said identifier from the received data;
   a memory which records a list which holds said identifier and the data corresponding to said identifier;
   a judging module which judges whether or not said extracted identifier is held in said list;
   an executer which stores said data in said memory based on the judgment results of said judging module;
   a management server which comprises a system manager which manages said identifier of each of said sensor nodes and an associated said first distributed processing server for holding the data associated with said identifier, wherein:
   when said first distributed processing server receives the data transmitted from said mobile sensor node, the executer of said first distributed processing server holds the data as a preset process,
   when said mobile sensor node moves from said first base station to said second base station and said second distributed processing server receives the data transmitted from said mobile sensor node,
   if said extracted identifier is held in said list, said executer of said second distributed processing server transfers the data to said first distributed processing server as said preset process, and
   if said extracted identifier is not held in said list, said second distributed processing server makes an inquiry to said management server, said management server transmits the location of said first distributed processing server, and said second distributed processing server holds said extracted identifier and the location of said first distributed processing server in said list and transfers the data to said first distributed processing server.

2. The sensor network system according to claim 1, wherein:
   said second distributed processing server transfers the data to the management server when the list does not hold the identifier.

3. The sensor network system according to claim 2, wherein said management server further comprises an action table which holds an identifier managed by said system manager and the location of said first distributed processing server for holding data including the identifier in association with each other, and transfers the data to said first distributed processing server based on said action table when the data is transferred from said second distributed processing server.

4. A sensor network system according to claim 3, wherein in a case where said identifier included in the data is not held in said action table when the data is transferred from said second distributed processing server, said management server instructs said action table to holds said identifier managed by said system manager and the location of said first distributed processing server for holding the data including said identifier based on a transferred identifier.

5. The sensor network system according to claim 1, wherein said second distributed processing server sets discarding of the received data including said identifier if the received identifier is not managed by said system manager.

6. The sensor network system according to claim 1, wherein said second distributed processing server holds in said list the identifier and the location of said first distributed processing server for holding the data including said identifier based on the inquiry to the management server, and deletes said identifier and the location of said first distributed processing server for holding the data including said identifier from said list when the data is not received from said sensor node for a predetermined time.

7. The sensor network system according to claim 1, wherein one of said first distributed processing server and said second distributed processing server receives the data including position information indicating a position of said sensor node.

8. The sensor network system according to claim 7, wherein each of said first base stations and the second base station adds one of an identifier or an address of the base station itself as the position information to the data received from said sensor node.

9. The sensor network system according to claim 7, wherein each of said first base station and said second base station adds one of an identifier and an address of the base station itself as the position information to the data received from said sensor node.

10. The sensor network system according to claim 8, wherein:
    said management server transmits a command to be sent to said sensor node to said first distributed processing server;
    and said first distributed processing server transmits said command to the base station which receives the data transmitted from said sensor node based on the received position information indicating the position of said sensor node.

11. A control system embodying a program for causing a distributed processing server to receive data from a sensor node and to perform one of transferring the data or holding the data, said data including an identifier for identifying the data, wherein said program causes the distributed processing server to execute:
    a process of receiving the data from said sensor node;
    a process of judging a holding place of the data;
    a process of transferring the data when the holding place is another distributed processing server;

a process of receiving data from a management server and another distributed processing server; and a process of holding data when the data is received from the management server and another distributed processing server, when the holding place of the data is the distributed processing server; and a memory for holding a list of identifiers extracted from the received data and storing said received data corresponding to said identifiers, wherein:

when a first distributed processing server receives the data transmitted from said mobile sensor node, the executer of said first distributed processing server holds the data, when said sensor node moves from a first base station to a second base station and a second distributed processing server receives the data transmitted from said sensor node, if the extracted identifier is held in said list, said executer of said second distributed processing server transfers the data to said first distributed processing server for holding, if the extracted identifier is not held in said list, said second distributed processing server makes an inquiry to said management server, said management server transmits the location of said first distributed processing server, and said second distributed processing server holds the extracted identifier and the location of said first distributed processing server in said list and transfers the data to said first distributed processing server.

12. The control system according to claim 11, wherein:

said process of judging the holding place of the data includes a process of making an inquiry about the holding place of the received data to the management server, and a process of judging whether the inquired holding place is another distributed processing server or the distributed processing server; and said process of transferring the data transfers the received data to the management server.

13. The control system according to claim 11, wherein:

said process of judging the holding place of the data includes a process of making an inquiry about the holding place of the received data to the management server, and a process of judging whether the inquired holding place is another distributed processing server or the distributed processing server; and said process of transferring the data transfers the received data to another distributed processing server based on a result of the inquiry.

14. The control system according to claim 12, wherein:

said process of receiving the data from the sensor node includes a process of extracting a data identifier from the received data;

said process of making the inquiry to the holding place makes an inquiry about the holding place of the received data to the management server based on the identifier;

said process of judging the holding place of the data includes a process of holding the identifier and a preset process corresponding to the identifier in a list; and said process of judging the holding place judges that the holding place is the distributed processing server if the identifier is in the list, and that the holding place is another distributed processing server if the identifier is not in the list.

15. The control system according to claim 13, wherein:

said process of receiving the data from the sensor node includes a process of extracting a data identifier from the received data;

said process of judging the holding place of the data includes a process of holding the identifier and a preset process corresponding to the identifier in a list, and judgment is made as to whether the holding place of the data is the distributed processing server or another distributed processing server from the list based on the identifier; and said process of transferring the data transfers the data including the identifier to another distributed processing server corresponding to the identifier.

16. The control system according to claim 13, wherein:

said process of receiving the data from the sensor node includes a process of extracting a data identifier from the received data;

said process of making the inquiry to the holding place makes an inquiry about the holding place of the received data to the management server based on the identifier;

said process of judging the holding place of the data includes a process of holding the identifier and a holding place corresponding to the identifier in a list, and judgment is made as to whether the holding place of the data is the distributed processing server or another distributed processing server by obtaining a holding place of data from the list based on the identifier; and the process of transferring the data transfers the data including the identifier to another distributed processing server of the holding place.

17. The control system according to claim 16, wherein when the holding place of the data is not obtained from said list based on the identifier, said process of judging the holding place of the data discards the received data.

18. The control system according to claim 16, further comprising a process of deleting the identifier and the holding place from said list when the data including the identifier indicating that the holding place is another distributed processing server is not received for over a predetermined time period.

19. The control system according to claim 11, wherein said process of receiving the data from the sensor node receives the data including position information of the sensor node.

20. The control system according to claim 19, wherein said process of receiving the data from said sensor node receives data including an identifier or an address of a base station which relays the data of said sensor node, and said process of transferring the data transfers the data including a data identifier and one of the identifier and the address of the base station.

21. The control system according to claim 20, wherein:

said process of receiving the data from the management server and another distributed processing server receives a command including position information of the base station from the management server; and said process of transferring the data transfers data including the command to the base station corresponding to the identifier.

22. A control system embodying a program for causing a management server to receive data from a distributed processing server and to transfer the data to another distributed processing server, wherein said program causing said management server to execute:

a process of receiving data from the distributed processing server;

a process of retrieving a holding place of the data; and a process of transferring the data to the holding place;

a memory for holding a list of identifiers extracted from the received data and a preset process corresponding to said identifiers, wherein:
when a first distributed processing server receives the transmitted data, the executer of said first distributed processing server holds the data,
when said sensor node moves from a first base station to a second base station and a second distributed processing server receives the data transmitted from said sensor node,
if the extracted identifier is held in said list, said executer of said second distributed processing server transfers the data to said first distributed process server for holding,
if the extracted identifier is not held in said list, said second distributed processing server makes an inquiry to said management server, said management server transmits the location of said first distributed processing server, and said second distributed processing server holds the extracted identifier and the location of said first distributed processing server in said list and transfers the data to said first distributed processing server.

23. The control system according to claim 22, wherein:
said process of judging searches in an action table including the identifier and a preset holding place corresponding to the identifier to judge a holding place of the data; and
said process of transferring the data transfers the data to the holding place retrieved from the action table.

24. The control system according to claim 23, wherein said process of judging obtains the holding place corresponding to said identifier from a preset sensor node information table when said identifier is not in the action table, and holds said identifier and the holding place corresponding to said identifier in said action table.

25. The control system according to claim 24, wherein said process of judging discards the received data when the holding place corresponding to said identifier is not in said sensor node information table.

* * * * *